United States Patent
Konishi et al.

(10) Patent No.: US 9,070,374 B2
(45) Date of Patent: Jun. 30, 2015

(54) COMMUNICATION APPARATUS AND CONDITION NOTIFICATION METHOD FOR NOTIFYING A USED CONDITION OF COMMUNICATION APPARATUS BY USING A LIGHT-EMITTING DEVICE ATTACHED TO COMMUNICATION APPARATUS

(71) Applicant: JVC KENWOOD Corporation, Yokohama-Shi, Kanagawa-Ken (JP)

(72) Inventors: Masaya Konishi, Yokohama (JP); Tatsuya Onoda, Yokohama (JP)

(73) Assignee: JVC KENWOOD Corporation, Yokohama-shi, Kanagawa-ken (JP)

( * ) Notice: Subject to any disclaimer, the term of this patent is extended or adjusted under 35 U.S.C. 154(b) by 209 days.

(21) Appl. No.: 13/770,236

(22) Filed: Feb. 19, 2013

(65) Prior Publication Data
US 2013/0218575 A1    Aug. 22, 2013

(30) Foreign Application Priority Data

Feb. 20, 2012 (JP) .................................. 2012-034189
Feb. 20, 2012 (JP) .................................. 2012-034192

(51) Int. Cl.
| | |
|---|---|
| *G10L 21/06* | (2013.01) |
| *G10L 25/60* | (2013.01) |
| *H04B 1/401* | (2015.01) |
| *G10L 25/84* | (2013.01) |
| *H04B 1/46* | (2006.01) |

(52) U.S. Cl.
CPC ................ *G10L 21/06* (2013.01); *G10L 25/60* (2013.01); *H04B 1/401* (2013.01); *G10L 25/84* (2013.01); *H04B 1/46* (2013.01)

(58) Field of Classification Search
USPC .......................................................... 704/275
See application file for complete search history.

(56) References Cited

U.S. PATENT DOCUMENTS

| | | | |
|---|---|---|---|
| 2008/0032624 A1* | 2/2008 | Abraham ..................... | 455/11.1 |
| 2012/0053931 A1* | 3/2012 | Holzrichter ................ | 704/200.1 |
| 2013/0039503 A1* | 2/2013 | Beaucoup et al. ............ | 381/66 |

FOREIGN PATENT DOCUMENTS

| | | |
|---|---|---|
| JP | 2000-106588 | 4/2000 |
| JP | 2004-120717 | 4/2004 |
| JP | 2010-28531 | 2/2010 |
| JP | 2010-279043 | 12/2010 |

OTHER PUBLICATIONS

Machine translation for JP 2000-106588, IDS, Apr. 2000.*

* cited by examiner

*Primary Examiner* — Qian Yang
(74) *Attorney, Agent, or Firm* — Renner, Kenner, Greive, Bobak, Taylor & Weber

(57) ABSTRACT

The used condition of a simplex communication apparatus is notified with a light-emitting device attached to the communication apparatus. It is determined whether a communication mode of the simplex communication apparatus is a transmission mode or a standby mode. A sound pick-up state of a sound carried by a speech signal to be transmitted is determined if the communication mode is the transmission mode. The light-emitting device is controlled so that it is turned off, turned on or repeatedly turned on and off based on determination results of the communication-mode determination and the sound pick-up state determination.

15 Claims, 28 Drawing Sheets

| | TRANSMISSION-MODE SIGNAL (FROM PTT UNIT) | SPEECH-QUALITY SIGNAL (FROM SPEECH-QUALITY DETERMINATION UNIT) | LED STATE |
|---|---|---|---|
| No1 | TRANSMISSION MODE (PTT UNIT PUSHED) | GOOD SPEECH QUALITY | TURN ON AND OFF |
| No2 | TRANSMISSION MODE (PTT UNIT PUSHED) | BAD SPEECH QUALITY | TURN ON |
| No3 | | NO SIGNAL | TURN ON |
| No4 | RECEPTION MODE (PTT UNIT NOT PUSHED) | NO SIGNAL | TURN OFF |

FIG. 6

| | COMMUNICATION MODE | SOUND PICK-UP STATE DETERMINATION | | LED STATE |
|---|---|---|---|---|
| | | SPEECH SEGMENT DETERMINATION | SPEECH QUALITY DETERMINATION | |
| No1 | STANDBY MODE (NO TRANSMISSION INSTRUCTION SIGNAL INPUT) | NO DETERMINATION | NO DETERMINATION | TURN OFF |
| No2 | TRANSMISSION MODE (INPUT TRANSMISSION INSTRUCTION SIGNAL) | NON-SPEECH SEGMENT | NO DETERMINATION | TURN ON |
| No3 | | SPEECH SEGMENT | BAD SPEECH QUALITY | TURN ON |
| No4 | | | GOOD SPEECH QUALITY | TURN ON AND OFF |

FIG. 13

| | TRANSMISSION MODE INFROMATION (FROM PTT UNIT) | SPEECH-QUALITY DETERMINATION INFORMATION (FROM SPEECH-QUALITY DETERMINATION UNIT) | LED STATE |
|---|---|---|---|
| No1 | TRANSMISSION MODE (PTT UNIT PUSHED) | GOOD SPEECH QUALITY | TURN ON AND OFF |
| No2 | TRANSMISSION MODE (PTT UNIT PUSHED) | BAD SPEECH QUALITY | TURN ON |
| No3 | STANDBY MODE (PTT UNIT NOT PUSHED) | NO SIGNAL | TURN ON |
| No4 | STANDBY MODE (PTT UNIT NOT PUSHED) | NO SIGNAL | TURN OFF |

FIG. 27

COMMUNICATION APPARATUS AND CONDITION NOTIFICATION METHOD FOR NOTIFYING A USED CONDITION OF COMMUNICATION APPARATUS BY USING A LIGHT-EMITTING DEVICE ATTACHED TO COMMUNICATION APPARATUS

CROSS-REFERENCE TO RELATED APPLICATIONS

This application is based on and claims the benefit of priority from the prior Japanese Patent Application Nos. 2012-034192 filed on Feb. 20, 2012 and 2012-034189 filed on Feb. 20, 2012, the entire content of which is incorporated herein by reference.

BACKGROUND OF THE INVENTION

The present invention relates to an audio input apparatus, a communication apparatus and a condition notification method.

An audio input apparatus that is a typical example of transceivers for commercial use is often used in an environment of much noise, such as a factory and a construction site. There is thus a demand for communication with clear voice sounds even in such a noisy environment by suppressing noise components included in a speech signal obtained through a microphone.

In order to meet the demand, there is a known audio input apparatus having an active noise-cancellation function using a main microphone for mainly picking up voice sounds and a sub-microphone for mainly picking up the surrounding noise.

In order to enhance the active noise-cancellation function in such a known audio input apparatus, it is preferable that a main microphone is oriented towards the user's mouth with an appropriate distance. In the case of a headset microphone (a close-talking microphone), a comparatively constant positional relationship is kept between the microphone and the user's mouth. On the other hand, in the case of a handset microphone, the positional relationship between a microphone held by a user and the user's mouth changes depending on how the user is using the handset microphone.

Moreover, it may happen that a handset microphone is used in a bad input condition of voice sounds for use in noise cancellation when it is held on the user's shoulder, a user talks into the microphone at a fairly long distance, etc. When a handset microphone is used in such a manner, it may happen that more voice sounds are picked by a sub-microphone than by a main microphone, which cancel a speech signal obtained through the main microphone, with the noise-cancellation function, resulting in transmission of unclear voice sounds.

SUMMARY OF THE INVENTION

A purpose of the present invention is to provide an audio input apparatus, a communication apparatus and a condition notification method that achieve transmission of clear voice sounds with an effective noise-cancellation function.

The present invention provides a condition notification method for notifying a used condition of a simplex communication apparatus by using a light-emitting device attached to the simplex communication apparatus, the method comprising: a communication-mode determination step of determining whether a communication mode of the simplex communication apparatus is a transmission mode or a standby mode; a sound pick-up state determination step of determining a sound pick-up state of a sound carried by a speech signal to be transmitted if the communication mode is the transmission mode; and a control step of controlling the light-emitting device so that the light-emitting device is turned off, turned on or repeatedly turned on and off based on determination results of the communication-mode determination step and the sound pick-up state determination step.

Moreover, the present invention provides a communication apparatus comprising: a first pick-up unit configured to pick up a voice sound; a transmitter unit configured to transmit the voice sound picked up by the first pick-up unit to outside as a first speech signal; a communication-mode switching unit configured to switch a communication mode between a standby mode in which the transmitter unit does not transmit the speech signal and a transmission mode in which the transmitter unit transmits the speech signal; a sound pick-up state determination unit configured to determine a pick-up state of the voice sound picked up by the first pick-up unit; a light emission device configured to emit light; and a control unit configured to control the light-emitting device so that the light-emitting device is turned off, turned on or repeatedly turned on and off based on the communication mode switched by the communication-mode switching unit, and the pick-up state of the voice sound picked up by the first pick-up unit and determined by the sound pick-up state determination unit.

Furthermore, the present invention provides an audio input apparatus comprising: a first sound pick-up unit; a second sound pick-up unit; a noise-cancellation processing unit configured to perform noise cancellation to a first speech signal input from the first sound pick-up unit by using a second speech signal input from the second sound pick-up unit; a speech-quality evaluation unit configured to evaluate speech quality of a speech signal after the noise cancellation at the noise-cancellation processing unit; and an evaluation-result notification unit configured to notify an evaluation result at the speech-quality evaluation unit.

BRIEF DESCRIPTION OF DRAWINGS

FIG. 6 is a table listing communication modes, speech-quality evaluation results, and LED states;

FIG. 13 is a table listing communication modes, sound pick-up state evaluation results, and LED states under control by a light-emission control unit;

FIG. 27 is a table listing communication modes, speech-quality evaluation results, and LED states according to the ninth embodiment of the present invention.

DETAILED DESCRIPTION OF PREFERRED EMBODIMENTS

Varies embodiments according the present invention will be explained with reference to the attached drawings. Throughout the drawings, the elements the same as or analogous to each other are given the same reference signs or numerals with no repeated explanation thereof for brevity.

First Embodiment

Figure 1:
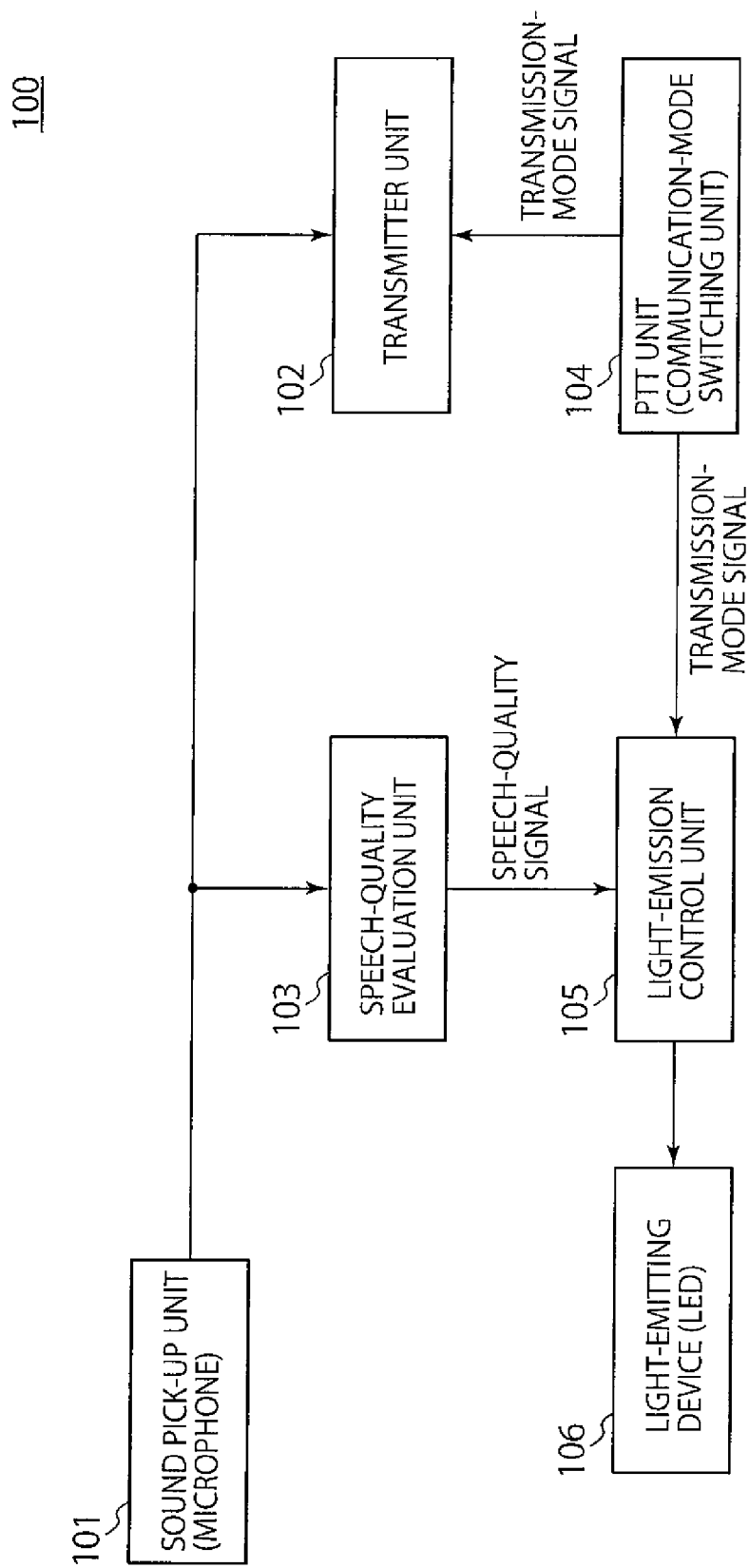
FIG. 1 is a block diagram schematically showing the configuration of a communication apparatus according to a first embodiment of the present invention.

FIG. 1 is a block diagram schematically showing the configuration of a simplex communication apparatus 100 according to a first embodiment of the present invention.

As shown in FIG. 1, the communication apparatus 100 is provided with a sound pick-up unit (a main microphone) 101, a transmitter unit 102, a speech-quality evaluation unit 103, a PTT (Push To Talk) unit 104 as a communication-mode switching unit, a light-emission control unit 105, and a light-emitting device (LED) 106.

The sound pick-up unit 101 is a microphone attached to the communication apparatus 100, for picking up a voice sound. On picking up a voice sound, the sound pick-up unit 101 generates a first speech signal that is output to the transmitter unit 102 and the speech-quality evaluation unit 103.

The transmitter unit 102 performs speech coding to the first speech signal according to need and transmits a second speech signal (the speech-coded first speech signal) to another communication apparatus (not shown). The transmitter unit 102 transmits the second speech signal to another communication apparatus when it receives a transmission-mode signal from the PTT unit 104 while the PTT unit 104 is being pushed as described later.

The speech-quality evaluation unit 103 evaluates the speech quality of the second speech signal to be transmitted by the transmitter unit 102 based on the first speech signal input from the sound pick-up unit 101. Then, the speech-quality evaluation unit 103 outputs a speech-quality signal that indicates an evaluation result (an evaluated speech quality of the second speech signal) to the light-emission control unit 105. In the first embodiment, the speech-quality evaluation unit 103 evaluates the speech quality of the second speech signal to be transmitted by the transmitter unit 102 by determining the volume level of a voice sound picked up by the sound pick-up unit 101. When the volume level of a voice sound picked up by the sound pick-up unit 101 is lower than a specific reference level, it is determined that the voice sound cannot be clearly heard by a person who receives the second speech signal at his or her communication apparatus, hence evaluated as a bad speech quality.

The PIT unit 104 is a communication-mode switching unit to switch the transmission of the second speech signal from the transmitter unit 102. In detail, the PTT unit 104 switches a communication mode of the communication apparatus 100 between a transmission mode in which the transmitter unit 102 transmits the second speech signal and a standby mode in which the transmitter unit 102 does not transmit the second speech signal. When the PTT unit 104 is pushed, the operation mode, that is the communication mode, of the communication apparatus 100 is switched from the standby mode to the transmission mode for transmission of the second speech signal.

The standby mode is defined as a mode in which the communication apparatus 100 can detect a signal transmitted from another communication apparatus even if no transmitted signal is being received. In other words, the standby mode includes a reception waiting mode and a reception mode in which the communication apparatus 100 is receiving a radio wave. Moreover, the standby mode is defined as a mode in which the communication apparatus 100 performs no operation when the apparatus 100 is only for transmission use with no reception function. Accordingly, the standby mode is defined as these various modes, however, one requirement is that, in the standby mode, the transmitter unit 102 is not transmitting a speech signal. When the communication apparatus 100 is in-vehicle use, it is provided with a speaker.

The PTT unit 104 is, more in detail, a communication-mode switch attached to a main body of the communication apparatus 100. When a user starts talking, the user pushes the PTT unit 104 to switch the communication mode from the standby mode (a default mode) to the transmission mode.

When the PTT unit 104 is pushed, a transmission-mode signal indicating that the communication mode has been switched from the standby mode to the transmission mode is output to the transmitter unit 102 and the light-emission control unit 105.

The light-emission control unit 105 controls a light emission state of the light-emitting device 106 to notify a user of a used condition of the communication apparatus 100 (that is, how the communication apparatus 100 is being used). The light-emitting device 106 is attached to the main body of the communication apparatus 100, that is an LED (Light Emitting Diode) in this embodiment. Based on the speech-quality signal output from the speech-quality quality unit 103, that indicates the speech quality and the transmission-mode signal output from the PTT unit 104, that indicates the transmission mode, the light-emission control unit 105 controls the light emission state of the light-emitting device 106.

The operation of the communication apparatus 100 will be explained with a flowchart shown in FIG. 2.

The light-emission control unit 105 determines whether the current communication mode is the transmission mode (step S101). If the PTT unit 104 is not pushed so that no transmission-mode signal is input, it is determined that the current communication mode is the standby mode (No in step S101). Thus, the light-emission control unit 105 turns off the light-emitting device 106 with no drive current supplied thereto (step S102). On the other hand, if the PTT unit 104 is pushed so that the transmission-mode signal is input, it is determined that the current communication mode is the transmission mode (Yes in step S101), then, the speech-quality evaluation unit 103 performs a speech-quality evaluation process (step S103).

Based on an evaluation result indicated by the speech-quality signal from the speech-quality evaluation unit 103, the light-emission control unit 105 determines whether a speech signal to be transmitted by the transmitter unit 102 has a good speech quality (step S104). In other words, it is determined whether the speech-quality signal input from the speech-quality evaluation unit 103 indicates a good speech quality or bad speech quality.

As a result of step S104, if the speech quality is good (Yes in step S104), the light-emission control unit 105 repeatedly turns on and off the light-emitting device 106 with a drive current supplied thereto (step S105). On the other hand, if the speech quality is bad (No in step S104), the light-emission control unit 105 turns on the light-emitting device 106 with a drive current supplied thereto (step S106).

As described above, based on the communication mode switched by the PTT unit 104 and the speech-quality evaluation result at the speech-quality evaluation unit 103, the light-emission control unit 105 controls the light-emitting device 106 so that the light-emitting device 106 becomes in one of the three states: a turn-off state, a repeated turn-on-and-off state, and a turn-on state. With the three states of the light-emitting device 106, a used condition of the communication apparatus 100 is notified to a user. When the user visually recognizes the turn-on state of the light-emitting device 106, the user recognizes that the current speech quality is bad and takes an action to improve the speech quality, such as, bringing the microphone (the sound pick-up unit) 101 close to his or her mouth.

As described above, according to the first embodiment, in the simplex communication apparatus 100 that performs communication with switching of the communication mode between the transmission mode and the standby mode, it is achieved to notify a user of whether a voice incoming direction, a direction in which the user is talking into the microphone (the sound pick-up unit) 101, is good or bad and also whether the speech quality of a speech signal to be transmitted is good or bad. The notification can be achieved with the light-emitting device 106 (LED) attached to the main body of the communication apparatus 100.

In detail, as described above, the communication apparatus 100 in the first embodiment is provided with the PTT unit 104 (the communication-mode switching unit) for switching the communication mode between the standby mode and the transmission mode. When the PTT unit 104 is pushed, the light-emission control unit 105 controls the light-emitting device 106 to become the turn-on state that indicates the transmission mode from the turn-off state that indicates the standby mode. Moreover, based on a speech-quality evaluation result, the light-emission control unit 105 controls the light-emitting device 106 to become the repeated turn-on-and-off state that indicates a good speech quality from the turn-on state that indicates a bad speech quality, thereby notifying a user of a used condition of the communication apparatus 100. Accordingly, the user can take an action to improve the used condition of the communication apparatus 100 so that the speech quality of his or her voice sound can have a good speech quality when transmitted.

The communication apparatus 100 shown in FIG. 1 may be provided with a receiver unit for receiving a speech signal transmitted from another communication apparatus when the PTT unit 104 is not pushed so that the communication apparatus 100 is in the standby mode. In this case, a speech signal received by the receiver unit is decoded and given off by a speaker.

Second Embodiment

If a transmission apparatus is used in an environment of much noise, it may occur that, even if the volume level of a voice sound picked up a microphone is high enough, the speech quality gets worse because the voice sound is drowned out by the surrounding noise. In this case, it cannot be said that the volume level adequately represents the speech quality. Thus, there is a problem in that, even if the volume level exceeds a threshold level and an LED does not indicate a bad speech quality (if the transmission apparatus is equipped with an LED like the light-emitting device 106 in FIG. 1), a transmitted voice sound has a bad speech quality due to much noise, resulting in that a person who receives the transmitted voice sound has a difficulty in hearing the voice sound.

Such a problem is remarkable, especially, in digital wireless transmission of a voice sound. When a voice sound is transmitted, it undergoes speech coding in bandwidth compression. However, the speech coding is not performed well due to the surrounding noise, which results in a bad speech quality in the voice sound.

In order to solve such a problem discussed above, a communication apparatus according to a second embodiment has a feature in that the speech quality of a voice sound to be transmitted is notified to a user of the communication apparatus to instruct improvement in a used condition of the communication apparatus, thereby improving speech quality.

Figure 3:
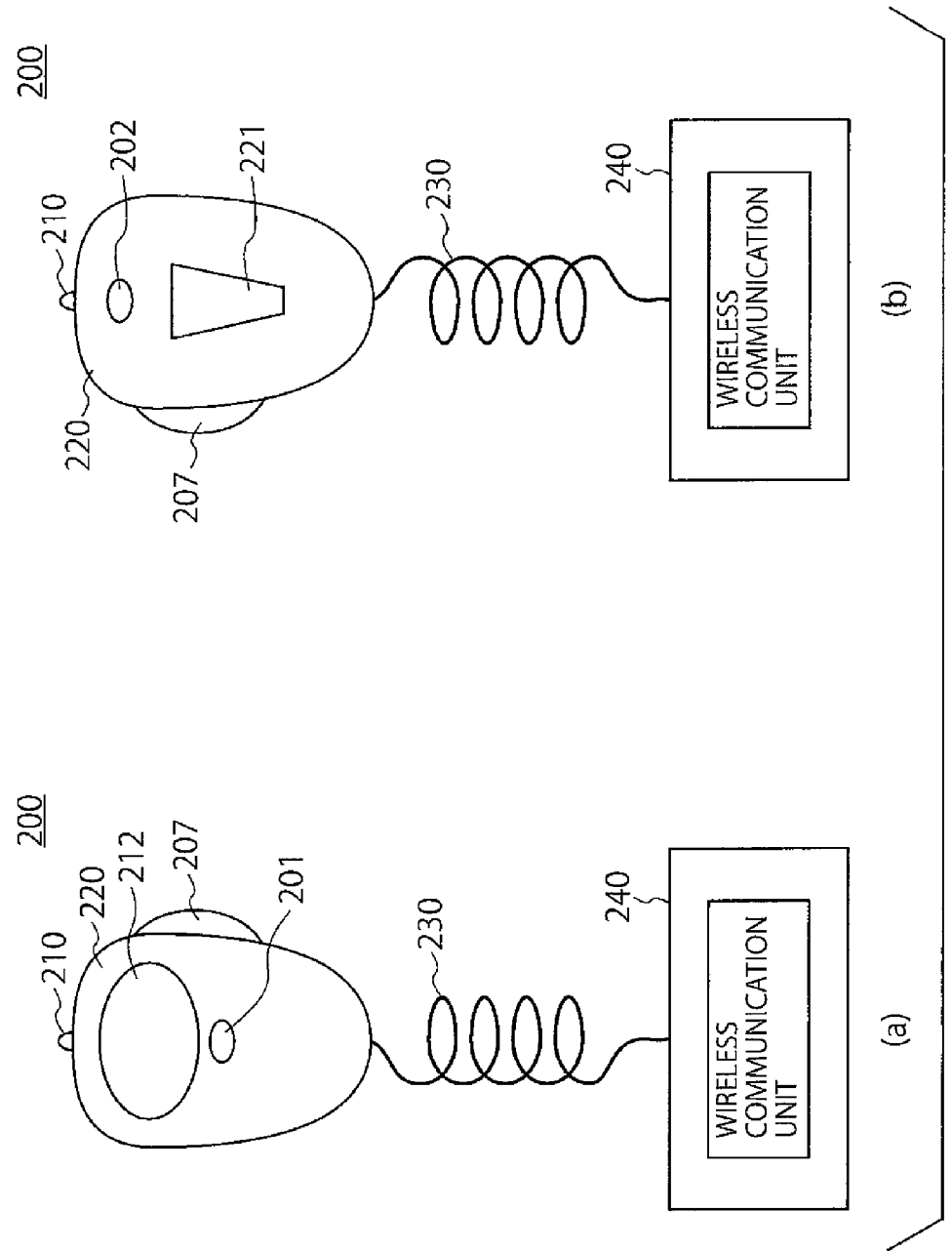
FIG. 3 is a view showing the exterior appearance of a communication apparatus (a noise cancellation microphone) with a front view (a) and a rear view (b), according to a second embodiment of the present invention.

FIG. 3 is a view showing the exterior appearance of a communication apparatus 200 (a noise cancellation microphone) with a front view (a) and a rear view (b), according to the second embodiment of the present invention.

The communication apparatus 200 is provided with a noise cancellation microphone unit 220 and a wireless communication unit 240 connected to each other with a cord 230. The noise cancellation microphone unit 220 in this embodiment corresponds to an audio input apparatus equipped mainly with microphones. Provided on the front face of the noise cancellation microphone unit 220 are a main microphone 201 (a first sound pick-up unit) and a speaker 212. Provided on the rear face of the noise-cancellation microphone unit 220 are a sub-microphone 202 (a second sound pick-up unit) and a belt clip 221 for holding the noise-cancellation microphone unit 220 by a belt. Provided at the top and the side faces of the noise-cancellation microphone unit 220 are an LED 210 and a PTT unit 207, respectively.

The configuration of the communication apparatus 200 will be explained with reference to FIG. 4 that is a block diagram schematically showing the configuration of the communication apparatus according to the second embodiment of the present invention.

The communication apparatus 200 is provided with a main microphone 201 (a first sound pick-up unit), a sub-microphone 202 (a second sound pick-up unit), a speech-segment determination unit 203, a noise-cancellation processing unit 204, a noise suppressor unit 205, a wireless transmitter unit 206, PTT unit (a communication-mode switching unit) 207, a speech-quality evaluation unit 208, an LED control unit 209, an LED 210, a wireless receiver unit 211, and a speaker 212 (a sound emission unit).

The main microphone 201 is a microphone attached to the noise-cancellation microphone unit 220 of the communication apparatus 200, for picking up a voice sound. A speech signal (a first speech signal) obtained by the main microphone 201 based on the voice sound is output to the speech-segment determination unit 203, the noise-cancellation processing unit 204, and the speech-quality evaluation unit 208. The sub-microphone 202 is also a microphone attached to the noise-cancellation microphone unit 220 of the communication apparatus 200, for picking up a voice sound. A speech signal (a second speech signal) obtained by the sub-microphone 202 is output to the noise-cancellation processing unit 204 and the speech-quality evaluation unit 208.

The main microphone 201 corresponds to a first sound pick-up unit for picking up mainly a user's voice sound, hence provided on the front face of the noise-cancellation microphone unit 220 as shown in (a) of FIG. 3. The sub-microphone 202 corresponds to a second sound pick-up unit for picking up mainly the surrounding noise for use in a noise cancellation process, hence provided on the rear face of the noise-cancellation microphone unit 220 as shown in (b) of FIG. 3. The arrangements of the main microphone 201 and the sub-microphone 202 on the front and rear faces, respectively, of the cancellation microphone unit 220 as shown in FIG. 3 is the best arrangement for an excellent noise cancellation effect, although the sub-microphone 202 may be provided on the side or bottom face of the noise cancellation microphone unit 220, or inside the microphone unit 220.

The speech-segment determination unit 203 performs speech segment determination based on a first speech signal input from the main microphone 201, to detect a speech segment that corresponds to a duration in which a user is taking into the communication apparatus 200. In detail, the speech-segment determination unit 203 converts the first speech signal input from the main microphone 201 into a signal component in unit of a specific length in the frequency domain and analyzes a spectrum component of the signal component thus converted into the frequency domain to determine whether it is a vowel, a consonant, or a noise component based on the analyzed spectrum component. The speech-segment determination unit 203 outputs a speech-segment indication signal that indicates a speech segment to the noise-cancellation processing unit 204 and the speech-quality evaluation unit 208.

The noise-cancellation processing unit 204 performs a noise cancellation process (noise-component suppressing process) based on the first and second speech signals input from the main microphone 201 and the sub-microphone 202, respectively. In detail, the noise-cancellation processing unit 204 is equipped with an adaptive filter to generate a reversed-phase component of a noise component mixed into a voice component at the main microphone 201, as a noise cancellation signal, based on a voice sound picked up by the sub-microphone 202. Then, the noise-cancellation processing unit 204 adds the first speech signal input from the main microphone 201 and the noise cancellation signal to suppress a noise component mixed into a voice component at the main microphone 201. A speech signal after the noise cancellation is output to the noise suppresser 205 and the speech-quality evaluation unit 208. In this embodiment, the noise-cancellation processing unit 204 performs the noise cancellation process to the first speech signal input from the main microphone 201 for each frame of a specific constant duration (256 samples, for example). A speech signal that has undergone the noise cancellation process, so that its noise component has been suppressed, is referred to as a noise-cancelled signal, hereinafter.

The noise suppressor unit 205 suppresses a noise component other than a voice component that appears on the frequency axis of the noise-cancelled signal input from the noise-cancellation processing unit 204. Then, the noise suppressor unit 205 returns a noise-component-suppressed signal into the time domain and outputs the signal to the wireless transmitter unit 206.

The wireless transmitter unit 206 performs speech coding to the signal from the noise suppressor unit 205 and modulates the signal after the speech coding with a carrier wave and transmits the signal to another wireless communication apparatus or the like.

In the following description, the noise suppressor unit 205 and the wireless transmitter unit 206 are referred to as a communication unit according to need.

The PTT unit 207 switches the operation of the wireless transmitter unit 206 between transmission and non-transmission of the noise-cancelled signal. In detail, the PTT unit 207 switches a communication mode of the communication apparatus 200 between a transmission mode in which the wireless transmitter unit 206 transmits a speech signal and a standby mode in which the wireless transmitter unit 206 is in a waiting mode for the transmission of a speech signal. A reception mode in which the wireless receiver unit 211 receives a speech signal transmitted from another communication apparatus is included in the standby mode mentioned above. When a user wants to receive a signal, the user switches the communication mode to the standby mode using the PTT unit 207. With the PTT unit 207, either one of the transmission mode and the standby mode is selected as the communication mode of the communication apparatus 200. When the user talks into the communication apparatus 200, the user pushes the PTT unit 207 to switch the communication mode from the standby mode to the transmission mode. Then, a transmission-mode signal indicating that the communication mode has been switched from the standby mode to the transmission mode is output to the wireless transmitter unit 206, the LED control unit 209, and the wireless receiver unit 211.

The speech-quality evaluation unit 208 evaluates the speech quality of the noise-cancelled signal input from the noise-cancellation processing unit 204 that is a speech signal to be transmitted from the wireless transmitter unit 206. Then, the speech-quality evaluation unit 208 outputs a speech-quality signal that indicates an evaluation result of speech quality to the LED control unit 209.

In this embodiment, the speech-quality evaluation unit 208 determines whether the speech quality of a speech signal to be transmitted from the wireless transmitter unit 206 is good or bad according to various factors, such as, a noisy environment or not, noise cancellation at the noise-cancellation processing unit 204 effective or not, and so on.

The speech-quality evaluation unit 208 may determine whether the noise cancellation is effective or not based on the level of attenuation of the first speech signal from the main microphone 201, that has undergone the noise cancellation process at the noise-cancellation processing unit 204. In this case, the speech-quality evaluation unit 208 calculates the level of attenuation of the first speech signal from the main microphone 201 after the noise cancellation process and determines that the noise cancellation is effective when the level of attenuation is equal to or higher than a specific threshold level. In detail, the speech-quality evaluation unit 208 compares average power of the first speech signal before the noise cancellation process and average power of a speech signal (noise-cancelled signal) after the noise cancellation process to determine whether the noise cancellation is effective based on a comparison result. This technique is based on the fact that a sound picked up by the main microphone 201 is a mixture of a user's voice sound and the surrounding noise and, if there is a specific level of attenuation or higher, it can be determined that the surrounding noise has been effectively suppressed.

The LED control unit 209 that corresponds to the light-emission control unit 105 in FIG. 1 supplies a drive current to the LED (a light-emitting device) 201 to control its light emission state, based on the transmission-mode signal and the speech-quality signal from the PTT unit 207 and the speech-quality evaluation unit 208, respectively.

The wireless receiver unit 211 receives a speech signal transmitted from another communication apparatus. While receiving the transmission-mode signal from the PTT unit 207, the wireless receiver unit 211 does not receive a speech signal because the current communication mode is the transmission mode. The wireless receiver unit 211 decodes a received speech signal and outputs the decoded speech signal to the speaker 212. The speaker 212 outputs the decoded speech signal as a voice sound.

Explained next is a speech-quality evaluation process performed by the communication apparatus 200 with respect to a flowchart of FIG. 5.

The speech-segment determination unit 203 performs a speech-segment determination process to determine whether a user is talking into the communication apparatus 200 based on the first speech signal input from the main microphone 201 (step S201). If no speech segment is detected (No in step S201), the process returns to step S201 to continue the speech-segment determination process. On the other hand if a speech segment is detected (Yes in step S201), the speech-quality evaluation unit 208 performs the following signal-power calculation process (steps S202 to S204).

Firstly, the speech-quality evaluation unit 208 calculates average power per frame of the second speech signal input from the sub-microphone 202 (step S202). Then, the speech-quality evaluation unit 208 calculates average power per frame of the first speech signal input from the main microphone 201 before the noise cancellation process (step S203). Next, the speech-quality evaluation unit 208 calculates average power per frame of the noise-cancelled signal input from the noise-cancellation processing unit 204 after the noise cancellation process (step S204).

Thereafter, the speech-quality evaluation unit 208 determines whether the average power per frame of the second speech signal obtained in step S202 is equal to or higher than a specific threshold level Pth1 (step S205).

If it is determined that the average power per frame of the second speech signal is not equal to or higher than the threshold level Pth1 (No step S205), it is determined that the speech quality is good (step S208). This evaluation is based on a presumption that if the average power per frame of the second speech signal is lower than the threshold level Pth1, the communication apparatus 200 is being used in a quiet environment because a sound picked up by the sub-microphone 202 is mainly the surrounding noise. Therefore, it can be determined that the speech quality is good without affected by the surrounding noise.

On the other hand, if it is determined that the average power per frame of the second speech signal is equal to or higher than the threshold level Pth1 (Yes in step S205), the speech-quality evaluation unit 208 compares the average power per frame of the first speech signal before the noise cancellation process obtained in step S203 and the average power per frame of the noise-cancelled signal after the noise cancellation process obtained in step S204 (step S206).

If it is determined that a power ratio of the noise-cancelled signal to the first speech signal is higher than a specific threshold level Pth2 (No in step S206), it is determined that the speech quality is bad (step S209). This evaluation is based on a presumption that if the power ratio is higher than the threshold level Pth2, the surrounding noise has a specific power or more and there is no variation in the power before and after the noise cancellation process, and hence the noise cancellation is not effective.

On the other hand, if it is determined that the power ratio of the noise-cancelled signal to the first speech signal is equal to or lower than the threshold level Pth2 (Yes in step S206), the speech-quality evaluation unit 208 determines whether the average power per frame of the noise-cancelled signal after the noise cancellation process is equal to or higher than a specific threshold level Pth3 (step S207).

If it is determined that the average power per frame of the noise-cancelled signal is not equal to or higher than the threshold level Pth3 (No in step S207), it is determined that the speech quality is bad (step S209). This evaluation is based on a presumption that if the average power per frame of the noise-cancelled signal is lower than the threshold level Pth3, a user's voice sound is also affected by the noise cancellation process, so that the speech quality is bad and hence it is difficult for the user's voice sound to be clearly heard at another communication apparatus when the voice sound is transmitted thereto.

On the other hand, if it is determined that the average power per frame of the noise-cancelled signal is equal to or higher than the threshold level Pth3 (Yes in step S207), it is determined that a preferable sound level is maintained and hence the speech quality is good (step S208).

The good evaluation result in step S208 or the bad evaluation result in step S209 is output to the LED control unit 209, as the speech-quality signal indicating the speech quality.

Figure 2:
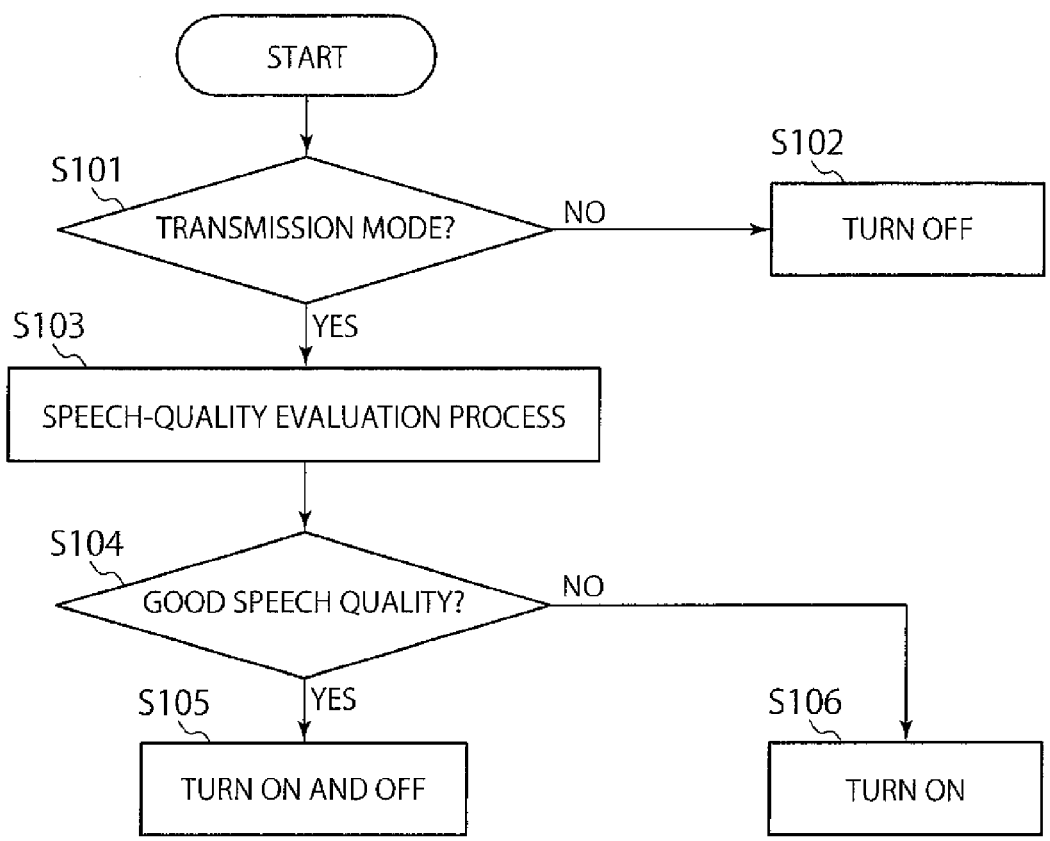
FIG. 2 is a flowchart showing an operation of the communication apparatus according to the first embodiment of the present invention.

In the same manner as shown in FIG. 2 in first embodiment, the LED control unit 209 determines whether the current communication mode is the transmission mode based on the transmission-mode signal from the PTT unit 207. Moreover, in the same manner as shown in FIG. 2, the light-emission control unit 105 determines whether a speech signal to be transmitted by the transmitter unit 102 has a good speech quality based on an evaluation result indicated by the speech-quality signal from the speech-quality evaluation unit 103.

Based on a table shown in FIG. 6 that lists communication modes, speech-quality evaluation results, and LED states, the LED control unit 209 controls LED 210, as follows.

When the PTT unit 207 is pushed so that the communication mode is the transmission mode and the speech quality is evaluated as good, the LED control unit 209 supplies a drive current to the LED 210 to put the LED 210 in a repeated turn-on-and-off state that indicates a normal transmission mode with a good speech quality.

On the other hand, when the PTT unit 207 is pushed so that the communication mode is the transmission mode and the speech quality is evaluated as bad, the LED control unit 209 supplies a drive current to the LED 210 to put the LED 210 in a turn-on state that indicates the necessity of improvement in speech quality. Moreover, when the PTT unit 207 is pushed so that the communication mode is the transmission mode, however, no speech-quality signal is input, the LED control unit 209 supplies a drive current to the LED 210 to put the LED 210 in a turn-on state that indicates the transmission mode. There is a case in which the speech-segment determination unit 203 does not detect a speech segment if no speech-quality signal is input. In this case, the speech-quality evaluation process shown in FIG. 5 does not start so that the speech-quality evaluation unit 208 does not output a speech-quality signal to the LED control unit 209. When the PTT unit 207 is pushed to output the transmission mode, however, no speech-quality signal is input, the LED control unit 209 supplies a drive current to the LED 210 to put the LED 210 in a turn-on state that indicates that although the communication mode is the transmission mode, a user is not talking into the communication apparatus 200 which is a duration of a non-speech segment.

As described above, in this embodiment, the emission state of the LED 210 during a non-speech segment in the transmission mode and the emission state of the LED 210 during a speech segment with a bad speech quality in the transmission mode are controlled in the same manner, that is, the LED 210 is put in a turn-on state in both cases. This LED control technique makes a user visually recognize that his or her voice sound is not appropriately input to the communication apparatus 200.

When a user visually recognizes that the emission state of the LED 210 is not switched from the turn-on state to the repeated turn-on-and-off state although the user is talking into the communication apparatus 200, the user recognizes that the communication apparatus 200 is not used appropriately. Then, the user tries to change the turn-on state of the LED 210 to the repeated turn-on-and-off state by changing the way of holding the main microphone 201, the direction in which the user is talking into the main microphone 201, the distance between the user's mouth to the main microphone 201, etc. Accordingly, with the change in emission state of the LED 210, the user can be instructed to improve the use of the communication apparatus 200, thereby improving the speech quality of a speech signal to be transmitted to another communication apparatus.

On the other hand, when the PTT unit 207 is not pushed, so that the communication mode is not the transmission mode but the standby mode, the LED control unit 209 supplies no drive current to the LED 210 so that the LED 210 remains in the turn-off state.

As described above, the communication apparatus according to the second embodiment is provided with the two microphones and has the noise cancellation function to a speech signal to be transmitted so that a user's voice sound is not drown out by the surrounding noise, thereby achieving transmission of a clear sound to another communication apparatus even if the level of the surrounding noise is high.

Nevertheless, even if a communication apparatus is equipped with a noise cancellation function, it could happen that the noise cancellation function does not work effectively so that it causes a bad speech quality to a speech signal to be transmitted to another communication apparatus. Especially, in the case of a simplex communication apparatus that cannot perform transmission and reception at the same time, no information of a bad speech quality can be sent from another communication apparatus while a user is talking into the simplex communication apparatus. It could therefore happen that the user is continuously talking into the simplex communication apparatus without recognizing a bad speech quality.

In order to solve such a problem discussed above, in the communication apparatus 200 according to the second embodiment, the speech quality to be felt by a person who receives a voice sound transmitted from the communication apparatus 200 is assumed based on the determination of whether the noise cancellation function is working effectively with the combination of determination on the average power of speech signals from the main microphone and the sub-microphone, and the power ratio of the noise-cancelled signal to the speech signal from the main microphone. Then, if it is determined that the speech quality requires improvement, the LED 210 can be used effectively to notify a user of the necessity of improvement in speech quality.

Third Embodiment

The communication apparatus 200 according to the second embodiment performs the speech quality evaluation depending on whether the noise cancellation function is working effectively. With this technique, it is possible to perform more reliable speech quality evaluation than speech quality evaluation based on the main-microphone volume level.

However, there are cases in which the communication apparatus 200 according to the second embodiment erroneously determines that the noise cancellation function is working effectively even if it is not working effectively. One case is that the main microphone 201 of the noise cancellation microphone unit 220 (FIG. 3) of the communication apparatus 200 is not positioned in front of a user. In this case, it could happen that the voice component of a user's voice sound is picked up at a higher level by the sub-microphone 202 provided on the rear face of the noise-cancellation microphone unit 202 as shown in (b) of FIG. 3, in addition to the main microphone 201. The noise-cancellation processing unit 204 (FIG. 4) performs the noise cancellation process by using a signal from the sub-microphone 202 as a reference signal. Thus, in the above case, it could happen that a voice component picked up by the sub-microphone 202 is erroneously determined as a noise component, so that a voice component which should remain is inevitably eliminated from a speech signal output from the main microphone 201.

Moreover, in the above case, if there is an intense noise source in front of a user, instead of the noise-cancellation microphone unit 220 as shown in (a) of FIG. 3, a noise component from the noise source is picked by the main microphone 201, and hence the level of signal power of a noise-cancelled signal output from the noise-cancellation processing unit 204 may exceed a threshold level. Thus, it could happen that through the evaluations in steps S205 to S207, it is erroneously determined that the speech quality is good, as a final result.

In order to solve such a problem discussed above, the present invention provides a communication apparatus as a third embodiment that evaluates the speech quality reliably and notifies an evaluation result to a user, even in the cases discussed above.

Figure 7:
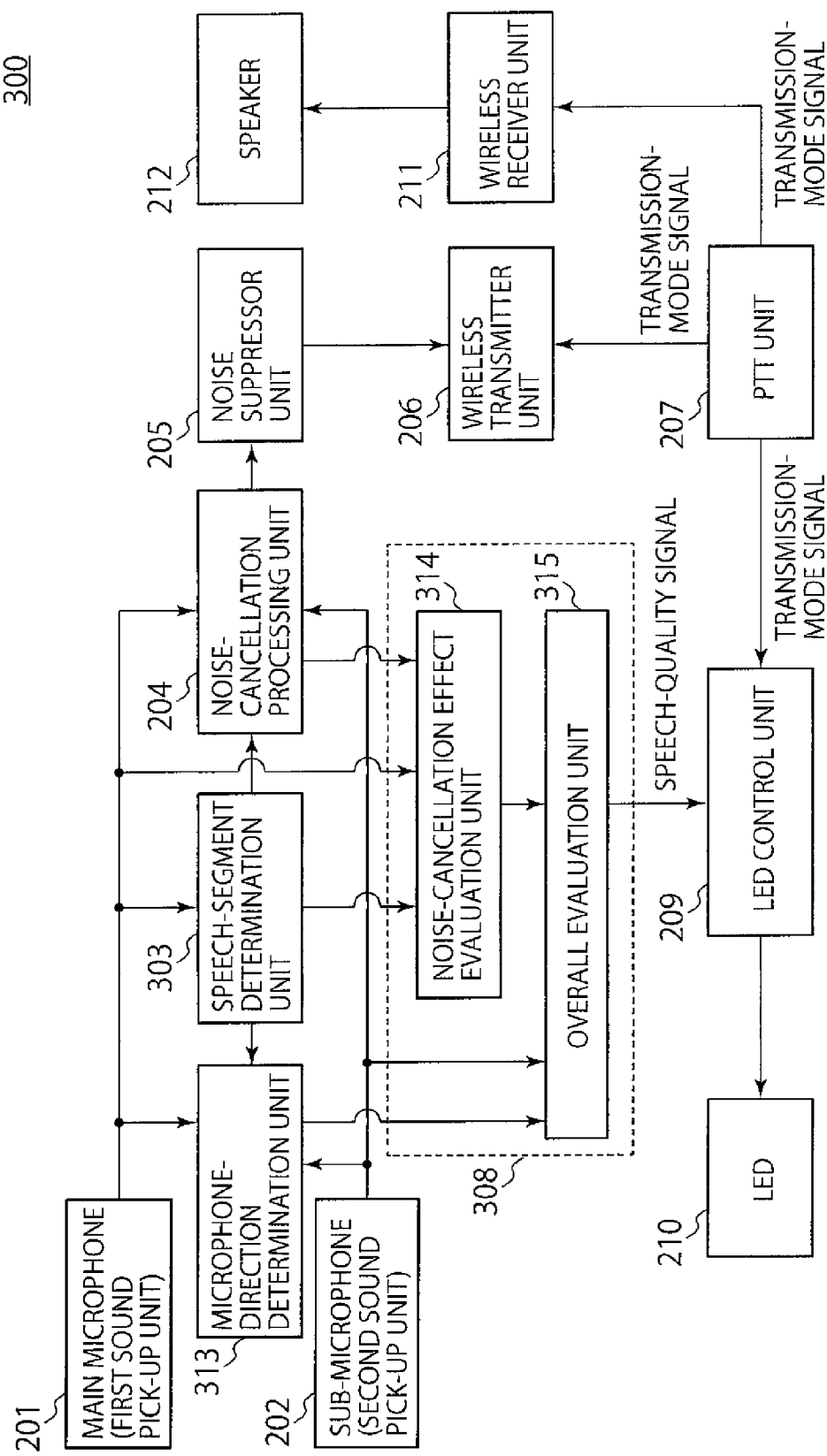
FIG. 7 is a block diagram schematically showing the configuration of a communication apparatus according to a third second embodiment of the present invention.

FIG. 7 is a block diagram schematically showing the configuration of a communication apparatus 300 according to the third second embodiment of the present invention.

Figure 4:
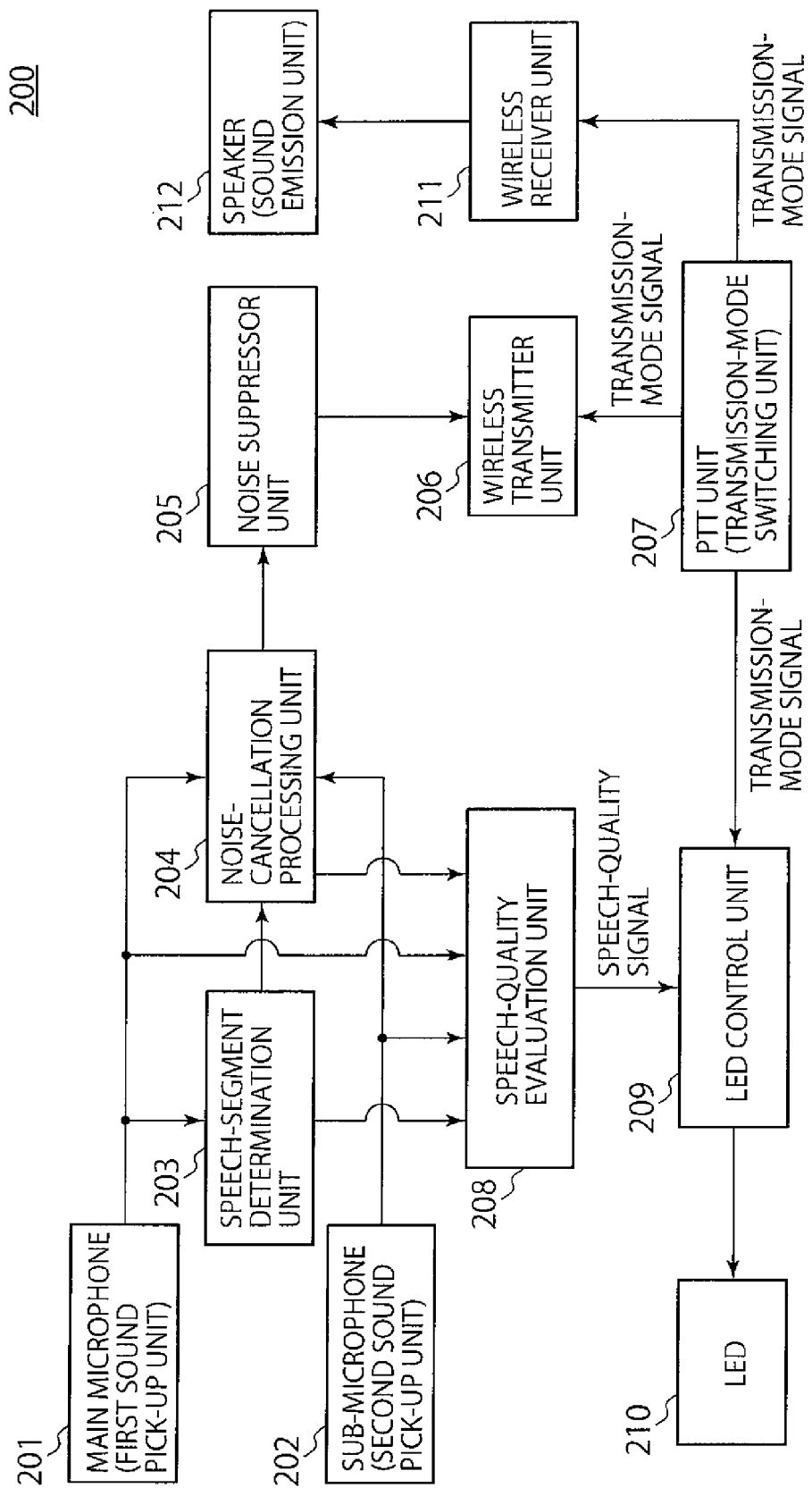
FIG. 4 is a block diagram schematically showing the configuration of the communication apparatus according to the second embodiment of the present invention.

As shown in FIG. 7, the communication apparatus 300 is provided with a speech-segment determination unit 303, a microphone-direction determination unit 313, and a speech-quality evaluation unit 308 that is equipped with a noise-cancellation effect evaluation unit 314 and an overall evaluation unit 315, in addition to the units 201, 202, 204, 205, 206, 207, 209, 210, 211, and 212 that correspond to those shown in FIG. 4, respectively. The communication apparatus 300 has the same exterior appearance as the communication apparatus 200 as shown in FIG. 3.

The speech-segment determination unit 303 determines whether or not a first speech signal input from the main microphone 201 is a speech segment of a user's voice sound by way of spectrum analysis with conversion of the first speech signal into a signal component in unit of a specific length in the frequency domain. The speech-segment determination unit 303 outputs a result of speech segment determination to the noise-cancellation processing unit 204, the microphone-direction determination unit 313, and the noise-cancellation effect evaluation unit 314.

While the speech-segment determination unit 303 is determining that the first speech signal input from the main microphone 201 is a speech segment, the microphone-direction determination unit 313 detects a phase difference between the first speech signal output from the main microphone 201 and a second speech signal output from the sub-microphone 202. Then, the microphone-direction determination unit 313 detects a direction of the main microphone 201 (a main-microphone direction, hereinafter) with respect to a user based on the phase difference. Then, the microphone-direction determination unit 313 outputs a determination result on the main-microphone direction to the overall evaluation unit 315, as a first evaluation result.

Figure 8:
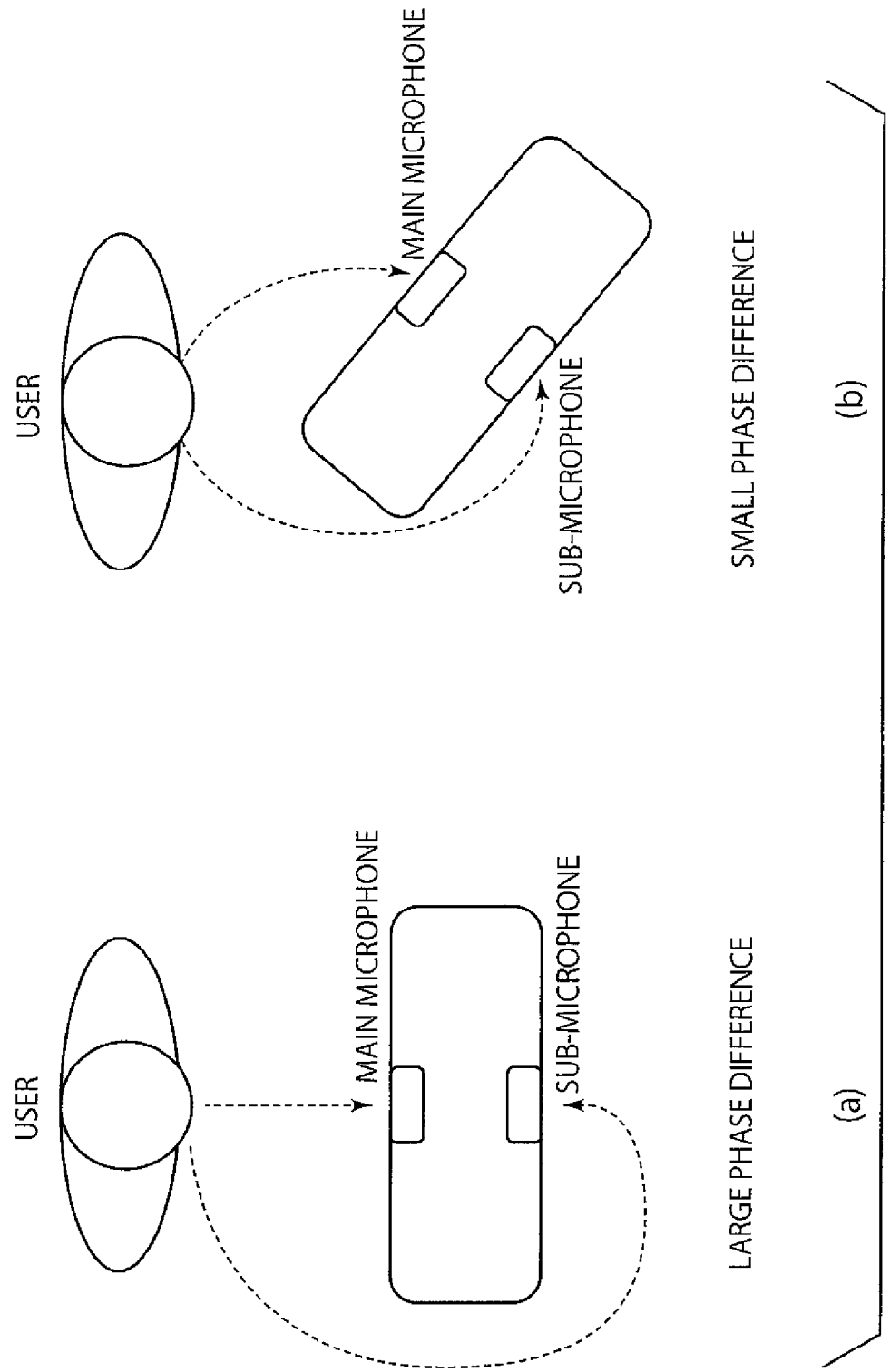
FIG. 8 is a view illustrating a direction-to-phase relationship of a communication apparatus with respect to a user.

FIG. 8 is a view illustrating a direction-to-phase relationship of the communication apparatus 300 with respect to a user, or a phase difference between voice sounds depending on the main-microphone direction.

As shown in (a) of FIG. 8, when a user faces the communication apparatus 300 at the front side with the main microphone 201 attached thereto, in a normal used condition, there is a large phase difference between a voice sound that is picked up by the main microphone 201 through a straight path and a voice sound that is picked up by the sub-microphone 202 through a roundabout path. On the other hand, as shown in (b) of FIG. 8, when the communication apparatus 300 is inclined toward a user, there is a small phase difference between voice sounds picked up by the main microphone 201 and the sub-microphone 202 due to a shorter distance between the user's mouth and the two microphones. In particular, when the main microphone 201 attached to the communication apparatus 300 at the front side is inclined toward a user at 90 degrees, the distances from the user's mouth to the main microphone 201 and to the sub-microphones 202 are almost equal to each other, so that the phase difference is almost zero.

Under consideration of the change in phase difference depending on the positional relationship between a user and the communication apparatus 300 discussed above, the microphone-direction determination unit 313 compares a phase difference detected between the first and second speech signals output from the main microphone 201 and the sub-microphone 202, respectively, with a specific threshold value. When the phase difference is smaller than the specific threshold value, the microphone-direction determination unit 313 assumes that the main-microphone direction is not toward a user, such as shown in (b) of FIG. 8 and determines that the user is not using the communication apparatus 300 appropriately. On the other hand, when the phase difference is equal to or larger than the specific threshold value, the microphone-direction determination unit 313 assumes that the main-microphone direction is toward a user, such as shown in (a) of FIG. 8, and determines that the user is using the communication apparatus 300 appropriately.

The noise-cancellation effect evaluation unit 314 determines whether the noise cancellation function of the noise-cancellation processing unit 204 is working effectively and outputs an evaluation result to the overall evaluation unit 315, as a second evaluation result.

Figure 5:
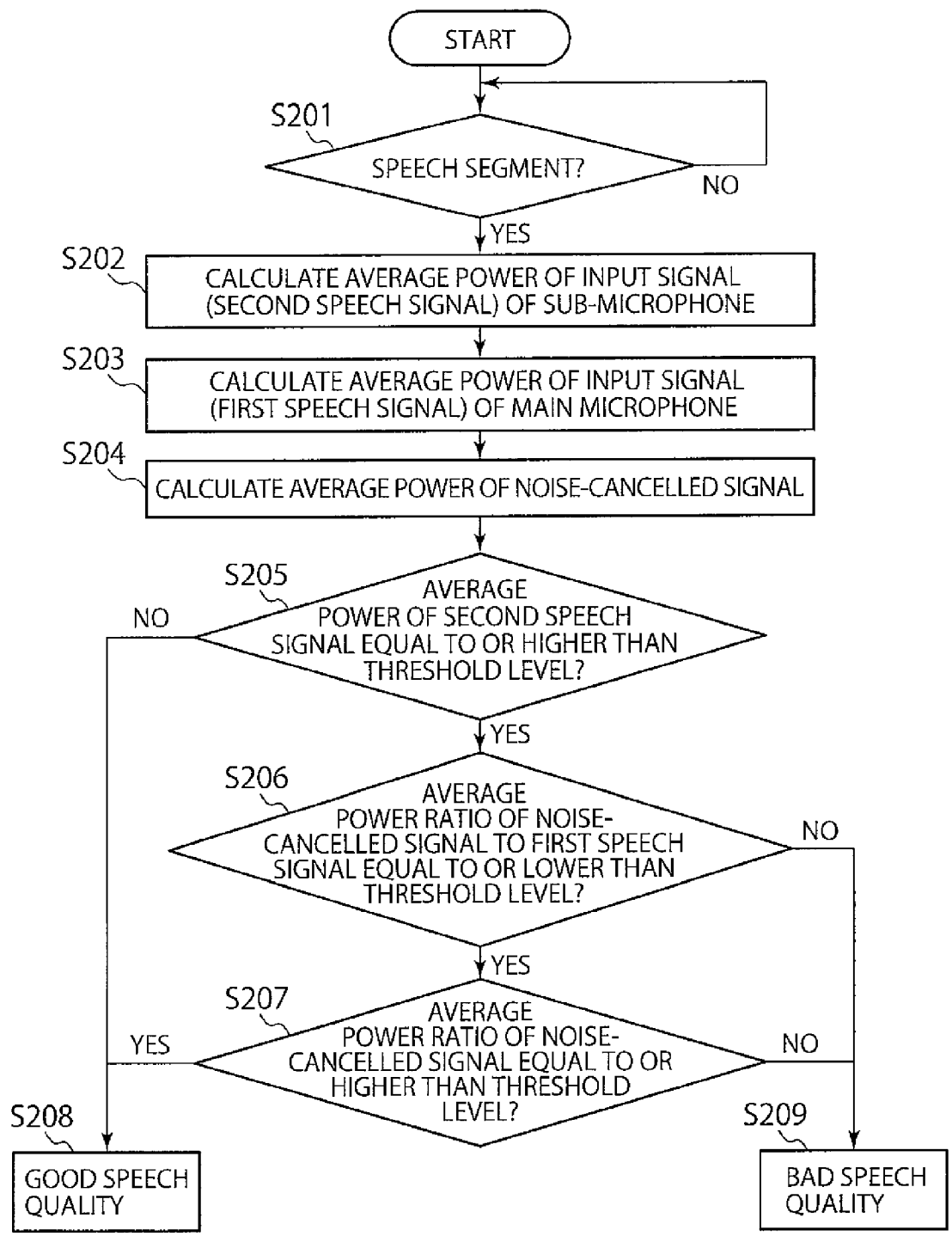
FIG. 5 is a flowchart showing a speech-quality evaluation process according to the second embodiment of the present invention.

The overall evaluation unit 315 performs overall evaluation of: the average power of the second speech signal from the sub-microphone 202 in the same manner as the speech-quality evaluation unit 208 described with respect to FIG. 5; the first evaluation result from the microphone-direction determination unit 313; and the second evaluation result from the noise-cancellation effect evaluation unit 314, to determine the speech quality of a speech signal to be transmitted from the wireless transmitter unit 206. The speech quality of a voice sound comprehensively determined by the overall evaluation unit 315 is output to the LED control unit 209, as a speech-quality signal, for emission control of the LED 210.

Figure 9:
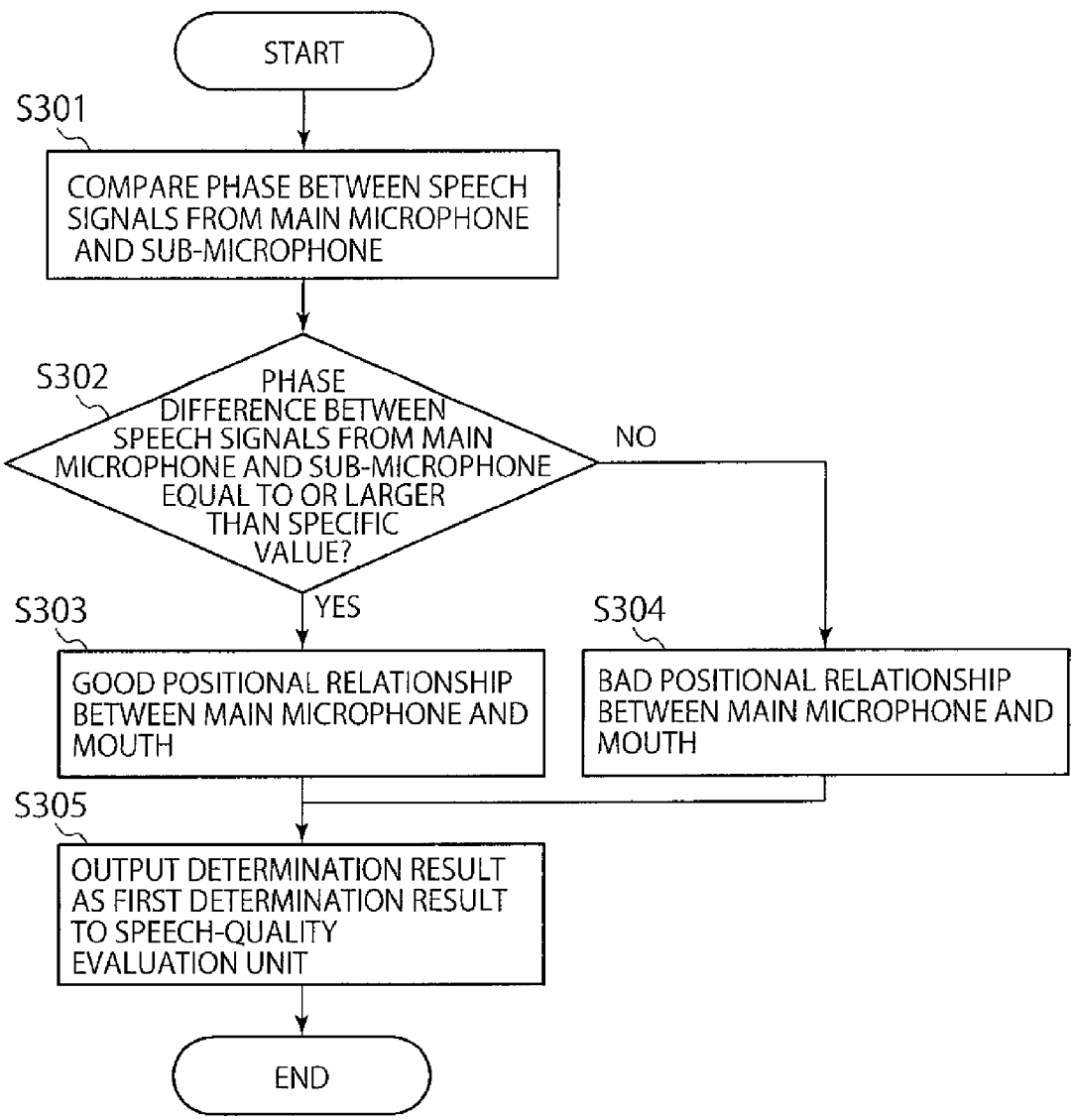
FIG. 9 is a flowchart showing a microphone-direction determination process for a main microphone according to the third embodiment of the present invention.

Explained next is a microphone-direction determination process performed by the microphone-direction determination unit 313, with respect to a flowchart of FIG. 9.

The microphone-direction determination unit 313 compares the phases of first and second speech signals input from the main microphone 201 and the sub-microphone 202, respectively, to detect a phase difference therebetween (step S301). Then, the microphone-direction determination unit 313 compares the phase difference between the first and second speech signals with a specific threshold value to determine whether the phase difference is equal to or larger than the specific threshold value (step S302). The comparison of phase difference is done based on the fact that the change in orientation of the main microphone 201 directly reflected in the phase difference as discussed with reference to FIG. 8.

If the phase difference is equal to or larger than the specific threshold value (Yes in step S302), the microphone-direction determination unit 313 assumes that the positional relationship between the main microphone 201 and the user's mouth is good, such as shown in (a) of FIG. 8, and determines that the user is using the communication apparatus 300 appropriately. On the other hand, if the phase difference is smaller than the specific threshold value (No in step S302), the microphone-direction determination unit 313 assumes that the positional relationship between the main microphone 201 and the user's mouth is bad, such as shown in (b) of FIG. 8, and determines that the user is using the communication apparatus 300 inappropriately.

Then, the microphone-direction determination unit 313 outputs a determination result obtained in step S303 or S304 to the overall evaluation unit 315 of the speech-quality evaluation unit 308, as a first determination result that indicates whether or not the main-microphone direction is appropriate, that is, whether or not the communication apparatus 300 is used appropriately.

Figure 10:
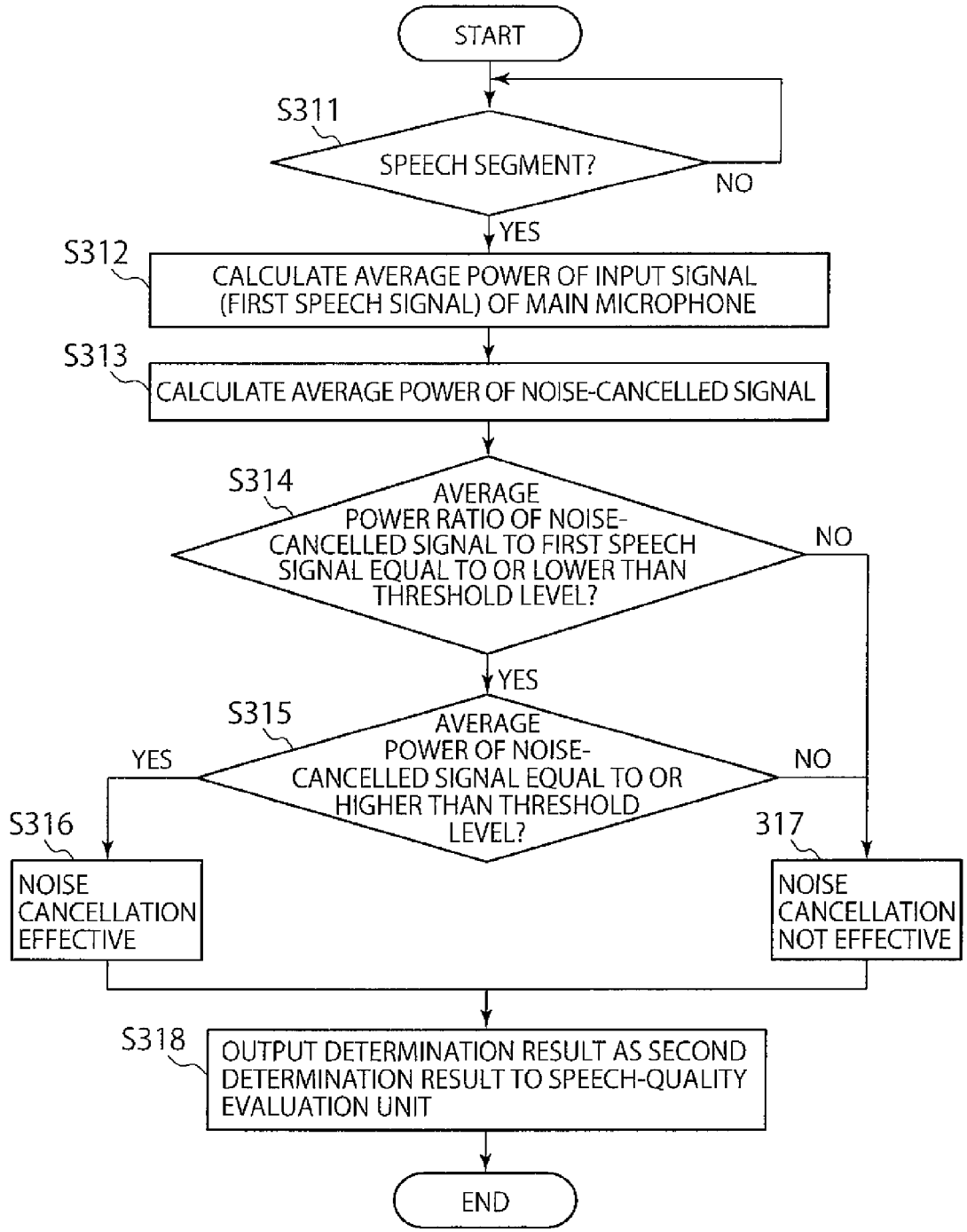
FIG. 10 is a flowchart showing a noise-cancellation effect evaluation process according to the third embodiment of the present invention.

Explained next is a noise-cancellation effect evaluation process performed by the noise-cancellation effect evaluation unit 314, with respect to a flowchart of FIG. 10.

The noise-cancellation effect evaluation unit 314 is in a waiting mode to receive a speech-segment indication signal that is generated by the speech-segment determination unit 303 when it determines that a first speech signal input from the main microphone 201 is a speech segment (step S311). When the speech-segment indication signal is input (Yes in step S311), the noise-cancellation effect evaluation unit 314 performs step S312, whereas if not (No in step S311), it is still in the waiting mode to receive the speech-segment indication signal.

In step S312, the noise-cancellation effect evaluation unit 314 calculates average power of a first speech signal from the main microphone 201 for one frame before the noise-cancellation processing unit 204 performs the noise cancellation process per one frame (step S312). Next, the noise-cancellation effect evaluation unit 314 calculates average power of a noise-cancelled signal from the noise-cancellation processing unit 204 (step S313).

Thereafter, the noise-cancellation effect evaluation unit 314 compares the average power of the first speech signal before the noise cancellation process and the average power of the noise-cancelled signal after the noise cancellation process to determine whether an average power ratio of the noise-cancelled signal to the first speech signal is equal to or lower than a threshold level Pth2 (step S314).

If the average power ratio is higher than the threshold level Pth2 (No in step S314), the noise-cancellation effect evaluation unit 314 determines that the noise cancellation function is not working effectively (step S317). On the other hand, if the average power ratio is equal to or lower than the threshold level Pth2 (Yes in step S314), the noise-cancellation effect evaluation unit 314 determines whether the average power of the noise-cancelled signal is equal to or higher than a threshold level Pth3 (step S315).

If the average power of the noise-cancelled signal is lower than the threshold level Pth3 (No in step S315), the noise-cancellation effect evaluation unit 314 determines that the noise cancellation function is not working effectively (step S317). On the other hand, if the average power of the noise-cancelled signal is equal to or higher than the threshold level Pth3 (Yes in step S315), the noise-cancellation effect evaluation unit 314 determines that the noise cancellation function is working effectively (step S316).

Then, the noise-cancellation effect evaluation unit 314 outputs an evaluation result in step S316 or S317 to the overall evaluation unit 315, as a second determination result (step S318).

As described above, the noise-cancellation effect evaluation unit 314 determines whether or not the noise cancellation function is working effectively by using the signals before and after the noise cancellation process performed by the noise-cancellation processing unit 204. In this embodiment, if it is determined that the noise cancellation function is working effectively, it means that a surrounding-noise component is effectively eliminated from a speech signal that is a mixture of a voice component and the surrounding-noise component so that much of the voice component remains in the speech signal.

Therefore, when a surrounding-noise component is effectively eliminated from a speech signal by the noise cancellation process, signal power Pnc of a speech signal after the noise cancellation process is lower than signal power Pic of a speech signal before the noise cancellation process by the degree of signal power of a surrounding-noise component. Accordingly, the determination of whether or not the noise cancellation function is working effectively is made by comparing the signal power Pic and Pnc before and after the noise cancellation process, as explained below.

There are two ways for the noise-cancellation effect evaluation unit 314 to determine whether or not the noise cancellation function is working effectively.

One way is to determine whether the signal power Pin and Pnc meet either the following relational expression (1-a) or (1-b):

$$(Pnc/Pin) < Pth2 \tag{1-a}$$

$$(Pnc - Pin) > Pth2' (Pth2' \ne Pth2) \tag{1-b}$$

Another way is, after the evaluation with the relational expression (1-a) or (1-b) is performed, to determine whether the signal power Pnc meets the following relational expression (2):

$$Pnc > Pth3 \tag{2}$$

With the relational expression (2), it can be determined whether a voice component that has to remain in a speech signal has been eliminated from the speech signal, in addition to a surrounding-noise component.

Figure 11:
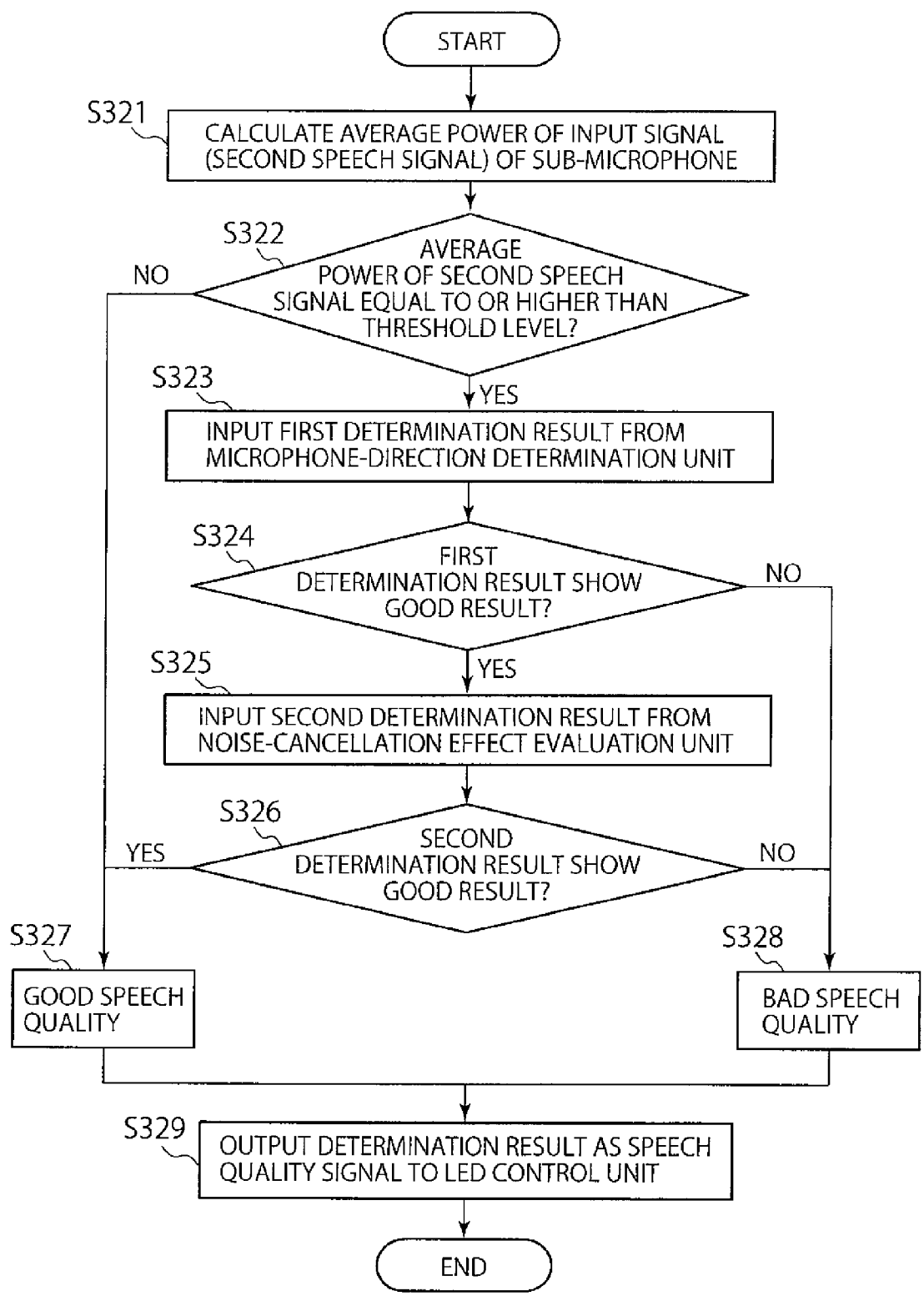
FIG. 11 is a flowchart showing an overall evaluation process concerning the speech quality according to the third embodiment of the present invention.

Explained next is an overall evaluation process performed by the overall evaluation unit 315, with respect a flowchart of FIG. 11.

The overall evaluation unit 315 calculates average power per frame of the second speech signal input from the sub-microphone 202 (step S321). Then, the overall evaluation unit 315 determines whether the average power per frame of the second speech signal is equal to or higher than a specific threshold level Pth1 (step S322).

If it is determined that the average power per frame of the second speech signal is not equal to or higher than the threshold level Pth1 (No step S322), it is determined that the speech quality is good (step S327). This evaluation is based on a presumption that if the average power per frame of the second speech signal is lower than the threshold level Pth1, the communication apparatus 300 is being used in a quiet environment because a sound picked up by the sub-microphone 202 is mainly the surrounding noise. Therefore, it can be determined that the speech quality is good without affected by the surrounding noise.

On the other hand, if it is determined that the average power per frame of the second speech signal is equal to or higher than the threshold level Pth1 (Yes in step S322), the overall evaluation unit 315 receives the first determination result from the microphone-direction determination unit 313 (step S323). Then, the overall evaluation unit 315 determines whether the first evaluation result shows a good result (step S324). If the first evaluation result shows a bad result (No step S324) that indicates a bad positional relationship between the main microphone 201 and the user's mouth as discussed with respect to (b) of FIG. 8, the overall evaluation unit 315 determines that the speech quality is bad (step S328). On the other hand, if the first evaluation result shows a good result (Yes in step S324), the overall evaluation unit 315 receives the second evaluation result from the noise-cancellation effect evaluation unit 314 (step S325).

Then, the overall evaluation unit 315 determines whether the second evaluation result shows a good result (step S326). If the second evaluation result shows a bad result (No in step S326) that indicates that the noise cancellation function is not working effectively, the overall evaluation unit 315 determines that the speech quality is bad (step S328). On the other hand, if the second evaluation result shows a good result (Yes in step S326), that is, the noise cancellation function is working effectively, the overall evaluation unit 315 determines that the speech quality is good (step S327). Then, the overall evaluation unit 315 outputs a speech-quality signal that carries information on the result in step S327 or S328 to the LED control unit 209 (step S329).

The noise-cancellation effect evaluation unit 314 may perform the noise-cancellation effect evaluation process only when the noise cancellation process is performed or should be performed. For example, the noise-cancellation effect evaluation unit 314 may perform the noise-cancellation effect evaluation process when the second speech signal from the sub-microphone 202 has power equal to or higher than a specific level or a flag is set to indicate that the noise cancellation process is being performed. The noise-cancellation processing unit 204 may perform the noise cancellation process when the second speech signal has power equal to or higher than a specific level. The noise-cancellation processing unit 204 may also perform the noise cancellation process depending on a voice incoming direction of a voice sound based on the phase difference between the first and second speech signals.

Explained next is an operation of the LED control unit 209 with respect to the flowchart shown in FIG. 2 because the operation of the LED control unit 209 of the third embodiment is similar to that of the light-emission control unit 105 of the first embodiment.

The LED control unit 209 checks the current communication mode at a specific interval of, for example, 1/30 seconds, to determine whether the communication mode has been switched to the transmission mode through the PTT unit 207 pushed by a user (step S101). If the PTT unit 207 has not been pushed so that the current communication mode has been set to the standby mode (No in step S101), the LED control unit 209 turns off the light-emitting device 106 with no a drive current supplied thereto (step S102). On the other hand, if the PTT unit 207 has been pushed so that the current communication mode has been set to the transmission mode (Yes in step S101), the LED control unit 209 receives the speech-quality signal from the overall evaluation unit 315 (step S103) to check the speech quality indicated by the speech-quality signal (step S104). If the speech quality is good (Yes in step S104), the LED control unit 209 repeatedly turns on and off the LED 210 with a drive current supplied thereto (step S105). On the other hand, if the speech quality is bad (No in step S104), the light-emission control unit 105 turn on the light-emitting device 106 with a drive current supplied thereto (step S106).

As described above, in the communication apparatus 300 according to the third embodiment, an LED emission state is controlled with overall evaluation of the noise cancellation effect and the main-microphone direction, to effectively notify a user of the speech quality.

Fourth Embodiment

Figure 12:
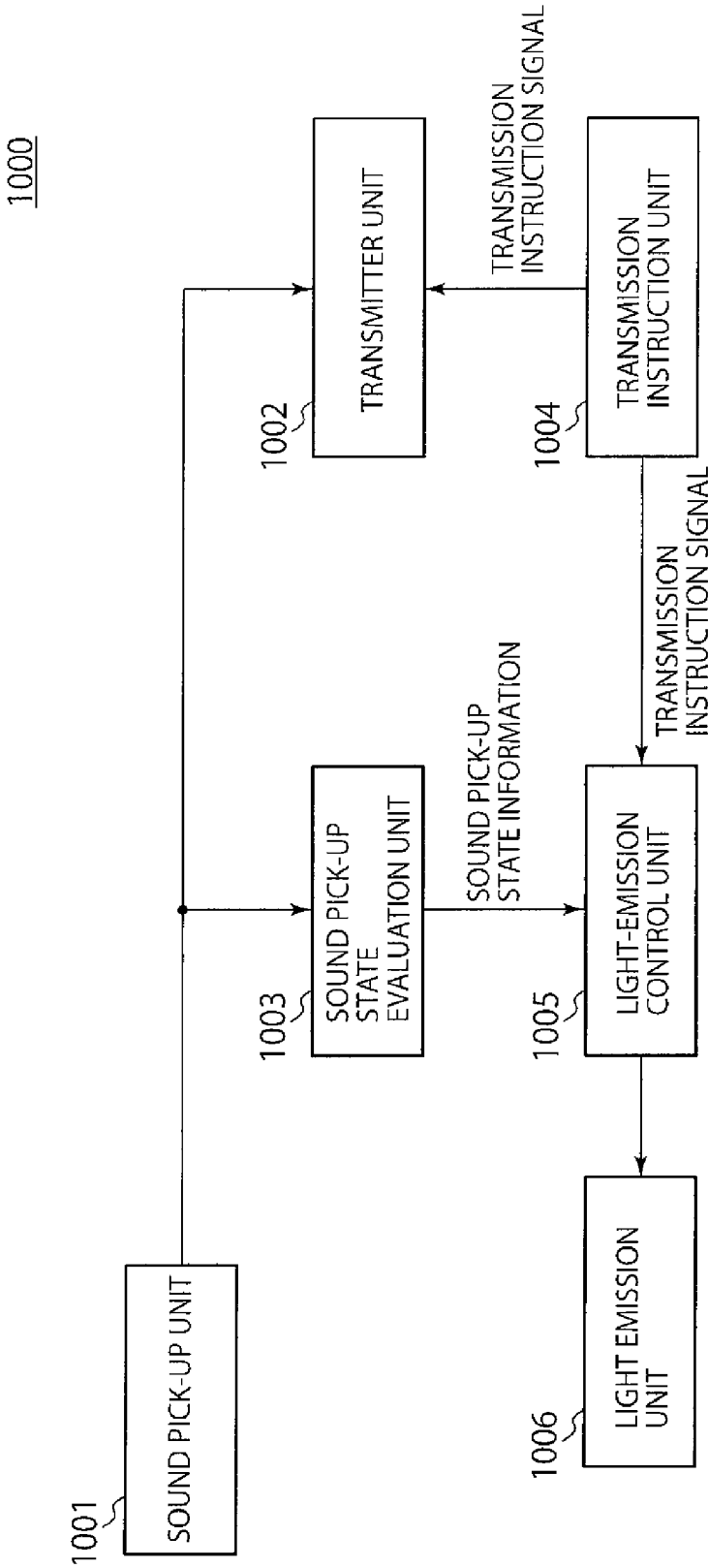
FIG. 12 is a block diagram schematically showing the configuration of an audio input apparatus (a communication apparatus) according to a fourth embodiment of the present invention.

FIG. 12 is a block diagram schematically showing the configuration of an audio input apparatus 1000 according to a fourth embodiment of the present invention.

The audio input apparatus 1000 is provided with a sound pick-up unit 1001, a transmitter unit 1002, a sound pick-up state evaluation unit 1003, a transmission instruction unit 1004, a light-emission control unit 1005, and a light emission unit 1006. The units 1001, 1002, 1005, and 1006 correspond to the units 101, 102, 105, and 107 shown in FIG. 1, respectively.

The sound pick-up unit 1001 picks up a voice sound and generates a speech signal that is output to the transmitter unit 102 and the sound pick-up state evaluation unit 1003. The transmitter unit 102 transmits the speech signal to another communication apparatus while it is receiving a transmission instruction signal from the transmission instruction unit 1004.

The sound pick-up state evaluation unit 1003 evaluates a sound pick-up state of a speech signal to be transmitted from the transmitter unit 1002 based on the speech signal input from the sound pick-up unit 1001. The sound pick-up state to be evaluated by the sound pick-up state evaluation unit 1003 is a feature of the speech signal to be transmitted from the transmitter unit 1002, based the result of determination of a speech segment and evaluation of speech quality. The sound pick-up state evaluation unit 1003 outputs sound pick-up state information that indicates an evaluation result of the sound pick-up state to the light-emission control unit 1005.

The transmission instruction unit 1004 instructs the transmitter unit 1002 to transmit a speech signal. The transmission instruction unit 1004 is connected to a PTT switch. When the PTT switch is pushed, the transmission instruction unit 1004 outputs a transmission instruction signal to the transmitter unit 1002 and the light-emission control unit 1005. When the transmission instruction unit 1004 outputs the transmission instruction signal to the transmitter unit 1002, the communication mode of the audio input apparatus 1000 is switched from the standby mode in which the transmitter unit 1002 does not transmit a speech signal to the transmission mode in which the transmitter unit 1002 transmits a speech signal.

The light-emission control unit 1005 controls the emission state of the light emission unit 1006 to notify a user of how the audio input apparatus 1000 is being used concerning the positional relationship between the user and microphones as discussed with respect to FIG. 8. The light emission unit 1006 in this embodiment is an LED attached to the main frame of the audio input apparatus 1000. The light-emission control unit 1005 controls the emission state of the LED (light emission unit) 1006 based on the transmission instruction signal from the transmission instruction unit 1004 and the sound pick-up state information from the sound pick-up state evaluation unit 1003. In detail, the light-emission control unit 1005 turns on the LED 1006 if the transmission instruction signal is input, a speech segment is detected, and the speech quality is lower than a specific threshold level. Moreover, the light-emission control unit 1005 repeatedly turns on and off the LED 1006 if the transmission instruction signal is input, a speech segment is detected, and the speech quality is equal to or higher the specific threshold level. However, the light-emission control unit 1005 turns off the LED 1006 if no transmission instruction signal is input.

As described above, the audio input apparatus 1100 is provided with the sound pick-up unit 1001 for picking up a voice sound to generate a speech signal, the transmitter unit 1002 for transmitting the speech signal, the transmission instruction unit 1004 for instructing the transmitter unit 1002 to transmit the speech signal, the sound pick-up state evaluation unit 1003 for evaluating a sound pick-up state of the speech signal to be transmitted by the transmitter unit 1002, and the light-emission control unit 1005 for controlling the emission state of the light emission unit 1006. In this embodiment, the light emission unit 1006 is an LED, so that the light-emission control unit 1005 controls the emission state of the LED 1006, among the turn-on state, the turn-off state, and the repeated turn-on-and-off state, based on the sound pick-up state evaluated by the sound pick-up state evaluation unit 1003.

The sound pick-up state evaluation unit 1003 may be equipped with a volume-level measuring device for measuring the volume level of a speech signal input from the sound pick-up unit 1001, as a sound pick-up state of a speech signal to be transmitted from the transmitter unit 1002 to be evaluated. In this case, the light-emission control unit 1005 controls the emission state of the LED 1006 in the following three ways. While the transmission instruction unit 1004 is not instructing the transmitter unit 1002 to transmit a speech signal, the light-emission control unit 1005 turns off the LED 1006. While the transmission instruction unit 1004 is instructing the transmitter unit 1002 to transmit a speech signal, however, the volume level of this speech signal is lower than a specific reference level, the light-emission control unit 1005 turns on the LED 1006. Moreover, while the transmission instruction unit 1004 is instructing the transmitter unit 1002 to transmit a speech signal and the volume level of this speech signal is equal to or higher than the reference level, the light-emission control unit 1005 repeatedly turns on and off the LED 1006.

Control of the emission state of the LED 1006 by the light-emission control unit 1005 will be described in detail.

For the emission-state control, the sound pick-up state evaluation unit 1003 has a speech-segment determination function and a speech-quality evaluation function, like the speech-segment determination unit 203 and the speech-quality evaluation unit 208, respectively, shown in FIG. 4, for evaluating a sound pick-up state of the speech signal to be transmitted by the transmitter unit 1002. In detail, for sound pick-up state evaluation, the sound pick-up state evaluation unit 1003 determines whether a signal input from the sound pick-up unit 1001 is a speech segment. Moreover, for sound pick-up state evaluation, the sound pick-up state evaluation unit 1003 evaluates the speech quality of a speech segment to be transmitted from the transmitter unit 1002. The results of speech-segment determination and speech-quality evaluation are output to the light-emission control unit 1005, as speech-segment information and speech-quality information, respectively, which are expressed as sound pick-up state information in FIG. 12.

Figure 14:
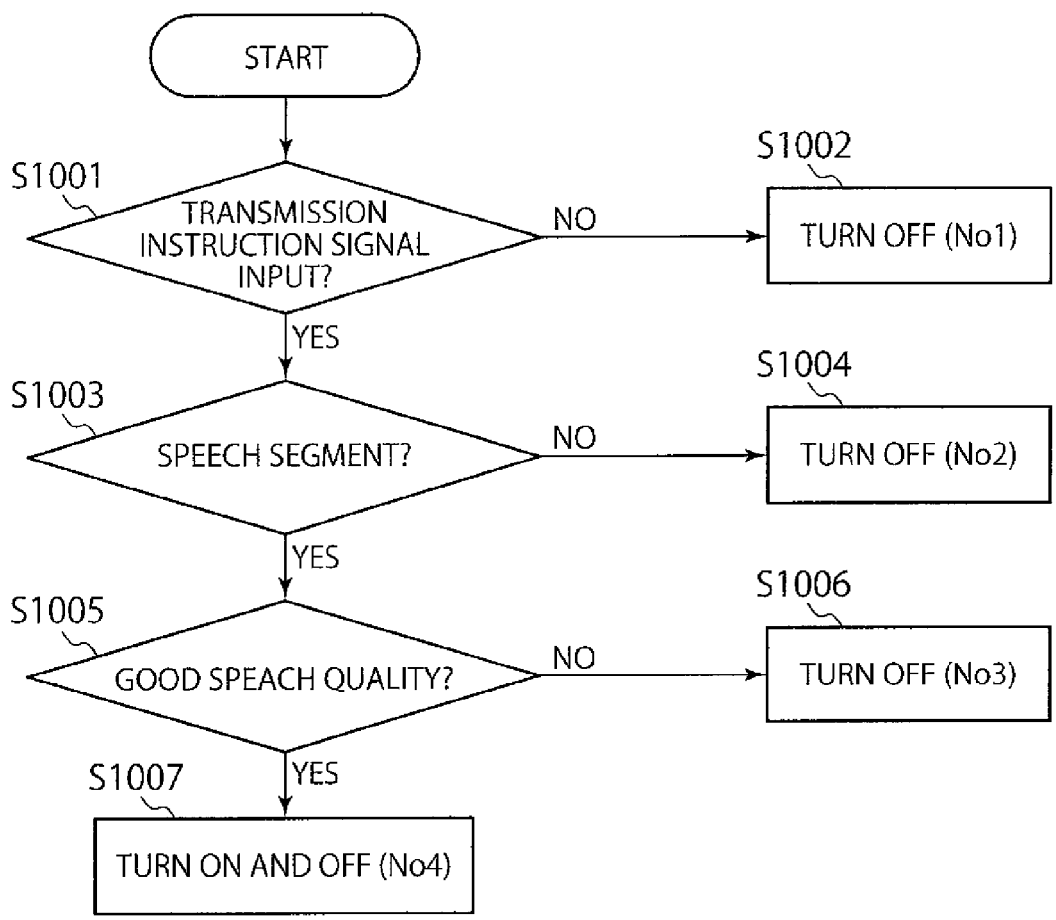
FIG. 14 is a flowchart showing a light-emission control process according to the fourth embodiment of the present invention.

FIG. 13 is a table listing communication modes, sound pick-up state evaluation results, and LED states under control by the light-emission control unit 1005. FIG. 14 is a flowchart showing a light-emission control process to be performed by the light-emission control unit 1005. The light-emission control process will be described with reference to FIGS. 13 and 14.

The light-emission control unit 1005 determines per frame whether a transmission instruction signal is input from the transmission instruction unit 1004 (step S1001). If no transmission instruction signal is input (No in step S1001), the light-emission control unit 1005 determines that the PTT switch connected to the transmission instruction unit 1004 is not pushed so that the transmission instruction unit 1004 does not output a transmission instruction signal, hence the audio input apparatus 1000 is in the standby mode. Then, the light-emission control unit 1005 turns off the LED 1006 as shown in No. 1 of FIG. 13 (step S1002).

On the other hand, if a transmission instruction signal is input (Yes in step S1001), the light-emission control unit 1005 determines whether the speech segment information input from the sound pick-up state evaluation unit 1003 indicates a speech segment (step S1003). If the speech segment information does not indicate a speech segment (No in step S1003), the light-emission control unit 1005 determines that the PTT switch is being pushed so that the transmission instruction unit 1004 outputs a transmission instruction signal, hence the audio input apparatus 1000 is in the transmission mode, however, a user is not talking into the audio input apparatus 1000. Then, the light-emission control unit 1005 turns on the LED 1006 as shown in No. 2 of FIG. 13 (step S1004).

On the other hand, if the speech segment information indicates a speech segment (Yes in step S1003), the light-emission control unit 1005 determines whether the speech quality information input from the sound pick-up state evaluation unit 1003 indicates a good speech quality (step S1005). If the speech quality is not good (No in step S1005), the light-emission control unit 1005 determines that, although a user is talking into the audio input apparatus 1000, the used condition of the audio input apparatus 1000 discussed with respect to FIG. 8 is not appropriate so that a good speech quality is not maintained. Then, the light-emission control unit 1005 turns on the LED 1006 as shown in No. 3 of FIG. 13 (step S1006). On the other hand, if the speech quality is good (Yes in step S1005), the light-emission control unit 1005 determines that the used condition of the audio input apparatus 1000 is appropriate so that a good speech quality is maintained. Then, the light-emission control unit 1005 repeatedly turns on and off as shown in No. 4 of FIG. 13 (step S1007).

As described above, in the audio input apparatus (the communication apparatus) 1000 according to the fourth embodiment, the sound pick-up state evaluation unit 1003 determines whether a signal input from the sound pick-up unit 1001 is a speech segment and evaluates the speech quality of a speech signal to be transmitted from the transmitter unit 1002, to evaluate a sound pick-up state. With the evaluation of a sound pick-up state, the light-emission control unit 1005 controls the LED 1006 in the manner described below.

When the transmission instruction unit 1004 does not instruct the transmitter unit 1002 to transmit a speech signal, the light-emission control unit 1005 turns off the LED 1006. When the transmission instruction unit 1004 instructs the transmitter unit 1002 to transmit a speech signal, however, a signal input from the sound pick-up unit 1001 is not a speech segment, the light-emission control unit 1005 turns on the LED 1006. When the transmission instruction unit 1004 instructs the transmitter unit 1002 to transmit a speech signal, a signal input from the sound pick-up unit 1001 is a speech segment, and the speech quality is lower than a specific threshold level, the light-emission control unit 1005 turns on the LED 1006. Moreover, when the transmission instruction unit 1004 instructs the transmitter unit 1002 to transmit a speech signal, a signal input from the sound pick-up unit 1001 is a speech segment, and the speech quality is equal to or higher than the specific threshold level, the light-emission control unit 1005 repeatedly turns on and off the LED 1006.

As described above, the light-emission control unit 1005 controls the emission state of the light emission unit 1006 (that is the on-off state of the LED) according to the light-emission control process shown in FIG. 14, to properly notify a user of the speech quality.

Fifth Embodiment

Figure 15:
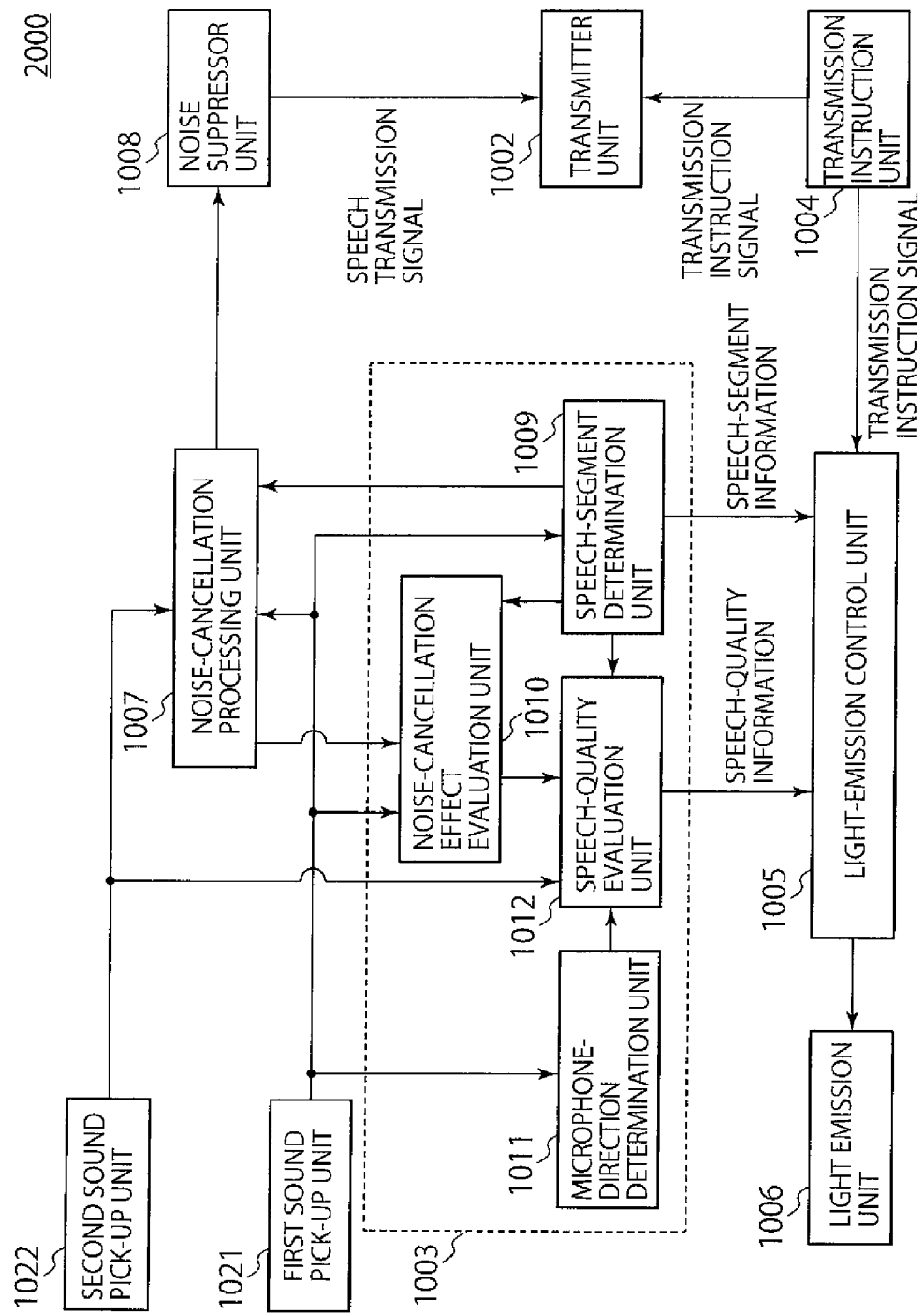
FIG. 15 is a block diagram schematically showing the configuration of an audio input apparatus (a communication apparatus) according to a fifth embodiment of the present invention.

FIG. 15 is a block diagram schematically showing the configuration of an audio input apparatus (a communication apparatus) 2000 according to a fifth embodiment of the present invention.

The audio input apparatus 1200 is provided with a first sound pick-up unit 1021, a second sound pick-up unit 1022, a noise-cancellation processing unit 1007, a noise suppressor unit 1008, a transmitter unit 1002, a transmission instruction unit 1004, a sound pick-up state evaluation unit 1003, a light-emission control unit 1005, and a light emission unit 1006. The sound pick-up state evaluation unit 1003 has a noise-cancellation effect evaluation unit 1010, a microphone-direction determination unit 1011, a speech-quality evaluation unit 1012, and a speech-segment determination unit 1009.

The basic configuration of the audio input apparatus 2000 is the same as the audio input apparatus 1000 of the fourth embodiment shown in FIG. 12. However, the audio input apparatus 2000 has the noise-cancellation processing unit 1007 and the noise suppressor unit 1008 for a noise suppression process in the time and frequency domain, respectively, to improve the speech quality of a speech signal to be transmitted.

The noise-cancellation processing unit 1007 and the noise suppressor unit 1008 correspond to the noise-cancellation processing unit 204 and the noise suppressor unit 205, respectively, shown in FIG. 4, hence the explanation of the units 1007 and 1008 being omitted. Moreover, the noise-cancellation effect evaluation unit 1010, the microphone-direction determination unit 1011, the speech-quality evaluation unit 1012, and the speech-segment determination unit 1009 correspond to the noise-cancellation effect evaluation unit 314 (FIG. 7), the microphone-direction determination unit 313 (FIG. 7), the speech-quality evaluation unit 103 (FIG. 1), and the speech-segment determination unit 203 (FIG. 4), respectively, hence the explanation of the units 1009 to 1012 being omitted.

In the fifth embodiment, the light-emission control unit 1005 receives both of speech-segment and speech-quality information from the sound pick-up state evaluation unit 1003, for control of the light emission unit 1006. However, as a variation to the fifth embodiment, the sound pick-up state evaluation unit 1003 may perform speech-segment determination only (with no speech-quality evaluation) so that the light-emission control unit 1005 can control the light emission unit 1006 based on the speech-segment information only. Moreover, as another variation to the fifth embodiment, the sound pick-up state evaluation unit 1030 may output information on the volume of a speech signal obtained by the first sound pick-up unit 1021 so that the light-emission control unit 1005 can control the light emission unit 1006 based on the volume information.

Sixth Embodiment

Figure 16:
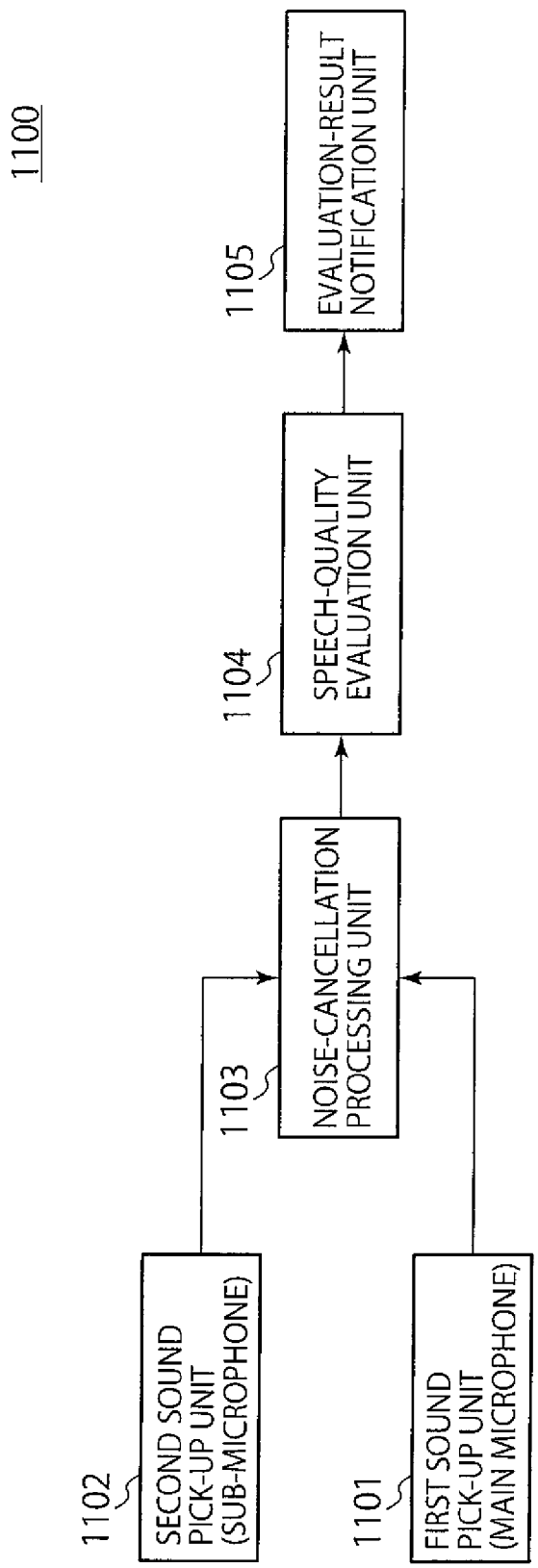
FIG. 16 is a block diagram schematically showing the configuration of an audio input apparatus according to a sixth embodiment of the present invention.

FIG. 16 is a block diagram schematically showing the configuration of an audio input apparatus 1100 according to a sixth embodiment of the present invention.

The audio input apparatus 1100 is provided with a first sound pick-up unit 1101, a second sound pick-up unit 1102, a noise-cancellation processing unit 1103, a speech-quality evaluation unit 1104, and an evaluation-result notification unit 1105.

The first sound pick-up unit 1101 is a microphone attached to the audio input apparatus 1100 to pick up a voice sound. A speech signal (a first speech signal) obtained by the first sound pick-up unit 101 based on the voice sound is output to the noise-cancellation processing unit 1103. The second sound pick-up unit 1102 is also a microphone attached to the audio input apparatus 1100 to pick up a voice sound. A speech signal (a second speech signal) obtained by the second sound pick-up unit 1102 based on the voice sound is also output to the noise-cancellation processing unit 1103.

The first sound pick-up unit 1101 corresponds to a main microphone for picking up mainly a user's voice sound, hence provided on the front face of the audio input apparatus 1100. The second sound pick-up unit 1102 corresponds to a sub-microphone for picking up mainly the surrounding noise for use in a noise cancellation process, hence provided on the rear face of the audio input apparatus 1100. The arrangements of the first sound pick-up unit (the main microphone) 1101 and the second sound pick-up unit (the sub-microphone) 1102 on the front and rear faces, respectively, of the audio input apparatus 1100 is the best arrangement for an excellent noise cancellation effect, although the second sound pick-up unit 1102 may be provided on the side or bottom face of the audio input apparatus 1100, or inside the audio input apparatus 1100.

The noise-cancellation processing unit 1103 performs a noise-cancellation process (a noise-component suppression process) based on the first speech signal and the second speech signal (used as a reference signal) input from the main microphone 1101 and the sub-microphones 1102, respectively.

In this embodiment, the noise-cancellation processing unit 1103 performs the noise cancellation process to the first speech signal input from the main microphone 1101 for each frame of a specific constant duration (256 samples, for example). In detail, the noise-cancellation processing unit 1103 is equipped with an adaptive filter to generate a reversed-phase component of a noise component mixed into a voice component at the main microphone 1101, as a noise cancellation signal, based on a voice sound picked up by the sub-microphone 1102. Then, the noise-cancellation processing unit 1103 adds the first speech signal input from the main microphone 1101 and the noise cancellation signal to suppress a noise component mixed into a voice component at the main microphone 1101. A speech signal after the noise cancellation is output to the speech-quality evaluation unit 1104.

The speech-quality evaluation unit 1104 evaluates the speech quality of the noise-cancelled signal input from the noise-cancellation processing unit 1103 and outputs an evaluation result to the evaluation-result notification unit 1105. The speech-quality evaluation unit 1104 evaluates the speech quality of the noise-cancelled signal based on whether the noise cancellation is effective or not at the noise-cancellation processing unit 1103.

The speech-quality evaluation unit 1104 may determine whether the noise cancellation is effective or not based on the level of attenuation of the first speech signal from the main microphone 1101, that has undergone the noise cancellation process at the noise-cancellation processing unit 1103. In this case, the speech-quality evaluation unit 1104 calculates the level of attenuation of the first speech signal from the main microphone 1101 after the noise cancellation process and determines that the noise cancellation is effective when the level of attenuation is equal to or higher than a specific threshold level. In detail, the speech-quality evaluation unit 1104 compares average power of a first speech signal before the noise cancellation process and average power of a first speech signal after the noise cancellation process to determine whether the noise cancellation is effective based on a comparison result.

The evaluation-result notification unit 1105 notifies a user of the evaluation result input from the speech-quality evaluation unit 1104 as to whether the speech quality is good or bad. The speech-quality evaluation unit 1104 evaluates the speech quality of the noise-cancelled signal based on whether the noise cancellation is effective or not at the noise-cancellation processing unit 1103. Therefore, actually, the evaluation-result notification unit 1105 notifies a user of whether the noise cancellation is effective or not at the noise-cancellation processing unit 1103.

The evaluation-result notification unit 1105 may visually notify a user of whether the speech quality is good or not, or may notify a user of the speech quality with a warning sound through a speaker. Moreover, the evaluation-result notification unit 1105 may be equipped with a vibration element to notify a user, with vibration, of whether the noise cancellation is effective or not.

However, in this embodiment, it is supposed that the audio input apparatus 1100 is used in an environment in which physical laborers work under heavy surrounding noise, so that the notification of speech quality to a user is made visually, not by means of sounds that may not be heard due to the surrounding noise or by means of vibration that may not be sensed by a user if the user is moving violently. In other words, in this embodiment, the evaluation-result notification unit 1105 has a visual means, such as an LED to be turned on and off, that indicates whether the noise cancellation function is effectively working or not.

Figure 17:
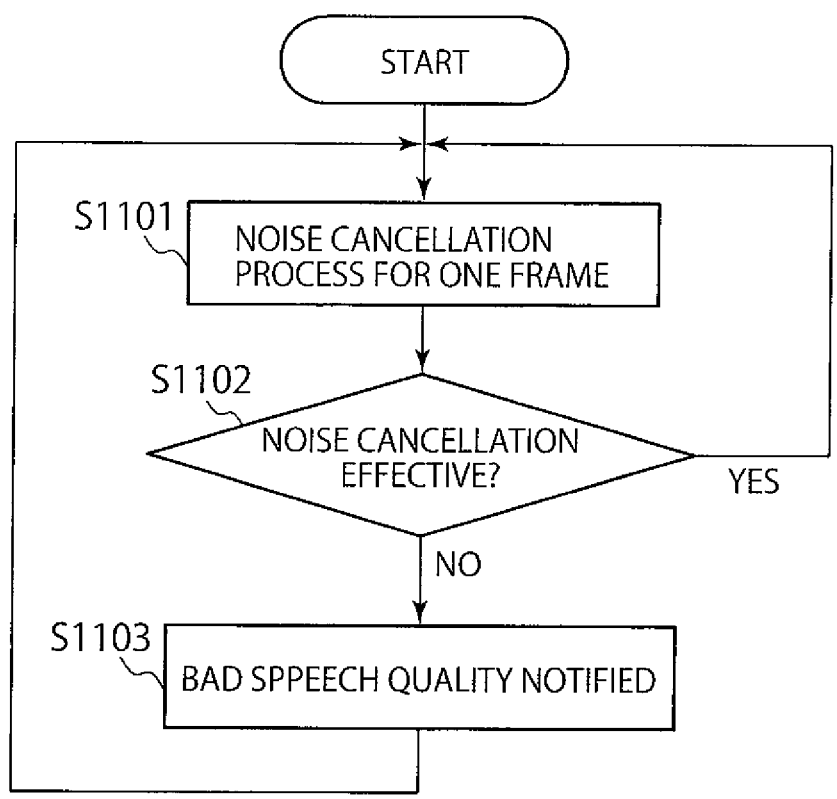
FIG. 17 is a flowchart showing an operation of the audio input apparatus according to the sixth embodiment of the present invention.

The operation of the audio input apparatus 1100 will be explained with a flowchart shown in FIG. 17.

The noise-cancellation processing unit 1103 performs a noise cancellation process based on a first speech signal and a second speech signal input from the main microphone 1101 and the sub-microphone 1102, respectively (step S1101). In detail, the noise-cancellation processing unit 1103 performs a process, per frame, of adding a reversed-phase component of a noise component mixed into a voice component at the main microphone 1101, generated based on the second speech signal input from the sub-microphone 1102, to the first speech signal input from the main microphone 1101. With this process, a noise component mixed with the first speech signal at the main microphone 1101 is suppressed. A noise-cancelled signal is output to the speech-quality evaluation unit 1104.

Then, the speech-quality evaluation unit 1104 evaluates the speech quality of a speech signal after the noise cancellation (step S1102). In detail, the speech-quality evaluation unit 1104 compares average power Pin of the first speech signal input from the main microphone 1101 before the noise cancellation and average power Pnc of the noise-cancelled signal from the noise-cancellation processing unit 1103 after the noise cancellation and, based on the comparison, determines whether the noise cancellation function of the noise-cancellation processing unit 1103 is effectively working. For example, the speech-quality evaluation unit 1104 may determine that the speech quality is good because of effective noise cancellation if the level of attenuation (Pin−Pnc) caused by the noise cancellation is equal to or higher than a first specific threshold level Pth that is a criterion level on the noise cancellation effect. Moreover, the speech-quality evaluation unit 1104 may determine that the speech quality is good because of effective noise cancellation if the power ratio (Pin/Pnc) is equal to or higher than a second specific threshold level Pth' that is another criterion level on the noise cancellation effect. Any other techniques can be used as long as the speech quality can be properly evaluated.

If the speech quality is evaluated as good (Yes in step S1102), the process returns to step S1101 to continue the noise cancellation. On the other hand, if the speech quality is evaluated as bad (No in step S1102), that is, the noise-cancellation function is not working effectively, hence a good speech quality is not obtained, the evaluation-result notification unit 1105 notifies a user of the bad result of evaluation (step S1103).

The main purpose for the evaluation-result notification unit 1105 to notify a user of a result of evaluation is instructing the user of the correct way of holding the microphone, which results in enhanced noise cancellation effect and in transmission of a clear voice sound. Therefore, the notification of a result of evaluation to a user from the evaluation-result notification unit 1105 means the notification of a used condition to a user as to whether the audio input apparatus 1100 is being used appropriately.

As described above, the audio input apparatus 1100 according to the sixth embodiment has the notification (alarm) mechanism of notifying of a used condition to a user as to whether it is being used appropriately. With this notification (alarm) mechanism, a user can know whether the noise cancellation function is working effectively. When the user notices that the noise cancellation function is not working effectively, the user can change the way of holding the audio input apparatus 1100 (or the microphone), the distance between the microphone and user's mouth etc. to make the noise cancellation function work effectively so that a clear voice sound can be transmitted.

Accordingly, the audio input apparatus 1100 according to the sixth embodiment leads a user to hold a microphone in a correct manner so that the noise cancellation function can work at a maximum level to transmit a clear voice sound even in a noisy environment. Therefore, the user can check whether the user's voice sound is clearly transmitted.

Moreover, the audio input apparatus 1100 in this embodiment can be used for training workers on how to correctly use a noise cancellation microphone to which the present invention can be applied.

In known noise cancellation microphones, there is no way to know the range of distance and angle with respect to the user's mouth for appropriate use. Thus, there are problems such that a user talks into the microphone at a too close distance in order to transmit a clear voice sound, a user continues talking even if a clear voice sound is not transmitted due to ineffective noise cancellation which results in miscommunication, and so on.

On the other hand, as described above, the audio input apparatus 1100 according to the sixth embodiment can solve such problems and provide high utility in various environments.

In detail and as described above, the noise-cancellation processing unit 1103 performs the noise-cancellation process based on the first and second speech signals input from the main microphone 1101 and the sub-microphones 1102, respectively. More in detail, based on the second speech signal input from the sub-microphone 1102, the noise-cancellation processing unit 1103 generates a reversed-phase component of a noise component mixed into a voice component at the main microphone 1101 and adds the reversed-phase component to the first speech signal input from the main microphone 1101 in the noise cancellation process.

Then, the speech-quality evaluation unit 1104 evaluates the noise cancellation effect at the noise-cancellation processing unit 1103 and the evaluation-result notification unit 1105 notifies a user of the result of evaluation at the speech-quality evaluation unit 1104.

In detail, the speech-quality evaluation unit 1104 determines whether the noise cancellation function of the noise-cancellation processing unit 1103 is working effectively. If it is determined that the noise cancellation function is working effectively, the evaluation-result notification unit 1105 notifies a user that the noise cancellation function is working effectively so that the speech quality is good.

The speech-quality evaluation unit 1104 determines whether the noise cancellation function is working effectively by comparing the average power before and after the noise cancellation.

The speech-quality evaluation unit 1104 may determine that the noise cancellation function is working effectively if the following relational expression (3) is satisfied $$Pin-Pnc>Pth \quad (3)$$

in which Pin is the average power of the first speech signal input from the main microphone 1101 before the noise cancellation, Pnc is the average power of the noise-cancelled signal input from the noise-cancellation processing unit 1103 after the noise cancellation, and Pth is a first specific threshold level that is a criterion level on the noise cancellation effect.

Moreover, the speech-quality evaluation unit 1104 may determine that the noise cancellation function is working effectively if the following relational expression (4) is satisfied $$Pin/Pnc>Pth' \quad (4)$$

in which Pin/Pnc is the power ratio before and after the noise cancellation, and Pth' is a second specific threshold level that is another criterion level on the noise cancellation effect.

In the sixth embodiment, the evaluation-result notification unit 1105 has a visual means, such as an LED to be turned on and off, that indicates whether the noise cancellation function is working effectively or not. Not only that, the evaluation-result notification unit 1105 may be equipped with a liquid crystal display or the like to indicate whether the noise cancellation function is working effectively or not. Moreover, the evaluation-result notification unit 1105 may be equipped with a vibration means, such as a vibrator, so that a user can know whether the noise cancellation is effective or not when the user feels vibration while holding the audio input apparatus 1100.

Furthermore, the evaluation-result notification unit 1105 may be provided with a notification mechanism that notifies a user only when the noise cancellation is effective and hence the speech quality is good, as a result of evaluation at the speech-quality evaluation unit 1104. With this notification mechanism, the user can know that the used condition of the audio input apparatus 1100 is not good if there is no notification.

Seventh Embodiment

Described next is an audio input apparatus 1200 according to a seventh embodiment of the present invention, which has a power saving function in comparison with the audio input apparatus 1100 of the sixth embodiment. In the audio input apparatus 1100, the speech-quality evaluation unit 1104 performs an average-power calculation process, a comparison process, etc., which are relatively power consuming processes, in order for the evaluation-result notification unit 1105 to notify a user of whether noise cancellation is being effective. However, the notification with such power consuming processes is useless while a user is not talking into the audio input apparatus 1100. The audio input apparatus 1200 in the seventh embodiment is provided with a new configuration to solve such a problem.

Figure 18:
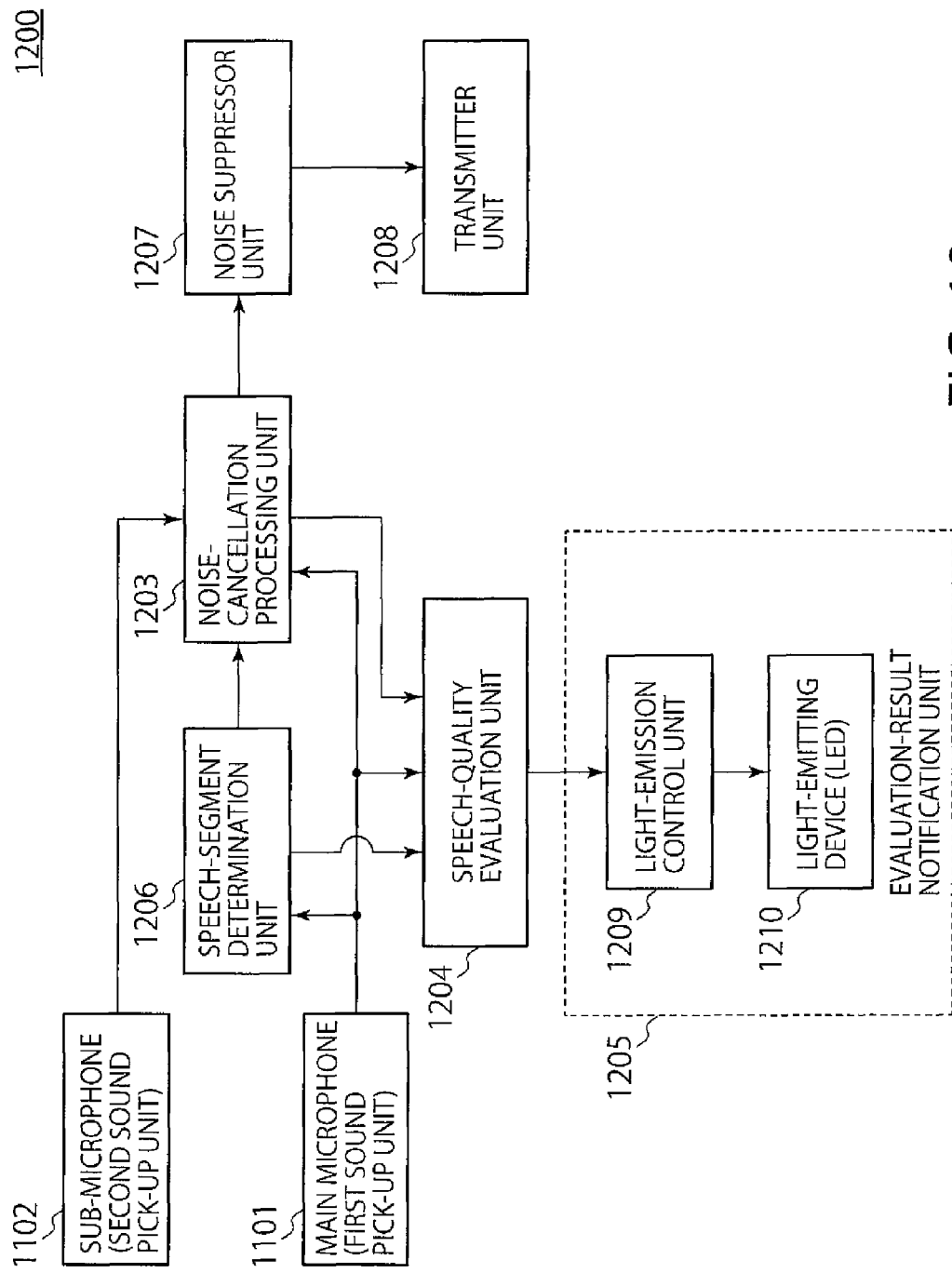
FIG. 18 is a block diagram schematically showing the configuration of an audio input apparatus according to a seventh embodiment of the present invention.

FIG. 18 is a block diagram schematically showing the configuration of the audio input apparatus 1200 according to the seventh embodiment of the present invention.

The audio input apparatus 1200 is provided with a first sound pick-up unit 1101 (a main microphone), a second sound pick-up unit 1102 (a sub-microphone), a noise-cancellation processing unit 1203, a speech-quality evaluation unit 1204, an evaluation-result notification unit 1205, a speech-segment determination unit 1206, a noise suppresser unit 1207, and a transmitter unit 1208. The evaluation-result notification unit 1205 has a light-emission control unit 1209 and a light-emitting device 1210 for visual notification.

The speech-segment determination unit 1206 detects a speech segment by speech segment determination based on a first speech signal input from the main microphone 1101. In detail, the speech-segment determination unit 1206 converts the first speech signal input from the main microphone 1101 into a signal component in unit of a specific length in the frequency domain and analyzes a spectrum component of the signal component thus converted into the frequency domain to determine whether it is a vowel, a consonant, or a noise component. The speech-segment determination unit 1206 outputs a speech-segment indication signal that indicates a speech segment to the noise-cancellation processing unit 1203 and the speech-quality evaluation unit 1204.

The noise-cancellation processing unit 1203 performs a noise cancellation process based on the first and second speech signals input from the main microphone 1101 and the sub-microphone 1102, respectively, in the same manner as the noise-cancellation processing unit 1103 shown in FIG. 16. Then, the noise-cancellation processing unit 1203 outputs a noise-cancelled signal to the speech-quality evaluation unit 1204 and the noise suppressor unit 1207.

The speech-quality evaluation unit 1204 evaluates the speech quality of the noise-cancelled signal input from the noise-cancellation processing unit 1203 by using the speech-segment indication signal input from the speech-segment determination unit 1206. In this embodiment, the speech-quality evaluation unit 1204 performs speech quality evaluation while a speech segment is being detected at the speech-segment determination unit 1206. The speech-quality evaluation unit 1204 outputs an evaluation result that is the information indicating the speech quality of the noise-cancelled signal to the light-emission control unit 1209 of the evaluation-result notification unit 1205.

Moreover, the speech-quality evaluation unit 1204 determines whether the noise cancellation function of the noise-cancellation processing unit 1203 is working effectively and also determines whether a power level of the noise-cancelled signal is equal to or higher than a specific threshold level. With these evaluation and determination, the speech-quality evaluation unit 1204 evaluates the speech quality of a noise-cancelled signal reliably, that is to be transmitted from the transmitter unit 1208.

The light-emission control unit 1209 is a driver for driving the light-emitting device 1210 by outputting a drive current thereto in accordance with the information indicating the speech quality of the noise-cancelled signal input from the speech-quality evaluation unit 1204. With the drive current, the light-emission control unit 1209 turns on or repeatedly turns on and off the light-emitting device 1210 to notify a user of speech quality. The light-emitting device 1210 may be an LED. In this case, the light-emission control unit 1209 repeatedly turns on and off the LED 1210 to notify a user of speech quality when it receives information indicating a good or bad speech quality from the speech-quality evaluation unit 1204.

The noise suppressor unit 1207 suppresses a noise component other than a voice component that appears on the frequency axis of the noise-cancelled signal input from the noise-cancellation processing unit 1203. Then, the noise suppressor unit 1207 returns a noise-component-suppressed signal into the time domain and outputs the signal to the transmitter unit 1208. The transmitter unit 1208 performs speech coding to the signal from the noise suppressor unit 205 and transmits the signal to a receiver apparatus or the like.

Figure 19:
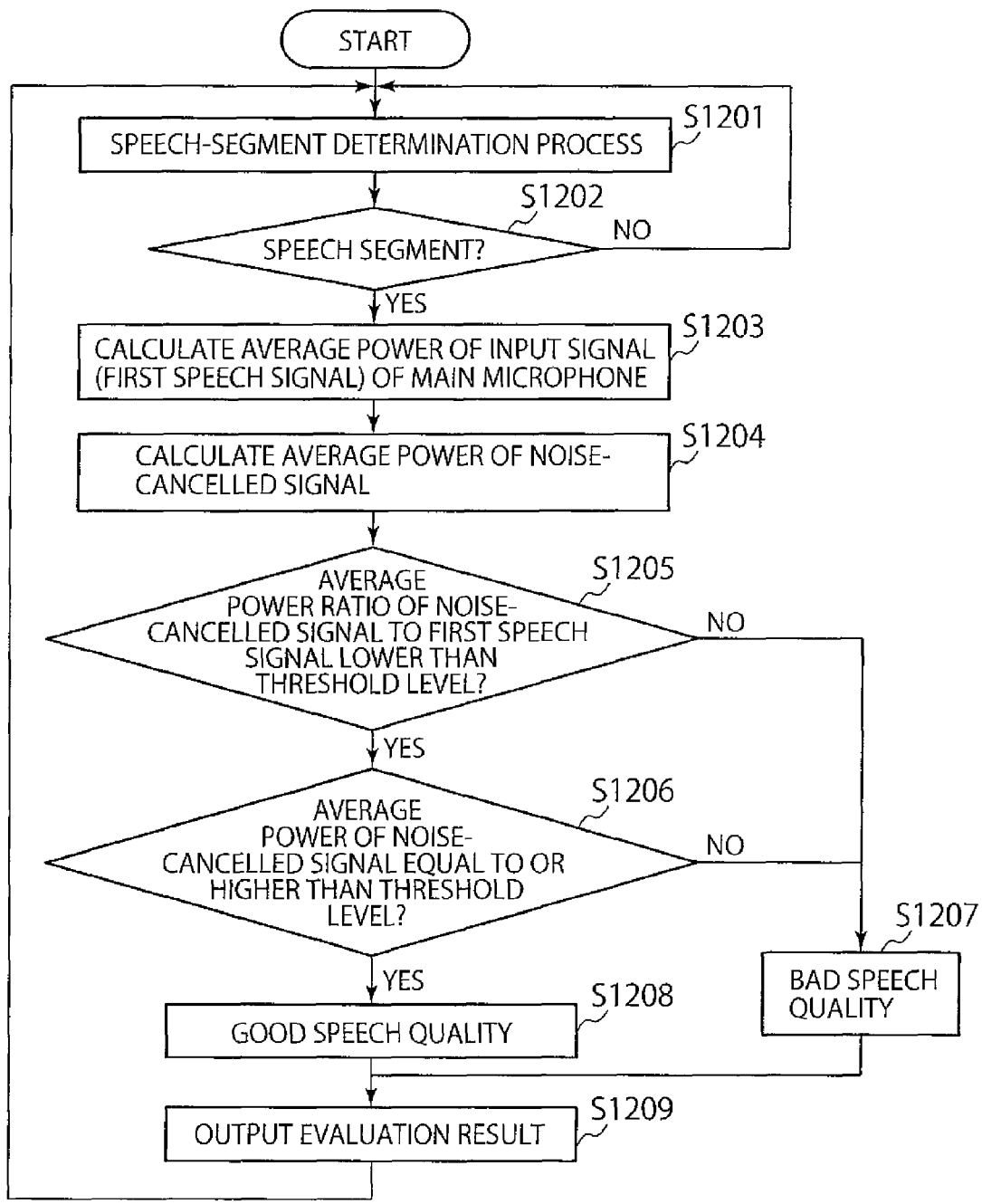
FIG. 19 is a flowchart showing a noise-cancellation effect evaluation process according to the seventh embodiment of the present invention.

Explained next is an operation of the audio input apparatus 1200 with respect to a flowchart of FIG. 19.

The speech-segment determination unit 1206 performs a speech-segment determination process to determine whether a user is talking into the audio input apparatus 1200 based on the first speech signal input from the main microphone 1101 (step S1201). If no speech segment is detected (No in step S1202), the process returns to step S1201 to continue the speech-segment determination process. On the other hand if a speech segment is detected (Yes in step S1202), the process moves onto step S1203.

The speech-quality evaluation unit 1204 calculates average power per frame of the first speech signal input from the main microphone 1101 when the noise-cancellation processing unit 1203 performs a noise-cancellation process for each frame (step S1203). Then, the speech-quality evaluation unit 1204 calculates average power of the noise-cancelled signal input from the noise-cancellation processing unit 1203 (step S1204).

Next, the speech-quality evaluation unit 1204 compares the average power of the first speech signal before the noise cancellation process and the average power of the noise-cancelled signal after the noise cancellation process (step S1205).

If it is determined that the power ratio of the noise-cancelled signal to the first speech signal is equal to or higher than a specific first threshold level, (No in step S1205), it is determined that the noise cancellation function is not working effectively, and hence the speech quality of the noise-cancelled signal is bad (step S1207).

On the other hand, if it is determined that the power ratio of the noise-cancelled signal to the first speech signal is lower than the first threshold level (Yes in step S1205), the speech-quality evaluation unit 1204 determines whether the average power of the noise-cancelled signal is equal to or higher than a specific threshold level (step S1206).

If it is determined that the average power of the noise-cancelled signal is lower than the second threshold level (No in step S1206), it is determined that the speech quality of the noise-cancelled signal is bad (step S1207). On the other hand, if it is determined that the average power of the noise-cancelled signal is equal to or higher than the second threshold level (Yes in step S1206), it is determined that the speech quality of the noise-cancelled signal is good with an appropriate voice level (step S1208).

The speech-quality evaluation unit 1204 outputs an evaluation result (obtained in step S1207 or S1208) that is information indicating the speech quality of the noise-cancelled signal to the light-emission control unit 1209 of the evaluation-result notification unit 1205 (step S1209) for notification of the speech quality through the light-emitting device 1210.

As described above, the audio input apparatus 1200 in the seventh embodiment is provided further with the speech-segment determination unit 1206 that detects a speech segment based on the first speech signal input from the main microphone 1101, in comparison with the audio input apparatus 1100 in the sixth embodiment. Then, the speech-quality evaluation unit 1204 performs speech quality evaluation while a speech segment is being detected at the speech-segment determination unit 1206.

With this configuration described above, unnecessary power consumption is prevented, which otherwise occurs due to unnecessary operation at the speech-quality evaluation unit 1204 while a user is not talking into the audio input apparatus 1200. Moreover, with the configuration described above, it does not occur that the evaluation-result notification unit 1105 makes false notification to a user on a used condition of the main microphone 1101 while no speech segment is being detected.

The speech-segment determination unit 1206 may be provided with a frequency converter for converting the first speech signal input from the main microphone 1101 into a signal component in unit of a specific length in the frequency domain and a speech determiner for determining whether the first speech signal carries a voice component or a noise component based on a spectrum component obtained by frequency conversion, for speech segment determination. The speech determiner may determine whether the sound carried by the first speech signal is a vowel, a consonant, or a noise component.

Moreover, as described above, the speech-quality evaluation unit 1204 employs two evaluation criteria as to whether the noise cancellation function of the noise-cancellation processing unit 1203 works effectively and as to whether a speech signal after the noise cancellation has a signal level equal to or higher than a specific threshold level, for speech quality evaluation. With these two evaluation criteria, the speech-quality evaluation unit 1204 can evaluate the speech quality reliably to the extend that a recipient of a voice of a user of the audio input apparatus 1200 actually feels and can properly notify the user of the evaluation through the evaluation-result notification unit 1205.

Under the evaluation criteria, the speech-quality evaluation unit 1204 calculates the power ratio of the noise-cancelled signal to the first speech signal input from the main microphone 1101 during a speech segment and compares the power ratio to a specific threshold level to determine whether the sound level after the noise cancellation to the sound level at the main microphone 1101 is equal to or higher than a certain level. With this comparison, it is determined whether the user's mouth is close enough to the main microphone 1101. Then, the speech-quality evaluation unit 1204 notifies the user of an evaluation result through the evaluation-result notification unit 1205 while the user is talking into the main microphone 1101. When the light-emitting device 1210 of the evaluation-result notification unit 1205 is an LED, the notification can be made with repeated turn-on and -off of the LED.

In the seventh embodiment, the speech-quality evaluation unit 1204 determines whether the noise cancellation function is working effectively based on a noise-cancelled signal output from the noise-cancellation processing unit 1203 and then evaluates the speech quality as the final evaluation. However, the evaluation technique is not limited to this. For example, the speech-quality evaluation unit 1204 may evaluate the speech quality of a signal from the noise suppresser unit 1207 after the noise suppression on the frequency axis.

Eighth Embodiment

Described next is an audio input apparatus 1300 according to an eighth embodiment of the present invention, that features more reliable evaluation capability for notification than the audio input apparatus 1200 of the seventh embodiment.

In the audio input apparatus 1200 of the seventh embodiment, the speech-quality evaluation unit 1204 may sometimes erroneously evaluate the noise cancellation effect even if the noise cancellation function of the noise-cancellation processing unit 1203 is not working effectively. The erroneous evaluation of the noise cancellation effect may occur, for example, while a user is talking into the audio input apparatus 1200 that is not oriented in an appropriate direction to the user so that the user's voice sound is also input to the sub-microphone 1102 at a high level if provided at the rear face of the audio input apparatus 1200 with respect to the main microphone 1101 provided at the front face thereof.

The noise-cancellation processing unit 1203 performs the noise cancellation process using a signal from the sub-microphone 1102 as a reference signal. Therefore, the noise-cancellation processing unit 1203 may erroneously treat a voice component input to the sub-microphone 102 as a noise component so that a voice component input to the main microphone 1101 which should remain is also inevitably suppressed. Suppose that there is an intense noise source in front of the audio input apparatus 1200 that is not oriented in an appropriate direction to the user. In this case, it may happen that a noise component from the noise source remains after the noise cancellation process so that the signal level of a noise-cancelled signal goes beyond a threshold level which results in that the speech quality is erroneously evaluated as good and notified to the user.

It is achieved in the eighth embodiment that the audio input apparatus 1300 evaluates the speech quality reliably even in such a case discussed above and properly notifies a user of the speech quality evaluation.

Figure 20:
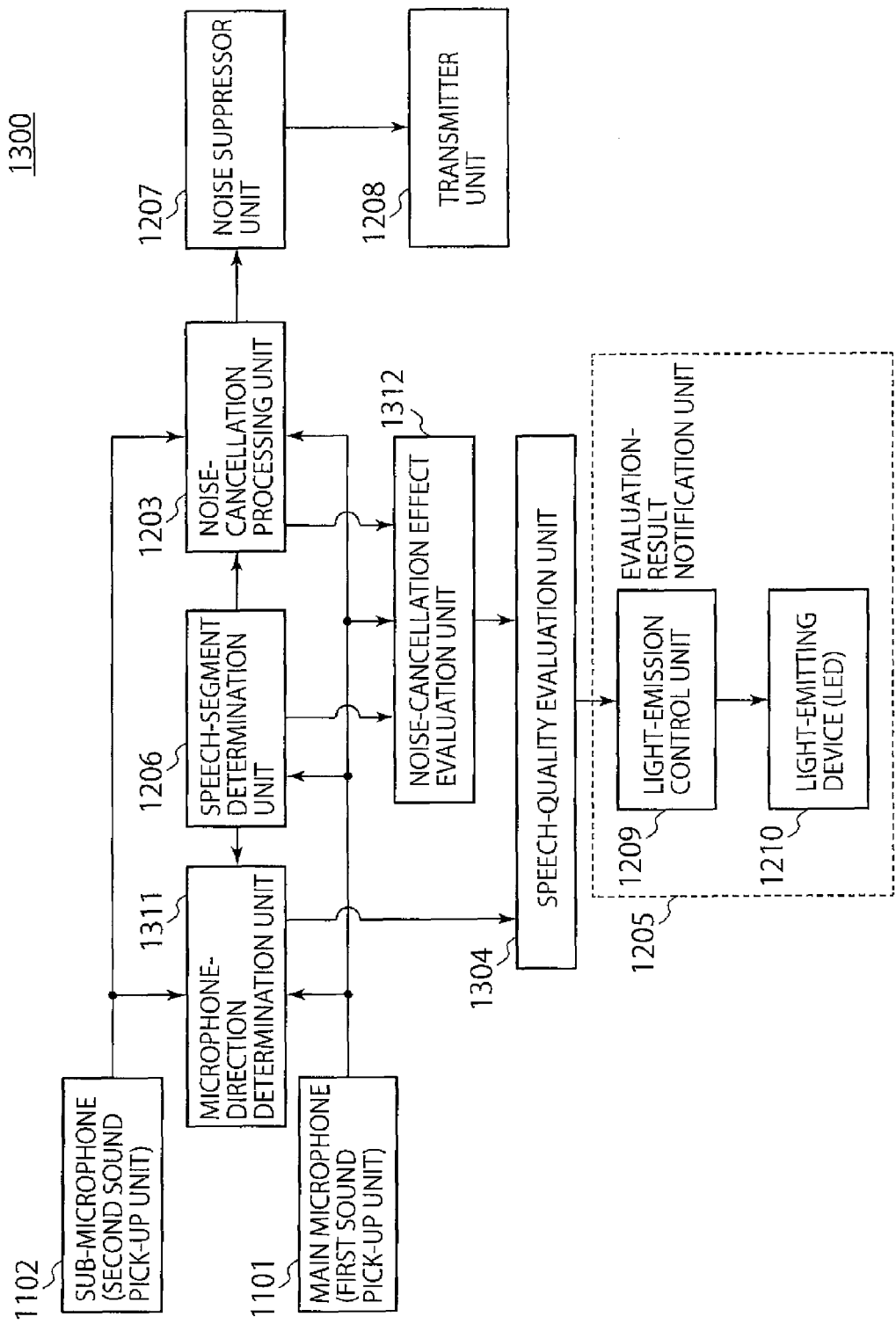
FIG. 20 is a block diagram schematically showing the configuration of an audio input apparatus according to an eighth embodiment of the present invention.

FIG. 20 is a block diagram schematically showing the configuration of the audio input apparatus 1300 according to the eighth embodiment of the present invention.

The audio input apparatus 1300 is provided with a first sound pick-up unit 1101 (a main microphone), a second sound pick-up unit 1102 (a sub-microphone), a noise-cancellation processing unit 1203, a speech-quality evaluation unit 1304, an evaluation-result notification unit 1205, a speech-segment determination unit 1206, a noise suppresser unit 1207, a transmitter unit 1208, a microphone-direction determination unit 1311, and a noise-cancellation effect evaluation unit 1312. The evaluation-result notification unit 1205 has a light-emission control unit 1209 and a light-emitting device 1210 for visual notification.

While the speech-segment determination unit 1206 is determining that a first speech signal input from the main microphone 201 is a speech segment, the microphone-direction determination unit 1311 detects a phase difference between voice sounds picked by the main microphone 1101 and the sub-microphone 1102 and determines the direction of the main microphone 1101 (a main-microphone direction, hereinafter) with respect to a user based on the phase difference. The microphone-direction determination unit 1311 outputs a determination result on the main-microphone direction to the speech-quality evaluation unit 1304.

Figure 21:
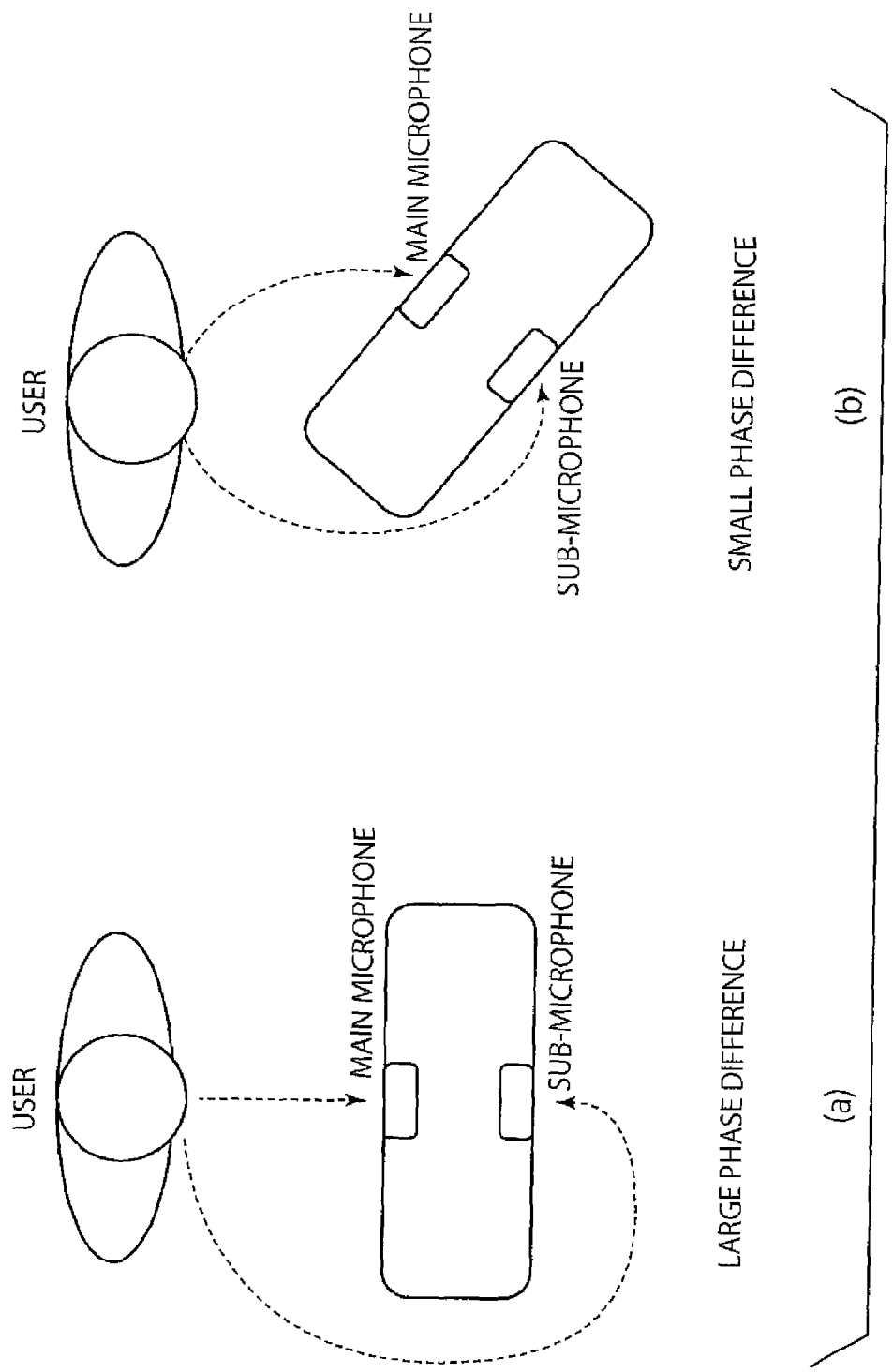
FIG. 21 is a view illustrating a direction-to-phase relationship of an audio input apparatus with respect to a user.

FIG. 21 is a view illustrating a direction-to-phase relationship of the audio input apparatus 1300 with respect to a user, or a phase difference of voice sounds depending on the main-microphone direction.

As shown in (a) of FIG. 21, when a user faces the audio input apparatus 1300 at the front side with the main microphone 1101 attached thereto, in a normal used condition, there is a large phase difference between a voice sound that is picked up by the main microphone 1101 through a straight path and a voice sound that is picked up by the sub-microphone 1102 through a roundabout path. On the other hand, as shown in (b) of FIG. 21, when the audio input apparatus 1300 is inclined toward a user, there is a small phase difference between voice sounds picked up by the main microphone 1101 and the sub-microphone 1102 due to a shorter distance between the user's mouth and the two microphones. In particular, when the main microphone 1101 attached to the audio input apparatus 1300 at the front side is inclined toward a user at 90 degrees, the distances from the user's mouth to the main microphone 1101 and to the sub-microphones 1102 are almost equal to each other, so that the phase difference is almost zero.

Under consideration of the change in phase difference depending on the positional relationship between a user and the audio input apparatus 1300 discussed above, the microphone-direction determination unit 1311 compares a phase difference detected between the first and second speech signals output from the main microphone 1101 and the sub-microphone 1102, respectively, with a specific threshold value. When the phase difference is smaller than the specific threshold value, the microphone-direction determination unit 1311 assumes that the main-microphone direction is not toward a user, such as shown in (b) of FIG. 21 and determines that the user is not using the audio input apparatus 1300 appropriately. On the other hand, when the phase difference is equal to or larger than the specific threshold value, the microphone-direction determination unit 1312 assumes that the main-microphone direction is toward a user, such as shown in (a) of FIG. 21, and determines that the user is using the audio input apparatus 1300 appropriately.

The noise-cancellation effect evaluation unit 1312 determines whether the noise cancellation function of the noise-cancellation processing unit 1203 is working effectively based on a noise-cancelled signal input from the noise-cancellation processing unit 1203. In detail, the noise-cancellation effect evaluation unit 1312 determines whether the noise cancellation function is working effectively based on average power Pin of the first speech signal input from the main microphone 1101 before the noise cancellation and average power Pnc of the noise-cancelled signal from the noise-cancellation processing unit 1203 after the noise cancellation. For example, the noise-cancellation effect evaluation unit 1312 may determine that the noise cancellation function is working effectively if the following relational expression (5) is satisfied $$Pin - Pnc > Pth \qquad (5)$$

in which Pth is a threshold level of attenuation that is a criterion level on the noise cancellation effect. Moreover, the noise-cancellation effect evaluation unit 1312 determines whether the signal power of a speech signal after noise cancellation (a noise-cancelled signal) is equal to or higher than a specific threshold level. The noise-cancellation effect evaluation unit 1312 outputs two determination results described above to the speech-quality evaluation unit 1304.

The speech-quality evaluation unit 1304 evaluates the speech quality of the noise-cancelled signal based on the determination result output from the microphone-direction determination unit 1311 and the two determination results output from the speech-quality evaluation unit 1304. In detail, the speech-quality evaluation unit 1304 determines that the speech quality of the noise-cancelled signal is good: when the determination result output from the microphone-direction determination unit 1311 shows that the main microphone 1101 is oriented toward a user; and when the two determination results output from the speech-quality evaluation unit 1304 show that the noise cancellation function is working effectively and the signal power of the noise-cancelled signal is equal to or higher than the specific threshold level. The speech-quality evaluation unit 1304 outputs a speech-quality evaluation signal that indicates an evaluation result to the evaluation-result notification unit 1105, as information indicating the speech quality.

Explained next is a microphone-direction determination process performed by the microphone-direction determination unit 1311, with respect to a flowchart of FIG. 22.

The microphone-direction determination unit 1311 compares the phases of first and second speech signals input from the main microphone 1101 and the sub-microphone 1102, respectively, to detect a phase difference therebetween (step S1301). Then, the microphone-direction determination unit 1311 compares the phase difference between the first and second speech signals with a specific threshold value to determine whether the phase difference is smaller than the specific threshold value (step S1302). The comparison of phase difference is done based on the fact that the change in orientation of the main microphone 1102 is directly reflected in the phase difference as discussed with reference to FIG. 21.

If the phase difference is equal to or larger than the specific threshold value (No in step S1302), the microphone-direction determination unit 1311 assumes that the positional relationship between the main microphone 1101 and the user's mouth is good, such as shown in (a) of FIG. 21, and determines that the user is using the audio input apparatus 1300 appropriately. On the other hand, if the phase difference is smaller than the specific threshold value (Yes in step S1302), the microphone-direction determination unit 1311 assumes that the positional relationship between the main microphone 1101 and the user's mouth is bad, such as shown in (b) of FIG. 21, and determines that the user is using the audio input apparatus 1300 inappropriately.

Then, the microphone-direction determination unit 1311 outputs a determination result obtained in step S1303 or S1304 to the speech-quality evaluation unit 1304 (step S1305), as a first determination result that indicates whether or not the main-microphone direction is appropriate, that is, whether or not the audio input apparatus 1300 is used appropriately.

Explained next is a noise-cancellation effect evaluation process performed by the noise-cancellation effect evaluation unit 1312, with respect to a flowchart of FIG. 23.

The noise-cancellation effect evaluation unit 1312 is in a waiting mode to receive a speech-segment indication signal that is generated by the speech-segment determination unit 1206 when it determines that a first speech signal input from the main microphone 1101 is a speech segment (step S1311). When the speech-segment indication signal is input (Yes in step S1311), the noise-cancellation effect evaluation unit 1312 performs step S1312, whereas if not (No in step S1311), it is still in the waiting mode to receive the speech-segment indication signal. Steps S1312 to S1315 are the same as or analogous to steps S1203 to S1206 shown in FIG. 19, and the hence the explanation thereof is omitted for brevity.

The noise-cancellation effect evaluation unit 1312 determines that the noise cancellation function is not working effectively (step S1316) in either one of the following two cases: if it is determined that the power ratio of the noise-cancelled signal to the first speech signal is equal to or higher than a specific first threshold level, (No in step S1314); and if it is determined that the power ratio of the noise-cancelled signal to the first speech signal is lower than a specific second threshold level (No in step S1315).

On the other hand, the noise-cancellation effect evaluation unit 1312 determines that the noise cancellation function is working effectively (step S1317) if it is determined that the average power of the noise-cancelled signal is equal to or higher than the second threshold level (Yes in step S1315).

The speech-quality evaluation unit 1312 outputs an evaluation result obtained in step S1316 or S1317 to the speech-quality evaluation unit 1304 (step S1318), as a second determination result that is information indicating whether or not the noise cancellation function is working effectively.

Figure 24:
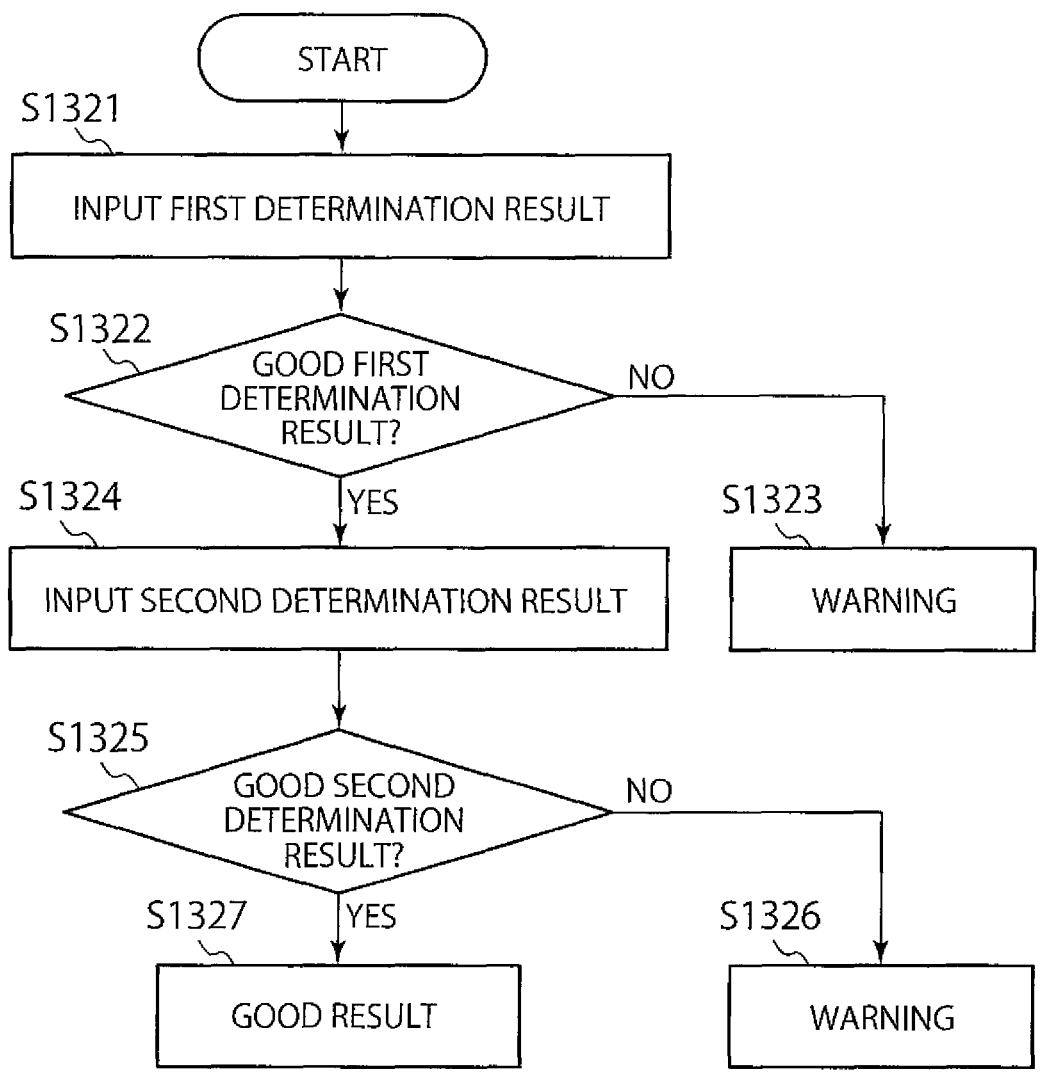
FIG. 24 is a flowchart showing an overall evaluation process concerning the speech quality according to the eighth embodiment of the present invention.

Explained next is a speech-quality evaluation process performed by the speech-quality evaluation unit 1304, with respect to a flowchart of FIG. 24.

Figure 22:
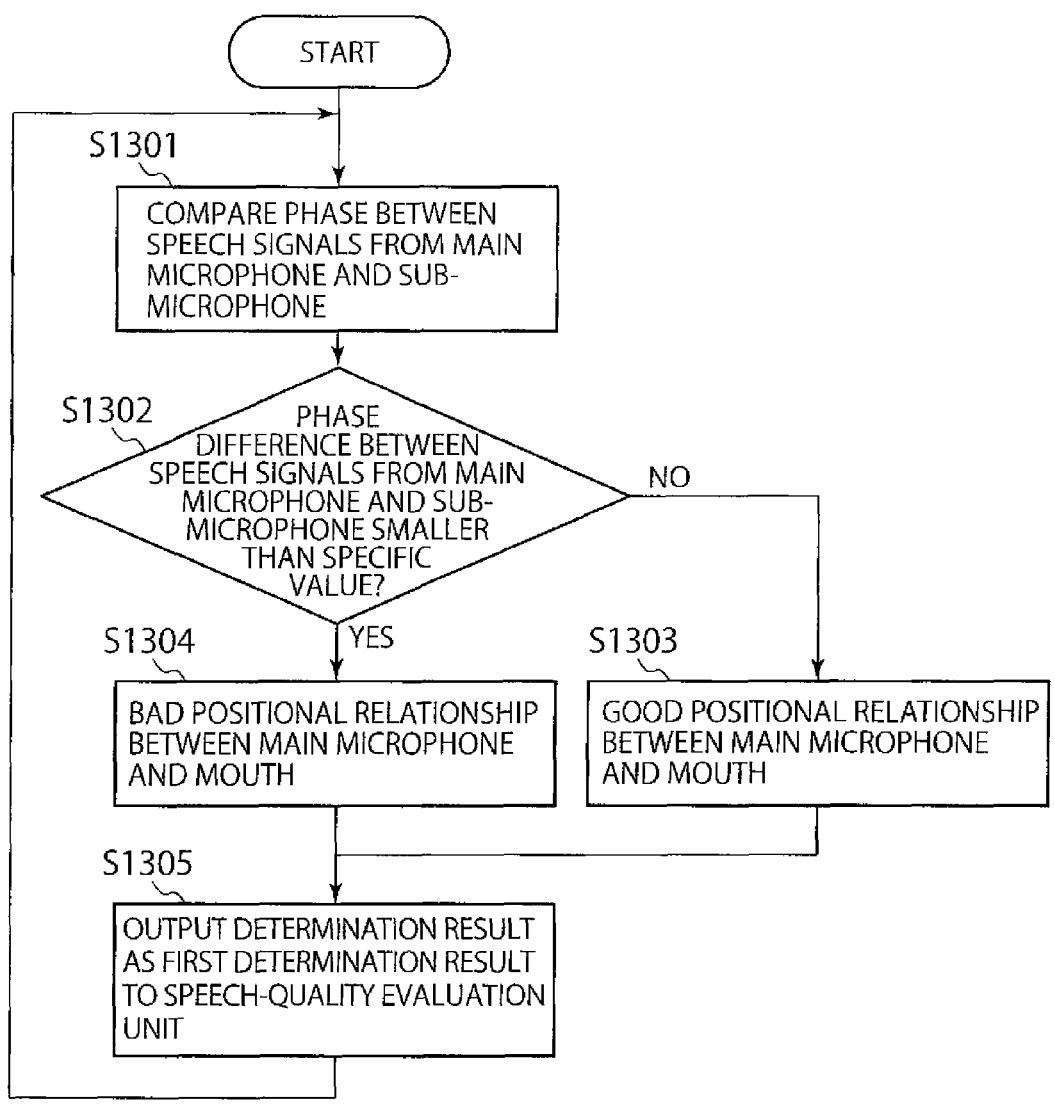
FIG. 22 is a flowchart showing a microphone-direction determination process for a main microphone according to the eighth embodiment of the present invention.

The first determination result obtained through the process shown in FIG. 22 is input from the microphone-direction determination unit 1311 to the speech-quality evaluation unit 1304 (step S1321). Then, the speech-quality evaluation unit 1304 determines whether the first determination result shows that the positional relationship between the main microphone 1101 and the user's mouth is good (step S1322).

If the first determination result shows that the positional relationship between the main microphone 1101 and the user's mouth is bad (No in step S1322), the speech-quality evaluation unit 1304 instructs the evaluation-result notification unit 1205 to make warning (step S1323) by turning on the light-emitting device 1210.

Figure 23:
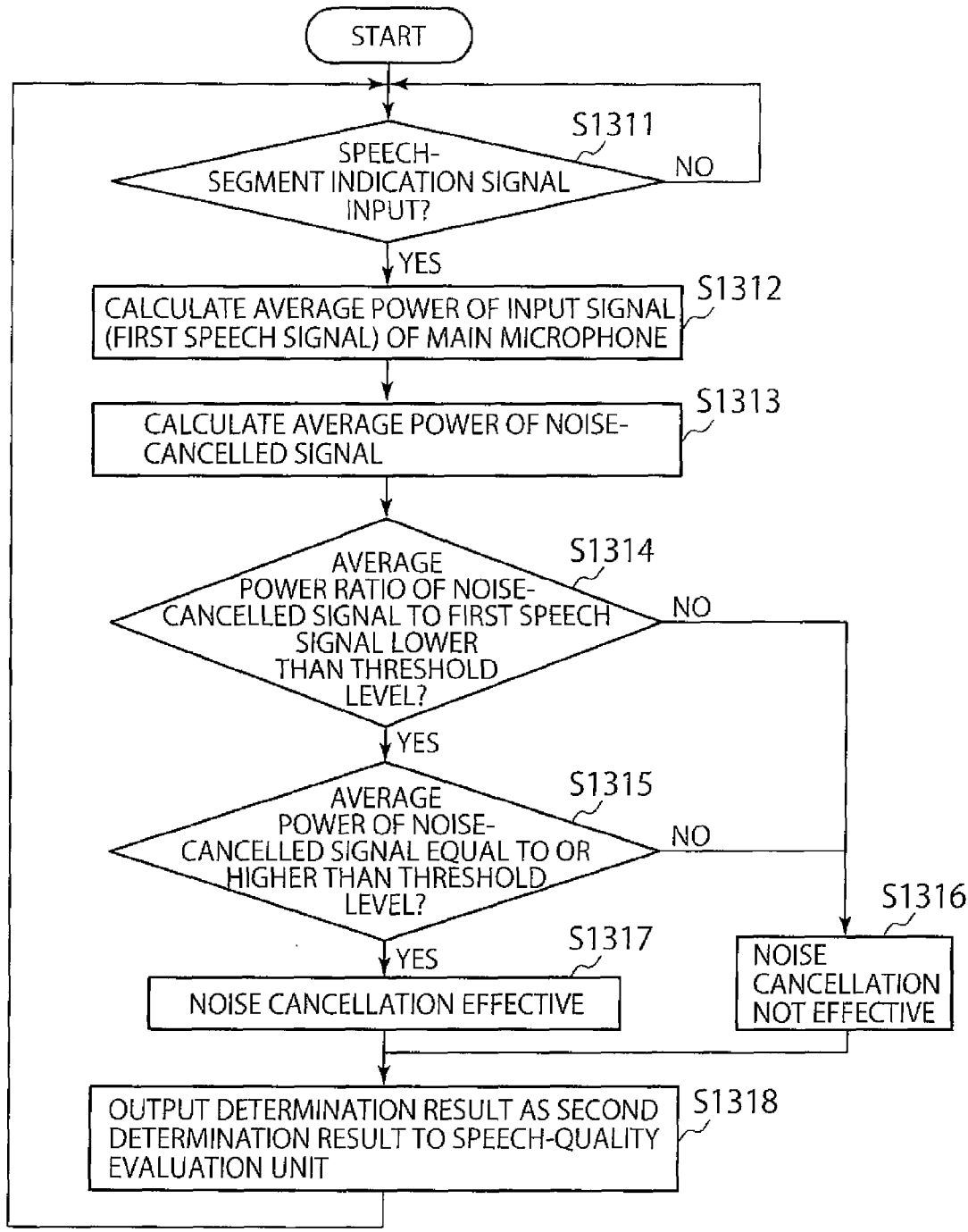
FIG. 23 is a flowchart showing a noise-cancellation effect evaluation process according to the eighth embodiment of the present invention.

On the other hand, if the first determination result shows that the positional relationship between the main microphone 1101 and the user's mouth is good (Yes in step S1322), the second determination result obtained through the process shown in FIG. 23 is input from the noise-cancellation effect evaluation unit 1312 to the speech-quality evaluation unit 1304 (step S1324).

If the second determination result shows that the noise cancellation function is not working effectively (No in step S1325), the speech-quality evaluation unit 1304 instructs the evaluation-result notification unit 1205 to make warning (step S1326) by turning on the light-emitting device 1210.

On the other hand, if the second determination result shows that the noise cancellation function is working effectively (Yes in step S1325), the speech-quality evaluation unit 1304 determines that the speech quality is good (step S1327) and instructs the evaluation-result notification unit 1205 to notify a user of a good speech quality. The good speech quality may be set as the default so that the evaluation-result notification unit 1205 needs not to notify anything. In the case of this default setting, when the evaluation-result notification unit 1205 is not notifying anything while a user is talking into the audio input apparatus 1300, it means that the speech quality is good.

The warning made by the evaluation-result notification unit 1205 in step S1323 or S1326 is to call user's attention to make the user notice that the audio input apparatus 1300 is not being used in a good used condition. A user then notices that a clear voice sound is not being transmitted and tries to change the position or orientation of the main microphone 1101 to improve the speech quality. With this change, if both of the first and second determination results become good, the warning is stopped and then the user notices that the audio input apparatus 1300 is being used in a good used condition.

As described above, the audio input apparatus 1300 in the eighth embodiment evaluates the speech quality by determining whether the main microphone 1101 is oriented towards an appropriate direction and also whether the noise cancellation function is working effectively. Therefore, more reliable speech quality evaluation is achieved with checking the used condition using the phase difference between voice sounds input to the main microphone 1101 and the sub-microphone 1102, in addition to the noise-cancellation effect determination which otherwise leads to erroneous evaluation if this determination only is employed.

The purpose of using the microphone-direction determination unit 1311 concerning the orientation of the main microphone 1101, in addition to the noise-cancellation effect evaluation unit 1312, is to raise the evaluation accuracy in a noisy environment. More important purpose of using the microphone-direction determination unit 1311 is, however, to instruct a user on how to hold the main microphone 1101 (or the audio input apparatus 1300) appropriately.

In detail, the noise-cancellation effect evaluation unit 1312 may not perform reliable evaluation, for example, in a quiet environment with small surrounding noise. Instruction on how to hold the main microphone 1101 appropriately may not always be done in an environment with the surrounding noise. Moreover, the noise cancellation function may work effectively even if a user does not hold the main microphone 1101 appropriately, which depends on the environment. Under consideration of these factors, the warning based on microphone-direction determination is prioritized than the warning based on noise-cancellation effect evaluation as shown in FIG. 24, for the purpose to instruct a user on how to hold the main microphone 1101 in an appropriate manner.

When a negative result is given by either the microphone-direction determination unit 1311 or the noise-cancellation effect evaluation unit 1312, the evaluation-result notification unit 1205 makes warning through the light-emitting device 1210 (such as an LED) to instruct a user on correct holding of the main microphone 1101. The microphone-direction determination process and the noise-cancellation effect evaluation process shown in FIGS. 22 and 23, respectively, can be repeated at a very short interval (such as 1/30 seconds). In this case, the evaluation-result notification unit 1205 may be equipped with a function of keeping the same mode for a certain time so that a user can easily notice, thereby enhancing a notification effect.

Ninth Embodiment

Described next is an audio input apparatus according to a ninth embodiment of the present invention, which is a noise cancellation microphone having a simplex wireless transmission function, equipped with a switch attached to a noise cancellation microphone unit for switching between transmission and reception.

Moreover, the audio input apparatus in the ninth embodiment is a dual-microphone type audio input apparatus having a microphone on each of the front and rear faces, with an active noise-cancellation function. In detail, the audio input apparatus in the ninth embodiment is a noise cancellation microphone for transmission of a clear voice sound with cancellation of a signal of the surrounding noise that is mixed with user's voice sound by using speech signals input through two microphones. In a normal arrangement, a main microphone and a sub-microphone are provided on the front face (that faces a user) and the rear face of the audio input apparatus, respectively, for mainly picking up the user's voice sound and the surrounding noise, respectively.

Figure 25:
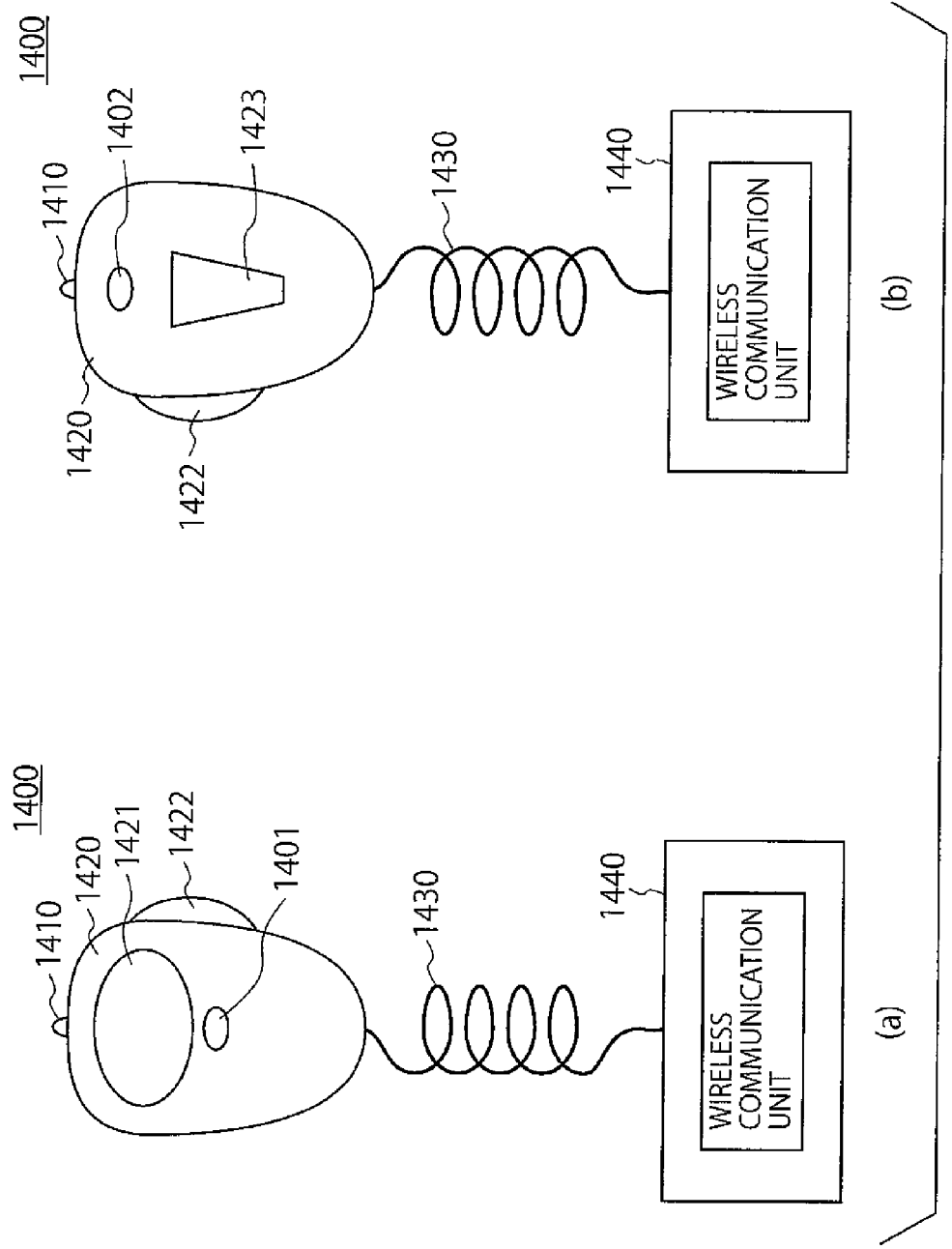
FIG. 25 is a view showing the exterior appearance of a noise cancellation microphone (an audio input apparatus) with a front view (a) and a rear view (b), according to a ninth embodiment of the present invention.

FIG. 25 is a view showing the exterior appearance of the audio input apparatus (a noise cancellation microphone) 1400 with a front view (a) and a rear view (b), according to the ninth embodiment of the present invention.

The audio input apparatus 1400 is provided with a noise-cancellation microphone unit 1420 and a wireless communication unit 1440 connected to each other with a cord 1430. The noise-cancellation microphone unit 1420 is equipped with a main microphone 1401 for mainly picking up a user's voice sound and a speaker 1421 on the front face, an LED on the upper face, and a PTT unit 1422 on the side face. Moreover, the noise-cancellation microphone unit 1420 is equipped with a sub-microphone 1402 for mainly picking up the surrounding noise and a belt clip 1423 for holding the microphone unit 1420 by a belt on the rear face.

Figure 26:
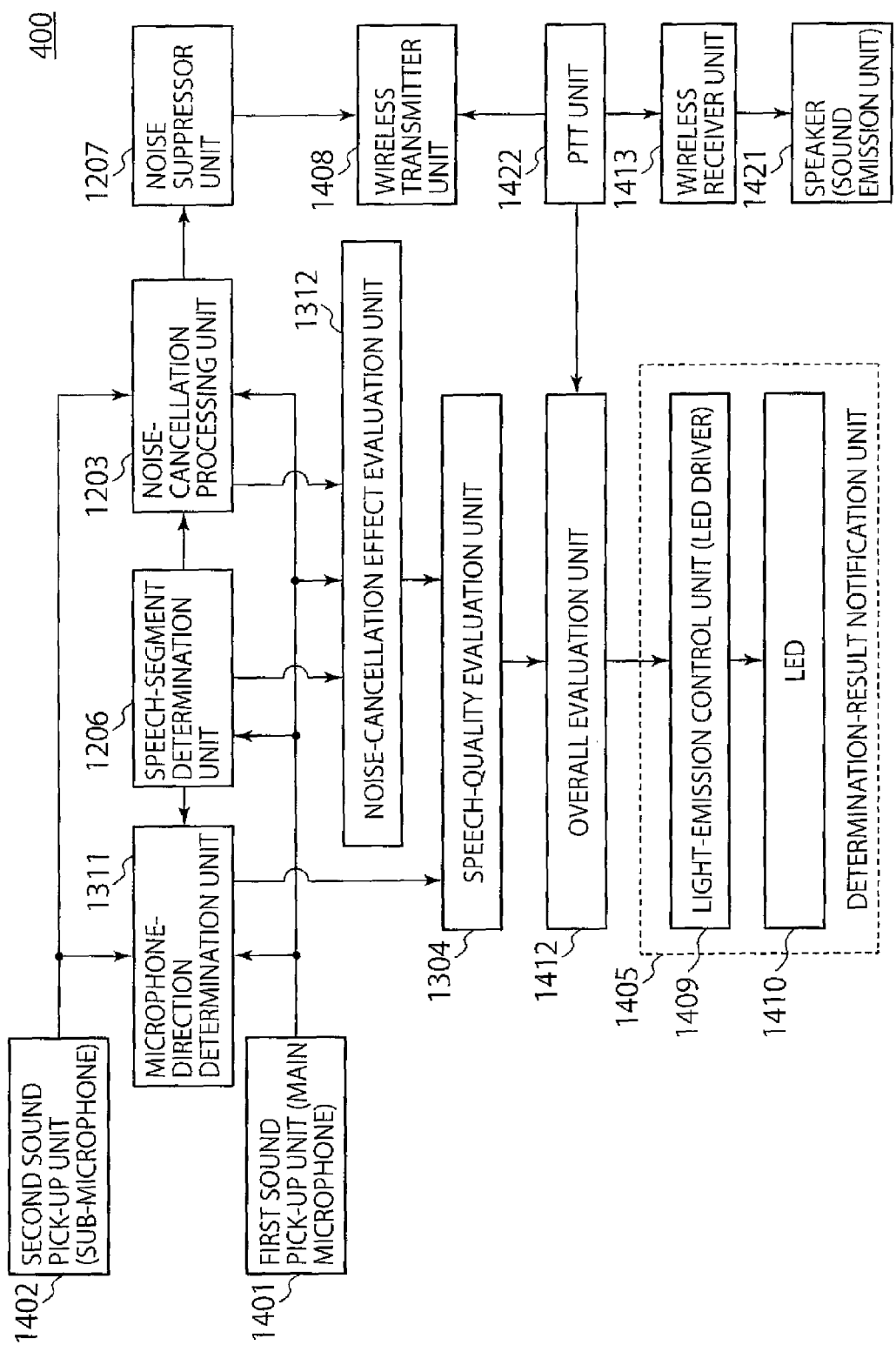
FIG. 26 is a block diagram schematically showing the configuration of the noise cancellation microphone according to the ninth embodiment of the present invention.

FIG. 26 is a block diagram schematically showing the configuration of the audio input apparatus (the noise cancellation microphone) 1400 according to the ninth embodiment of the present invention. In FIG. 26, the units the same as or analogous to those shown in FIG. 20 are given the same reference numerals and the explanation thereof is omitted for brevity.

A wireless transmitter unit 1408 and a wireless receiver unit 1413 are installed in the wireless communication unit 1440. The transmitter unit 1408 performs speech coding to a speech signal after the noise suppression by the noise suppressor unit 1207 according to need and transmits a speech-coded signal by wireless transmission. The wireless receiver unit 1413 receives a speech signal transmitted by wireless transmission and outputs the received speech signal to the speaker 1421. The speaker 1421 outputs the speech signal as a voice sound.

The PTT unit 1422 is a switch attached to the noise-cancellation microphone unit 1420 for switching a communication mode between the transmission mode and the standby mode. When a user talks into the audio input apparatus 1400 for sending a message, the user pushes the PTT unit 1422 to switch the communication mode from the standby mode to the transmission mode. While the user is pushing the PTT unit 1422, the audio input apparatus 1400 is in the transmission mode entirely, with each unit shown in FIG. 26 related to the transmission mode being working while the wireless receiver unit 1413 being in the waiting mode. While the PTT unit 1422 is being pushed, the PTT unit 1422 outputs a transmission-mode signal that indicates the transmission mode to an overall evaluation unit 1412.

The overall evaluation unit 1412 outputs a signal based on a speech-quality evaluation signal that indicates an evaluation result input from a speech-quality evaluation unit 1304 and the transmission-mode signal that indicates the transmission mode input from the PTT unit 1422, to a light-emission control unit (an LED driver) 1409 of an evaluation-result notification unit 1405. In other words, the overall evaluation unit 1412 makes an overall determination of how the light-emission control unit 1409 should control an LED 1410 of the evaluation-result notification unit 1405.

FIG. 27 is a table listing communication modes, speech-quality evaluation results, and LED states. As shown in FIG. 27, the LED driver 1409 drives the LED 1410 in the following manner. The LED driver 1409 repeatedly turns on and off the LED 1410 while the PTT unit 1422 is being pushed to put the audio input apparatus 1400 in the transmission mode and the speech quality is good. The LED driver 1409 turns on the LED 1410 while the PTT unit 1422 is being pushed to put the audio input apparatus 1400 in the transmission mode and the speech quality is bad, thereby calling user's attention to make the user notice that the audio input apparatus 1400 is not being used in a good condition. Moreover, the LED driver 1409 turns on the LED 1410 while the PTT unit 1422 is being pushed to put the audio input apparatus 1400 in the transmission mode but no speech signal is input thereto. On the other hand, the LED driver 1409 turns off the LED 1410 with no drive current supplied thereto while the PTT unit 1422 is not pushed.

As described above, the audio input apparatus (the noise cancellation microphone) 1400 according to the ninth embodiment of the present invention is a simplex wireless transmission apparatus equipped with the PTT unit 1422 that is to be pushed to switch the communication mode from the standby mode to the transmission mode. It is preferable that a user can distinguish between the standby mode and the transmission mode. For this reason, there is provided the light-emission control unit (the LED driver) 1409 that turns on the LED 1410 while the PTT unit 422 is being pushed to put the communication mode into the transmission mode and turns off the LED 1410 during the standby mode.

Moreover, it is preferable to notify a user who is talking into the audio input apparatus (the noise cancellation microphone) 1400 of whether or not a high-quality voice sound is being transmitted. In other words, it is preferable to notify the user of an evaluation result on whether or not the speech quality is good. In the case of an LED notification device, there is a demand for a smaller number of LEDs in view of the environment in which the audio input apparatus 1400 is to be used, the cost which should be reduced by using a smaller number of parts, etc. Therefore, it is preferable that one and the same LED indicates whether the communication mode is the transmission mode and also whether the speech quality is good. Under consideration of these factors, the light-emission control unit (the LED driver) 1409 has a control function of switching the single LED 1410 between a turned-on state and a turned-off state.

As shown in FIG. 27, the ninth embodiment employs an evaluation-result notification method in which the LED 1410 is turned on during the transmission mode by pushing the PTT unit 1422 and, particularly, the LED 1410 is repeatedly turned on and turned off during which the speech quality is evaluated as good. This evaluation-result notification method can make a user feel that the audio input apparatus (the noise cancellation microphone) 1400 reacts to the user's talking.

Concerning the method of speech quality evaluation performed by the evaluation speech-quality evaluation unit, there are several ways in addition to those described above, that are applicable in the present invention.

One method of speech quality evaluation will be explained with a flowchart shown in FIG. 28.

After performing steps S1411 to S1413 in the similar manner as steps S1311 to S1313 shown in FIG. 23, the average power of a second speech signal from a sub-microphone is calculated (step S1414). The power obtained in step S1414 can be considered a noise power. It is then determined whether the average power of the second speech is equal to or higher than a specific threshold level (step S1415). If it is determined that the average power of second speech is lower than the specific threshold level (No in step S1415), the environment is considered to be quiet with a fairly small noise, thereby the speech quality being evaluated as good (step S1418).

On the other hand, if it is determined that the average power of the second speech is equal to or higher than the specific threshold level (Yes in step S1415), the environment is considered to be noisy, so that it is required that the average power ratio of a noise-cancelled signal after the noise cancellation process to a first speech signal from a main microphone be equal to or lower than a specific threshold level by the noise cancellation process. Then, in step S1416, comparison is made between the average power of the first speech signal and that of the noise-cancelled signal to determine whether the noise cancellation process is being performed effectively, which is followed by step S1417 that is performed in the similar manner as step S207 shown in FIG. 5.

Figure 28:
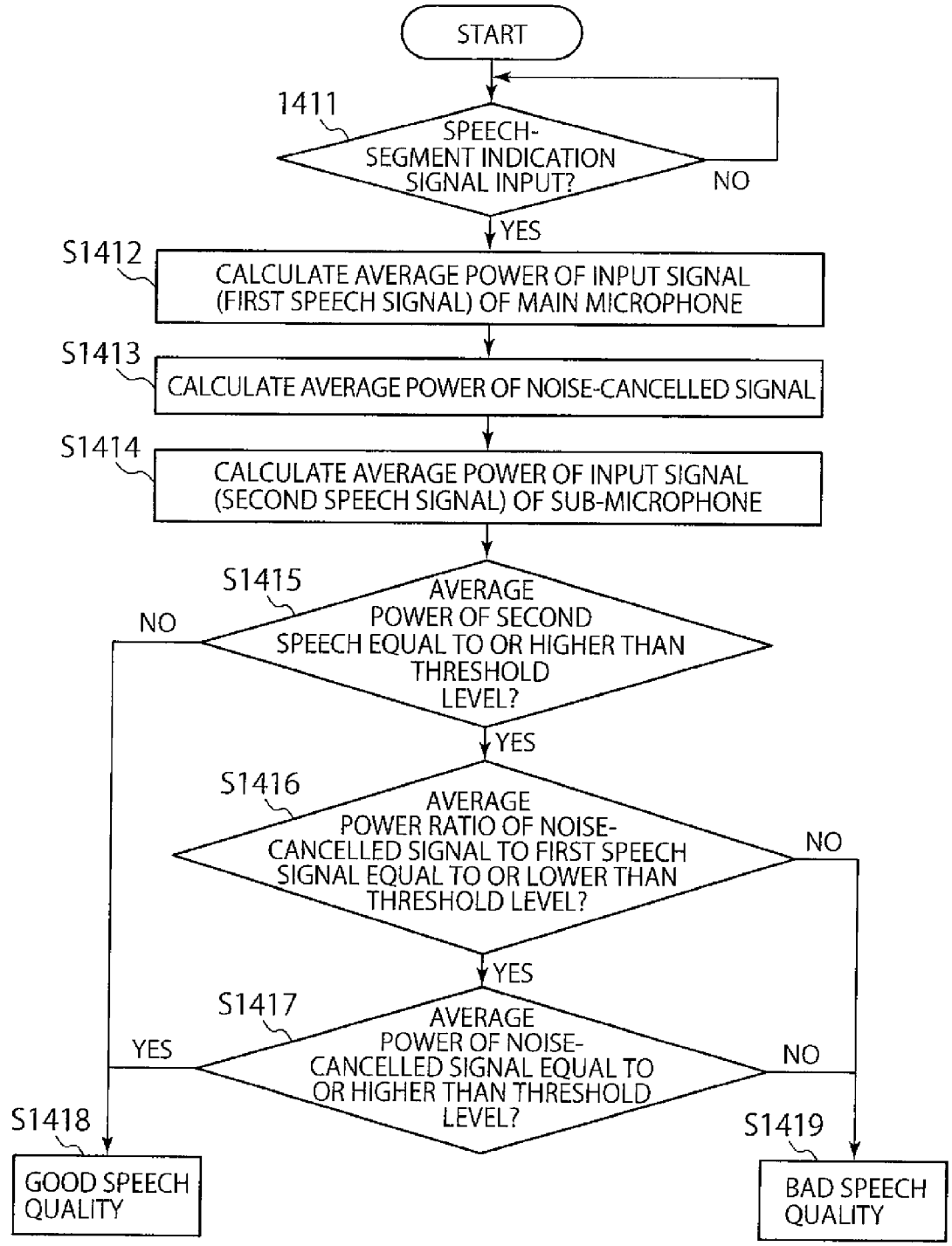
FIG. 28 is a flowchart showing a speech-quality evaluation process according to the present invention.

With the method shown in FIG. 28, it is achieved to perform reliable speech quality evaluation under consideration of a noisy environment.

Moreover, a noise-cancellation necessity determination unit may be provided in the present invention to determine whether the noise-cancellation process is necessary at the noise-cancellation processing unit. In detail, there is case in which a voice sound can rather be transmitted clearly without the noise-cancellation process in a quiet environment.

Under consideration of the case mentioned above, the noise-cancellation necessity determination unit calculates the average power of a speech signal obtained at the second sound pick-up unit (the sub-microphone) and compares the average power and a specific threshold value. Then, the noise-cancellation necessity determination unit determines that the noise-cancellation process is necessary due to the surrounding noise if the average power is equal to or higher than the specific threshold level. On the other hand, the noise-cancellation necessity determination unit determines that the noise-cancellation process is not necessary if the average power is lower than the specific threshold level. Based on the determination at the noise-cancellation necessity determination unit, the noise-cancellation processing unit performs the noise cancellation process.

A flag may be prepared for indicating a result of determination at the noise-cancellation necessity determination unit to determine whether or not the noise-cancellation process is necessary. If a flag is set to indicate that the noise-cancellation process is necessary, the noise-cancellation processing unit may perform the noise cancellation process.

Moreover, another flag may be prepared for indicating whether or not the noise-cancellation process is being performed. If a flag is set to indicate that the noise-cancellation process is being performed, the speech-quality evaluation unit may evaluate the speech quality. In this configuration, the speech-quality evaluation unit determines that the speech quality is good if the flag is cleared to indicate that the noise-cancellation process is not being performed. This is because, when the noise-cancellation process is not being performed, the average power of a speech signal obtained at the second sound pick-up unit (the sub-microphone) is lower than the specific threshold value and hence the environment is considered to be quiet. On the other hand, the speech-quality evaluation unit evaluates the speech quality such as shown in FIG. 23 if the flag is set to indicate that the noise-cancellation process is being performed. With the configuration described above, reliable speech quality is achieved with lower power consumption.

Concerning the determination of whether or not the noise-cancellation process is necessary, the technique of determination is not limited to the comparison between the average power of a speech signal obtained at the second sound pick-up unit (the sub-microphone) and a specific threshold value. For example, the noise-cancellation necessity determination unit may determine whether or not the noise-cancellation process is necessary in accordance with a voice incoming direction detected based on the phase difference between the first and second speech signals from the first and second sound pick-up units, respectively.

As described in detail, according to the present invention, improvement in speech quality is achieved with the prevention of misrecognition of the communication mode through notification to a user of the current communication mode (the state of a voice sound being transmitted) in a simplex communication apparatus for which the communication mode is switched between the transmission mode and the standby mode.

For example, in the case of a hand microphone equipped with an LED, whether a voice sound is drowned out by the surrounding noise depends on how a user is holding the microphone, the distance between the user's mouth to the microphone, the level of voice sound, etc. In order to solve such a problem, the communication apparatus according to the present invention is provided with the determination unit for determining whether a user's voice sound is being clearly transmitted based on the information on the noise cancellation process, the information on a voice sound, etc. Moreover, the communication apparatus according to the present invention is provided with the light-emission control unit for controlling an LED to repeatedly turns on and off, turns on or turns off the LED based on the information on whether a voice sound is being transmitted under determination by the determination unit. With the configuration described above, the overall evaluation of speech quality can be notified to a user by means of the LED that is repeatedly turned on and off, turned on or turned off almost in synchronism with user's talking.

When the speech quality of a voice sound being transmitted is good, the light-emission control unit may repeatedly turn on and off the LED at high speed to enhance the speech-quality notification function. The high-speed LED switching achieves speech quality notification almost in synchronism with user's talking so that the user feels almost no out-of-timing between talking and notification. Moreover, the light-emission control unit may turn on the LED continuously when the speech quality is bad during a speech segment to instruct a user to use the communication apparatus in an appropriate manner, thereby transmitting a clear voice sound.

With the speech-quality notification function described above, the present invention can be applied to training in use of a noise cancellation microphone at the first time.

As described above, the present invention is applicable to a dual-microphone type wireless communication apparatus having the active noise-cancellation function. However, the present invention is not limited thereto. For example, the present invention can be applied to a wired communication apparatus, a sound pick-up apparatus such as a noise cancellation microphone, etc. Moreover, a plurality of sub-microphone may be provided for picking up noises for noise cancellation.

As described above in each embodiment, the present invention achieves transmission of clear voice sounds with the enhanced noise-cancellation function by instructing a user to use a noise cancellation microphone correctly. In other words, the purpose of speech quality notification by means of an LED or the like is not indicating the performance of noise cancellation but instructing a user to use a noise cancellation microphone correctly.

This is because there is a problem to be solved that is the effect of noise cancellation depends on how a user holds a microphone, the distance between the user's mouth and the microphone, etc. in a dual-microphone type wireless communication apparatus having the active noise-cancellation function, an external microphone of a wireless communication apparatus, etc.

In detail, different from a close-talking microphone attached to a headset or the like, a microphone attached to a wireless communication apparatus, a hand microphone connected thereto, etc. may have a problem such that the microphone is oriented at an angle of almost 90 degrees to the user's mouth or is distant therefrom too much. In such a case, enough voice sounds do not reach a main microphone while noise components increase relatively, hence noise cancellation ineffective even if performed. Moreover, a user may talk into a microphone while the microphone is being attached to the user's shoulder, chest, etc. so that the user can use both hands freely. In such a case, the performance of noise cancellation is lowered than when a user is holding a microphone in an appropriate manner.

In order to solve such a problem discussed above, in the present invention, the speech quality is evaluated, in other words, it is determined whether a user is holding a microphone in an appropriate manner, using information on the speech or non-speech segment, the level of attenuation by noise cancellation, the microphone orientation based on the phase difference between two microphones, etc. thereby instructing a user of a correct way of holding a microphone.

As described above, the present invention employs a signal processing technique to evaluate the speech quality, in other words, to determine whether a user is holding a microphone in an appropriate manner so that the noise cancellation function can work effectively.

The signal processing technique achieves appropriate processing even if the noise cancellation function is not working effectively in such case where a noise source exists behind a user who is talking into a microphone, the frequency characteristics of a noise component is close to that of a voice component, etc.

In detail, in some of the embodiments described above, there are two determination units. The first determination unit determines whether the noise cancellation function is working effectively. If it is determined that the noise cancellation function is not working effectively, through the notification unit, a warning is given so that a user can change the way of holding a microphone in an appropriate manner. The determination of effectiveness of the noise cancellation function is performed with information indicating whether an input speech signal is a speech segment or not for each certain length (a frame in the embodiments) and information on the level of attenuation of a noise component after the noise cancellation to the input speech signal.

The second determination unit determines whether the user's mouth and a main microphone have an appropriate positional relationship based on the phase difference between input signals from the main microphone and sub-microphone. If it is determined that the user's mouth and the main microphone do not have an appropriate positional relationship, in other words, the main microphone is not oriented towards the user, through the notification unit, a warning is given so that a user can change the way of holding the main microphone in an appropriate manner. The determination at the second determination unit concerning the positional relationship based on the phase difference may be achieved by detecting the incoming direction of a voice sound to be picked up by the main microphone.

In the embodiments of the present invention, the light-emission control unit turns on the light-emitting device (LED) while the PTT unit is being pushed during a non-speech segment, in other words, in the case where the user's voice sound is not detected by the speech-segment determination unit. In detail, based on whether the PTT unit is being pushed or not, the light-emission control unit turns on or off the light-emitting device (LED). More in detail, the light-emission control unit turns on the light-emitting device (LED) when the communication mode is the transmission mode in which the transmission unit transmits a speech signal. On the other hand, the light-emission control unit turns off the light-emitting device (LED) when the communication mode is the standby mode in which the transmission unit does not transmit a speech signal. Moreover, the light-emission control unit repeatedly turns on and off the light-emitting device (LED) when the speech-segment determination unit determines that an input speech signal is a speech segment and when the speech-quality evaluation unit determines that a speech signal to be transmitted from the transmission unit has a good speech quality.

As described, the communication apparatus according to the present invention is provided with a first sound pick-up unit for picking up a voice sound, a transmission unit for transmitting the voice sound to outside as a speech signal, a speech-segment determination unit for determining whether or not the voice sound is a speech segment, a communication-mode switching unit for switching the communication mode between the transmission mode in which the transmitter unit transmits the speech signal and the standby mode in which the transmitter unit does not transmit the speech signal, a speech-quality evaluation unit for evaluating the speech quality of the speech signal to be transmitted from the transmission unit while the speech-segment determination unit is determining that the voice sound is a speech segment, a light-emitting device for emitting light, and a light-emission control unit for controlling the light-emitting device. The communication apparatus according to the present invention may also be provided with a receiver unit for receiving a speech signal transmitted from outside.

In this configuration, the light-emission control unit turns off the light-emitting device when the communication mode is the standby mode. The light-emission control unit turns on the light-emitting device when the communication mode is the transmission mode. Moreover, the light-emission control unit repeatedly turns on and off the light-emitting device when the communication mode is the transmission mode and when the speech signal to be transmitted has a good speech quality.

With the configuration described above, a user can feel that the communication apparatus is not responding to user's talking in an appropriate manner if the light-emitting device (LED) is turned on even when the user is talking into the communication apparatus while the user is pushing the PTT unit (the communication-mode switching unit). With the light-emitting device (LED), the communication apparatus can clearly notify a user who is talking into the communication apparatus that the transmission of a clear voice sound is not being performed.

It is preferable that the emission state (turn-on/-off) of the light-emitting device (LED) is the same between the case where the communication mode is the transmission mode and an input voice sound is not a speech segment and the case where the communication mode is the transmission mode and an input voice sound is a speech segment but the speech quality is not good. With this configuration, it is achieved to properly notify a user of whether a clear voice sound is being transmitted.

It is further understood by those skilled in the art that the foregoing description is a preferred embodiment of the disclosed device or method and that various changes and modifications may be made in the invention without departing from the spirit and scope thereof.

The light-emission control unit controls the light-emitting device (LED) in the following manner in the embodiments, however, the present invention is not limited thereto. In detail, in the embodiments, the light-emission control unit controls the light-emitting device (LED) in a manner to: repeatedly turn on and off the light-emitting device (LED) if the noise cancellation function is working effectively during a speech segment and if a voice sound now being transmitted has a good speech quality; turn on the light-emitting device (LED) if the noise cancellation function is working effectively during a speech segment, however, if a voice sound now being transmitted has a bad speech quality; and turn off the light-emitting device (LED) if no voice sound is being transmitted.

For example, different from the embodiments, the light-emission control unit may repeatedly turn on and off the light-emitting device (LED) if a voice sound now being transmitted has a bad speech quality. On the other hand, the light-emission control unit may turn on the light-emitting device (LED) if a voice sound now being transmitted has a good speech quality. Also in this modification, the light-emission control unit turns off the light-emitting device (LED) if no voice sound is being transmitted.

As described above, an audio input apparatus according to the present invention may be provided with a first sound pick-up unit, a second sound pick-up unit, a noise-cancellation processing unit for performing noise cancellation to a first speech signal input from the first sound pick-up unit by using a second speech signal input from the second sound pick-up unit, a speech-quality evaluation unit for evaluating the speech quality of a speech signal after the noise cancellation at the noise-cancellation processing unit, and an evaluation-result notification unit for notifying an evaluation result at the speech-quality evaluation unit.

In the audio input apparatus according to the present invention, the speech-quality evaluation unit may evaluate the speech quality of the speech signal after the noise cancellation based on whether the noise cancellation is working effectively. In this case, the speech-quality evaluation unit may determine that the speech quality of the speech signal after the noise cancellation is good if it is determined that the noise cancellation is working effectively as a result of comparison between the first speech signal before the noise cancellation and the speech signal after the noise cancellation and if average power of the speech signal after the noise cancellation is equal to or higher than a specific threshold level.

In the audio input apparatus according to the present invention, the speech-quality evaluation unit may compare the first speech signal before the noise cancellation and the speech signal after the noise cancellation to determine whether the noise cancellation is working effectively, thereby determining that the speech quality of the speech signal after the noise cancellation is good if it is determined that the noise cancellation is working effectively.

In the audio input apparatus according to the present invention, the speech-quality evaluation unit may determine that the speech quality of the speech signal after the noise cancellation is good if the difference between average power of the first speech signal before the noise cancellation and average power of the speech signal after the noise cancellation is equal to or higher than a specific threshold level.

In the audio input apparatus according to the present invention, the speech-quality evaluation unit may determine that the speech quality of the speech signal after the noise cancellation is good if a ratio of average power of the speech signal after the noise cancellation to average power of the first speech signal before the noise cancellation is equal to or lower than a specific threshold level.

In the audio input apparatus according to the present invention, the noise-cancellation processing unit may perform the noise cancellation by suppressing a noise component carried by the first speech signal input from the first sound pick-up unit based on the second speech signal input from the second sound pick-up unit. In this case, the noise-cancellation processing unit may perform the noise cancellation by generating a reversed-phase component of the noise component carried by the first speech signal input from the first sound pick-up unit based on the second speech signal input from the second sound pick-up unit and add the generated reversed-phase component to the first speech signal input from the first sound pick-up unit.

In the audio input apparatus according to the present invention, the evaluation-result notification unit may be provided with a light-emitting device for emitting light and a light-emission control unit for controlling the light-emitting device, wherein the evaluation-result notification unit notifies the evaluation result by turning on or repeatedly turning on and off the light-emitting device based on the evaluation result at the speech-quality evaluation.

The audio input apparatus according to the present invention may further be provided with a speech-segment determination unit for determining whether or not the first speech signal input from the first sound pick-up unit is a speech segment, wherein the speech-quality evaluation unit evaluates the speech quality of the speech signal after the noise cancellation at the noise-cancellation processing unit while the speech-segment determination unit is determining that the first speech signal is the speech segment. In this case, the speech-segment determination unit may convert the first speech signal input from the first sound pick-up unit into a signal component in unit of a specific length in a frequency domain and analyzes a spectrum component of the signal component thus converted into the frequency domain to determine whether it is the speech segment based on the frequency component.

In the audio input apparatus according to the present invention, the first and sound pick-up units may be a main microphone and a sub-microphone, respectively, and the main microphone and the sub-microphone may be arranged at a front face and a rear face of the audio input apparatus, respectively. In this case, the audio input apparatus may further be provided with a microphone-direction determination unit for determining a direction of the main microphone based on a phase difference between the first and second speech signals output from the main microphone and the sub-microphone, respectively, wherein the speech-quality evaluation unit evaluates the speech quality of the speech signal after the noise cancellation at the noise-cancellation processing unit based on the direction of the main microphone determined by microphone-direction determination unit. The microphone-direction determination unit may detect the phase difference between the first and second speech signals output from the main microphone and the sub-microphone, respectively, to determine whether or not the phase difference is equal to or larger than a specific threshold value, wherein the speech-quality evaluation unit evaluates the speech quality of the speech signal after the noise cancellation at the noise-cancellation processing unit based on the determination at the microphone-direction determination unit.

Moreover, as described above, an audio input apparatus according to the present invention may be provided with a first sound pick-up unit, a second sound pick-up unit, a noise-cancellation processing unit for performing noise cancellation to a first speech signal input from the first sound pick-up unit by using a second speech signal input from the second sound pick-up unit, a speech-quality evaluation unit for evaluating the speech quality of a speech signal after the noise cancellation at the noise-cancellation processing unit, a transmitter unit for transmitting the speech signal after the noise cancellation, an evaluation-result notification unit for notifying an evaluation result at the speech-quality evaluation unit, a receiver unit for receiving a speech signal, and a sound emission unit for emitting a sound based on the speech signal received by the receiver unit.

The audio input apparatus according to the present invention may further be provided with a communication-mode switching unit for switching a communication mode into a transmission mode in which the transmitter transmits the speech signal after the noise cancellation, wherein the evaluation-result notification unit notifies that the speech quality of the speech signal after the noise cancellation is good while the communication mode is being switched into the transmission mode.

Furthermore, as described above, a condition notification method for an apparatus having at least a first microphone and a second microphone may be provided with the steps of picking up sounds at the first and second microphones, respectively, performing noise cancellation to the sound picked up at the first microphone by using the sound picked up at the second microphone, evaluating the speech quality of the sound after the noise cancellation, and notifying a condition of the apparatus based on a result of the evaluation.

Moreover, the processes and methods described above in the several embodiments can be achieved with a computer program stored in a storage medium such as a ROM of a main processor. A program that includes various commands for executing each of the processes and methods described above can be stored in various types of non-transitory computer readable media and installed in a computer. The non-transitory computer readable media include tangible storage media. The non-transitory computer readable media applicable in this invention include magnetic storage media such as a flexible disk, a magnetic tape, and a hard disk drive, magneto-optical storage media (such as a magneto-optical disk), CD-ROM (Read Only Memory), CD-R, CD-RW, semiconductor memories such as a mask ROM, PROM (Programmable ROM), EPROM (Erasable PROM), a flash memory, and RAM (Random Access Memory).

Moreover, a program that includes various commands for executing each of the processes and methods described above may be installed in a computer by using various types of transitory computer readable media that include an electric signal, an optical signal, and an electro-magnetic wave. The program can be installed in a computer by means of such a transitory computer readable medium through a wired communication channel such as a cable and an optical fiber or a wireless communication channel.

As described above in detail, the present invention can provide an audio input apparatus, a communication apparatus and a condition notification method that achieve transmission of clear voice sounds with an effective noise-cancellation function.

What is claimed is:

1. A condition notification method for notifying a used condition of a simplex communication apparatus by using a light-emitting device attached to the simplex communication apparatus, the method comprising:
   a communication-mode determination step of determining whether a communication mode of the simplex communication apparatus is a transmission mode or a standby mode;
   a sound pick-up state determination step of determining a sound pick-up state of a sound carried by a speech signal to be transmitted if the communication mode is the transmission mode;
   a control step of controlling the light-emitting device so that the light-emitting device is turned off, turned on or repeatedly turned on and off based on determination results of the communication-mode determination step and the sound pick-up state determination step;
   a speech-quality evaluation step of evaluating speech quality of the speech signal to be transmitted, wherein, in the sound pick-up state determination step, the sound pick-up state of the sound carried by the speech signal to be transmitted is determined if the communication mode is the transmission mode based on the speech quality of the speech signal evaluated by the speech-quality evaluation step; and
   a speech-segment determination step of determining whether or not the speech signal to be transmitted is a speech segment if the communication mode is the transmission mode, wherein, in the sound pick-up state determination step, the sound pick-up state of the sound carried by the speech signal to be transmitted, if the communication mode is the transmission mode, is determined based on a determination result of the speech-segment determination step and an evaluation result of the speech-quality evaluation step.

2. The condition notification method according to claim 1, wherein, in the control step, the light-emitting device is turned on if the communication mode is the transmission mode whereas the light-emitting device is repeatedly turned on and off based on the sound pick-up state determined in the sound pick-up state determination step if the communication mode is the transmission mode.

3. The condition notification method according to claim 1, wherein, in the speech-quality evaluation step, the speech quality of the speech signal to be transmitted is evaluated based on a volume level of a sound to be picked up.

4. The condition notification method according to claim 1 further comprising a noise cancellation step of performing noise cancellation to a first speech signal input from a first sound pick-up unit by using a second speech signal input from a second sound pick-up unit, the first and second sound pick-up units being provided for the simplex communication apparatus, wherein, speech quality of a speech signal after the noise cancellation is evaluated in the speech-quality evaluation step.

5. The condition notification method according to claim 1, wherein in the speech-segment determination step it is determined whether or not the speech signal to be transmitted is a speech segment if the communication mode is the transmission mode, wherein, in the speech-quality evaluation step, the speech quality of the speech signal to be transmitted is evaluated while the speech signal to be transmitted is being determined as the speech segment.

6. The condition notification method according to claim 1 further comprising a microphone-direction determination step of determining a direction of a main microphone based on a phase difference of sounds picked up by a first sound pick-up unit and a second sound pick-up unit both provided for the simplex communication apparatus, the first sound pick-up unit including the main microphone, wherein, in the speech-quality evaluation step, the speech quality of the speech signal to be transmitted is evaluated based on the direction of the main microphone thus determined in the microphone-direction determination step.

7. The condition notification method according to claim 4, wherein, in the control step, the light-emitting device is turned off if the communication mode is the standby mode, the light-emitting device is turned on if the communication mode is the transmission mode and if the speech signal to be transmitted is not the speech segment, the light-emitting device is turned on if the communication mode is the transmission mode and if the speech signal to be transmitted is the speech segment, and if the speech quality of the speech signal to be transmitted is evaluated as bad, and the light-emitting device is repeatedly turned on and off if the communication mode is the transmission mode and if the speech signal to be transmitted is the speech segment, and if the speech quality of the speech signal to be transmitted is evaluated as good.

8. The condition notification method according to claim 1, wherein the speech-segment determination step includes:
a frequency conversion step of converting a signal input from a sound pick-up unit provided for the simplex communication apparatus into a signal component in unit of a specific length in a frequency domain; and
a sound determination step of determining whether the signal input from the sound pick-up unit carries a voice component or a noise component based on a spectrum component of the signal component thus converted into the frequency domain.

9. A communication apparatus comprising:
a first pick-up unit configured to pick up a voice sound;
a transmitter unit configured to transmit the voice sound picked up by the first pick-up unit to outside as a first speech signal;
a communication-mode switching unit configured to switch a communication mode between a standby mode in which the transmitter unit does not transmit the speech signal and a transmission mode in which the transmitter unit transmits the speech signal;
a sound pick-up state determination unit configured to determine a pick-up state of the voice sound picked up by the first pick-up unit;
a light emission device configured to emit light;
a control unit configured to control the light-emitting device so that the light-emitting device is turned off, turned on or repeatedly turned on and off based on the communication mode switched by the communication-mode switching unit, and the pick-up state of the voice sound picked up by the first pick-up unit and determined by the sound pick-up state determination unit;
a speech-quality evaluation unit configured to evaluate speech quality of the first speech signal to be transmitted by the transmitter unit, wherein the sound pick-up state determination unit determines the sound pick-up state of the voice sound picked up by the first sound pick-up unit based on the speech quality of the speech signal evaluated by the speech-quality evaluation unit; and
a speech-segment determination unit configured to determine whether or not the first speech signal to be transmitted by the transmitter unit is a speech segment, wherein, the sound pick-up state determination unit determines the sound pick-up state of the sound to be transmitted as the first speech signal based on a determination result at the speech-segment determination unit and an evaluation result at the speech-quality evaluation unit.

10. The communication apparatus according to claim 9, wherein the light-emitting device is turned on if the communication mode is switched into the transmission mode whereas the light-emitting device is repeatedly turned on and off based on the pick-up state determined by the sound pick-up state determination unit if the communication mode is switched into the transmission mode.

11. The communication apparatus according to claim 9 further comprising:
a second sound pick-up unit configured to pick up a voice sound;
a noise cancellation unit configured to perform noise cancellation to the first speech signal input from the first sound pick-up unit by using a second speech signal input from the second sound pick-up unit,
wherein the transmitter unit transmits a speech signal after the noise cancellation by the noise cancellation unit and the speech-quality evaluation unit evaluates speech quality of the speech signal after the noise cancellation.

12. The communication apparatus according to claim 11 further comprising a microphone-direction determination unit configured to determine a direction of a main microphone based on a phase difference of the voice sounds picked up the first and second sound pick-up units, respectively, the first sound pick-up unit including the main microphone, wherein, the speech-quality evaluation unit evaluates the speech quality of the speech signal to be transmitted by the transmitter unit based on the direction of the main microphone thus determined by the microphone-direction determination unit.

13. The communication apparatus according to claim 9, wherein the control unit controls the light-emitting device so that the light-emitting device is turned off if the communication mode is the standby mode, the light-emitting device is turned on if the communication mode is the transmission mode and if the speech signal to be transmitted is not the speech segment, the light-emitting device is turned on if the communication mode is the transmission mode, if the speech signal to be transmitted is the speech segment, and if the speech quality of the speech signal to be transmitted is evaluated as bad, and the light-emitting device is repeatedly turned on and off if the communication mode is the transmission mode, if the speech signal to be transmitted is the speech segment, and if the speech quality of the speech signal to be transmitted is evaluated as good.

14. The communication apparatus according to claim 11, wherein the first and second sound pick-up units are a main microphone and a sub-microphone, respectively, and the main microphone and the sub-microphone are arranged at a front face and a rear face of the communication apparatus, respectively.

15. The communication apparatus according to claim 9, wherein the speech-segment determination unit converts the first signal input from the first sound pick-up unit into a signal component in unit of a specific length in a frequency domain and determines whether the first signal carries a voice component or a noise component based on a spectrum component of the signal component thus converted into the frequency domain.

* * * * *